(12) United States Patent
Thomas et al.

(10) Patent No.: US 11,138,606 B2
(45) Date of Patent: Oct. 5, 2021

(54) TRANSFER COSTS AND LOCK TIMEOUTS IN A RESOURCE TRANSFER SYSTEM

(71) Applicant: RIPPLE LUXEMBOURG S.A., Luxembourg (LU)

(72) Inventors: Stefan Thomas, San Francisco, CA (US); Evan Schwartz, New York, NY (US)

(73) Assignee: RIPPLE LUXEMBOURG S.A., Luxembourg (LU)

( * ) Notice: Subject to any disclaimer, the term of this patent is extended or adjusted under 35 U.S.C. 154(b) by 0 days.

(21) Appl. No.: 14/875,560

(22) Filed: Oct. 5, 2015

(65) Prior Publication Data
US 2016/0342959 A1 Nov. 24, 2016

Related U.S. Application Data

(63) Continuation of application No. 14/717,390, filed on May 20, 2015.

(51) Int. Cl.
*G06Q 20/40* (2012.01)
*G06Q 20/02* (2012.01)
(Continued)

(52) U.S. Cl.
CPC ......... *G06Q 20/401* (2013.01); *G06Q 20/027* (2013.01); *G06Q 20/405* (2013.01);
(Continued)

(58) Field of Classification Search
CPC ... G06Q 20/401; G06Q 20/405; G06Q 20/407
See application file for complete search history.

(56) References Cited

U.S. PATENT DOCUMENTS

| | | |
|---|---|---|
| 5,557,518 A | 9/1996 | Rosen |
| 5,884,290 A | 3/1999 | Smorodinsky |

(Continued)

FOREIGN PATENT DOCUMENTS

| | | |
|---|---|---|
| AU | 783008 B2 | 11/2001 |
| EP | 2538386 A1 | 12/2012 |

(Continued)

OTHER PUBLICATIONS

Brian Kelly, The Bitcoin Big Bang: How Alternative Currencies Are About to Change the World, Nov. 2014, John Wiley & Sons.*

(Continued)

*Primary Examiner* — Jay Huang
(74) *Attorney, Agent, or Firm* — Butzel Long

(57) ABSTRACT

Systems and techniques are provided for a resource transfer system. An instruction to transfer a first quantity of a resource from a first resource pool to a second resource pool may be received. A hold may be placed on a second quantity of the resource in the first resource pool. The held second quantity of the first resource may not be transferred from the first resource pool until the hold is released. Responsive to receiving a message that fulfills a condition on the hold and an instruction to execute the transfer, the hold may be released. A register that is in the first resource pool and is associated with the resource may decremented by the first quantity, and a register that is in the second resource pool and is associated with the resource may be incremented by the first quantity.

10 Claims, 25 Drawing Sheets

(51) Int. Cl.
  *G06Q 20/42* (2012.01)
  *G06Q 40/00* (2012.01)
  *G06Q 20/38* (2012.01)

(52) U.S. Cl.
  CPC .......... *G06Q 20/407* (2013.01); *G06Q 20/42* (2013.01); *G06Q 20/3823* (2013.01); *G06Q 20/3829* (2013.01); *G06Q 40/00* (2013.01); *G06Q 2220/00* (2013.01); *G06Q 2220/10* (2013.01)

(56) References Cited

U.S. PATENT DOCUMENTS

| | | | |
|---|---|---|---|
| 5,892,900 | A | 4/1999 | Ginter |
| 6,658,568 | B1 | 12/2003 | Ginter |
| 7,707,118 | B2 | 4/2010 | James |
| 8,560,423 | B1 | 10/2013 | Understein |
| 9,892,460 | B1 | 2/2018 | Winklevoss |
| 10,068,228 | B1 | 9/2018 | Winklevoss |
| 10,181,953 | B1 | 1/2019 | Seidenberg |
| 10,282,711 | B2 | 5/2019 | Chan |
| 2001/0047328 | A1 | 11/2001 | Triola |
| 2002/0046169 | A1 | 4/2002 | Keresman |
| 2002/0087469 | A1 | 7/2002 | Ganesan |
| 2002/0188558 | A1 | 12/2002 | Morimoto |
| 2003/0149986 | A1 | 8/2003 | Mayfield |
| 2003/0208413 | A1* | 11/2003 | Ray ............... G06Q 10/08 705/26.41 |
| 2003/0208440 | A1 | 11/2003 | Harada |
| 2006/0106805 | A1 | 5/2006 | Aaron |
| 2006/0148555 | A1 | 7/2006 | Dent |
| 2008/0195485 | A1 | 8/2008 | Kennedy |
| 2008/0300836 | A1 | 12/2008 | Timmer |
| 2009/0076944 | A1 | 3/2009 | Brams |
| 2009/0138398 | A1* | 5/2009 | Cole ............... G06Q 40/025 705/42 |
| 2009/0198623 | A1 | 8/2009 | Rubinstein |
| 2010/0287100 | A1 | 11/2010 | Avazian |
| 2011/0016327 | A1 | 1/2011 | Suzuki |
| 2011/0276473 | A1 | 11/2011 | Blok |
| 2012/0209762 | A1 | 8/2012 | Metaireau |
| 2013/0036057 | A1 | 2/2013 | Hendrix et al. |
| 2013/0138491 | A1 | 5/2013 | Gao |
| 2013/0266141 | A1* | 10/2013 | Kim ............... G06Q 20/4012 380/270 |
| 2014/0156512 | A1 | 6/2014 | Rahman |
| 2014/0156530 | A1 | 6/2014 | Suitner |
| 2015/0058636 | A1 | 2/2015 | Owlett et al. |
| 2015/0206106 | A1 | 7/2015 | Yago |
| 2015/0262176 | A1 | 9/2015 | Langschaedel |
| 2015/0295720 | A1 | 10/2015 | Buldas |
| 2015/0332256 | A1 | 11/2015 | Minor |
| 2015/0356524 | A1 | 12/2015 | Pennanen |
| 2015/0379510 | A1 | 12/2015 | Smith |
| 2016/0140653 | A1 | 5/2016 | McKenzie |
| 2016/0234026 | A1* | 8/2016 | Wilkins ............... G06F 21/64 |
| 2016/0292680 | A1 | 10/2016 | Wilson, Jr. |
| 2016/0321751 | A1 | 11/2016 | Creighton, IV |
| 2016/0342976 | A1 | 11/2016 | Davis |
| 2016/0342977 | A1 | 11/2016 | Lam |
| 2016/0342981 | A1 | 11/2016 | Thomas |
| 2016/0342987 | A1 | 11/2016 | Thomas |
| 2017/0011460 | A1 | 1/2017 | Molinari |
| 2017/0076306 | A1 | 3/2017 | Snider |
| 2017/0091750 | A1 | 3/2017 | Maim |
| 2017/0132614 | A1 | 5/2017 | Acharya |
| 2018/0227293 | A1 | 8/2018 | Uhr |

FOREIGN PATENT DOCUMENTS

| | | |
|---|---|---|
| JP | 2007310818 | 11/2007 |
| JP | 2012517060 | 7/2012 |
| WO | 9818095 | 4/1998 |
| WO | WO-2012027585 A2 | 3/2012 |

OTHER PUBLICATIONS

Pedro Franco: "Understanding Bitcoin: Cryptography, Engineering and Economics", Nov. 24, 2014, Wiley, XP055279012.
Mohammed El-Qorchi, "The Hawala System", Dec. 2002, Finance and Development, vol. 39, No. 4.
Extended European Search Report dated Sep. 15, 2016 as received in Application No. 16170464.8.
International Search Report issued in PCT/IB2016/055936 dated Nov. 24, 2016.
International Search Report and Written Opinion dated Nov. 24, 2016 as received in Application No. PCT/IB2016/055935.
Andrew S. Tanenbaum et al: "Distributed Systems: Principles and Paradigms (2nd Edition)", Oct. 12, 2006, Prentice Hall, XP05572991.
George Coulouris et al: "Distributed Systems: Concepts and Design (5th Edition)", May 7, 2011, Addison-Wesley, US, XP055263685.
Wikipedia: "Consensus decision-making", Jan. 30, 2015, XP055263780, URL:https://en.wikipedia.org/w/index.php?title=Consensus_decision-making&oldid=644846809.
Buterin ("Ethereum White Paper—A Next Generation Smart Contract & Decentralized Application Platform", Buterin, ethereum.org 36 pages) retrieved on crawl by the Internet Archive on Dec. 23, 2014 (Year: 2014).
English language translation of Japanese Office Action for Application No. JP2016-100220, dated Sep. 30, 2019, 3 pages.
A Next Generation Contract & Decentralized Application Platform, Ethereum White Paper, 2013, 1-36, URL: https://cryptorating.eu/whitepapers/Ethereum/Ethereum_white_paper.pdf.
Japanese Office Action (with English languag translation) for App No. JP2018-536357, dated Apr. 6, 2020, 6 pages.
Japanese Office Action (with English language translation) for App No. JP2016-100220, dated Jun. 15, 2020, 9 pages.
Australian Examination Report No. 1 for App. No. AU2016203205, dated Feb. 19, 2021, 6 pages.
Japanese Notice of Allowance (including English translation) for App No. JP2016-100220, dated Feb. 22, 2021, 5 pages.
Stellar Multi-Currency Transactions, Retrieved from https://web.archive.org/web/20150319043602/hllps://www.stellar.org/learn/explainers/#Multi-currency_transactions on Mar. 19, 2015 (Year: 2015).
IP Office of Singapore Examination Report for App. No. 11201802796U, dated Mar. 29, 2021, 5 pages.
Toedtmann et al. OpenCoin—the original protocol, including wallet to wallet transactions. Retrieved from https://web.archive.org/web/20131001000000*/hllps://opencoin.org/Members/jhb/protocol.txUview on Oct. 8, 2013 (Year: 2013).
A Next-Generation Smart Contract and Decentralized Application Platform (NPL 2015) retrieved from the waybackMachine—https://web.archive.org/web/20150306210457/hllps://github.com/ethereum/wiki/wiki/White-Paper on Mar. 6, 2015 (Year: 2015).
Stellar decentralized network (NPL 2015), including multi-currencey transactions, retrieved from https://web.archive.org/web/20150319043602/hllps://www.stellar.org/learn/explainers/#Multi-currency_transactions on Mar. 19, 2015 (Year:2015).
Katz, Digital Signatures, Ed. 1. Chapter 1, ISBN 978-0-387-27711-0 Springer-Verlag (Year: 2010).

* cited by examiner

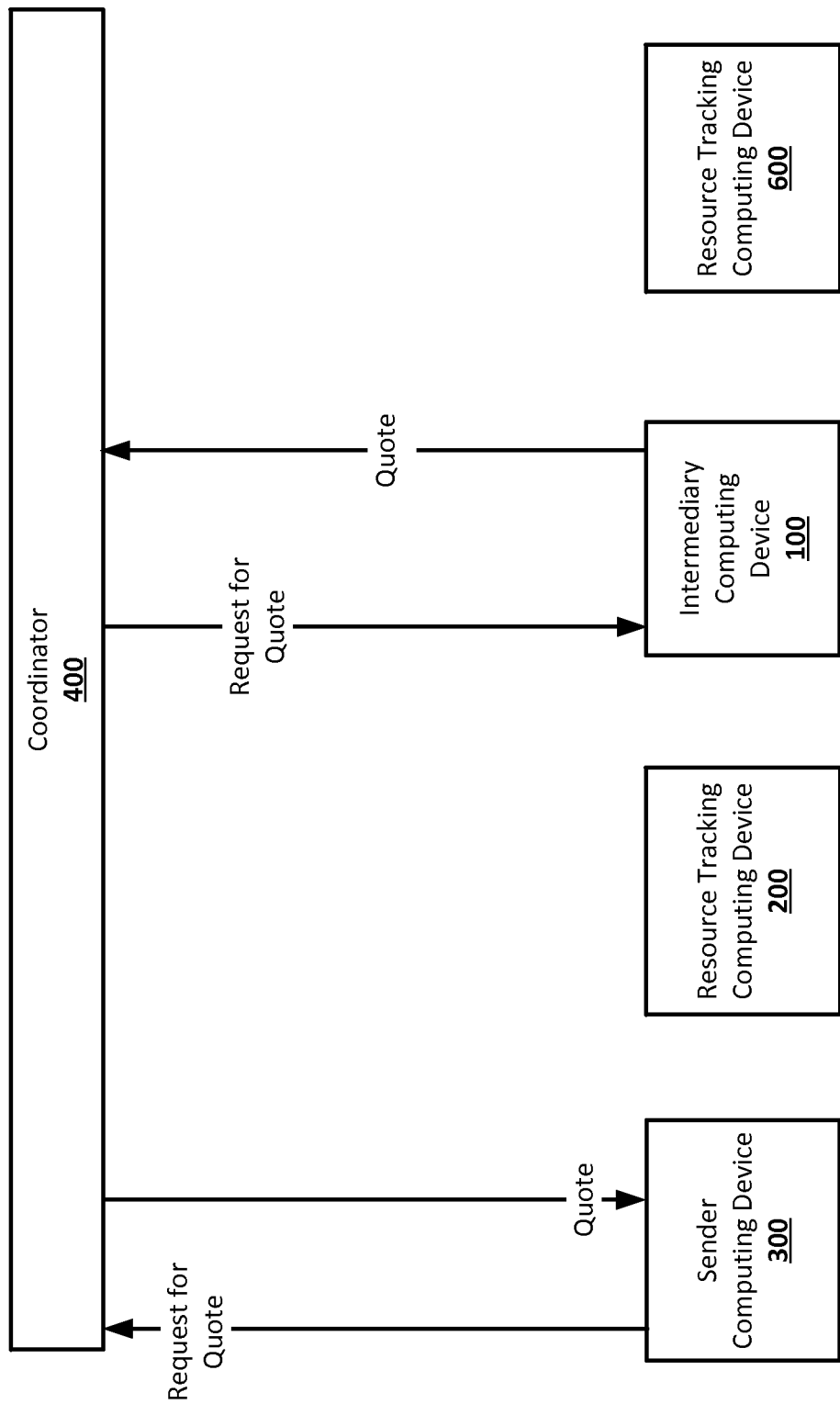

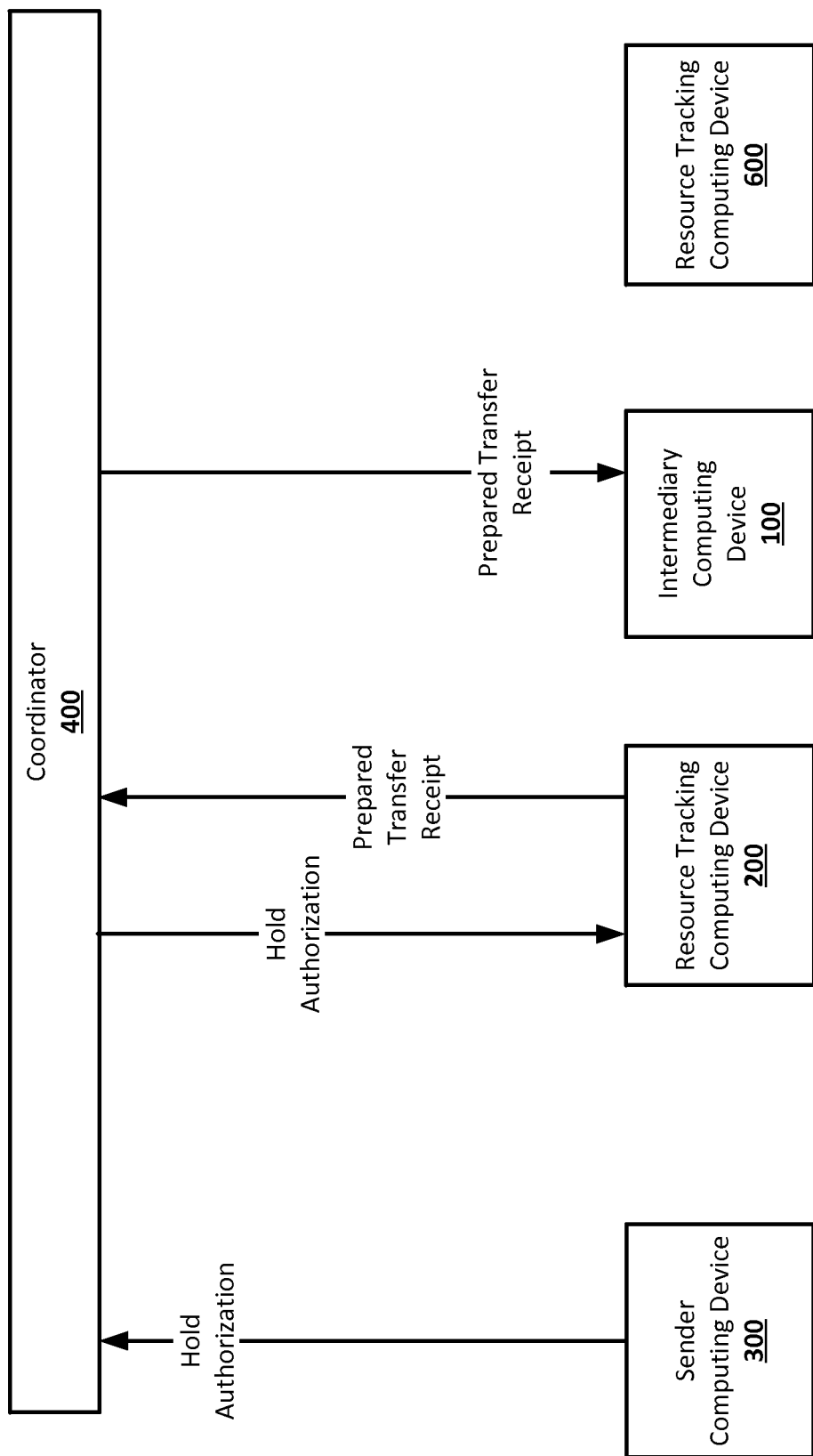

TRANSFER COSTS AND LOCK TIMEOUTS IN A RESOURCE TRANSFER SYSTEM

BACKGROUND

The transfer of resources between two parties may require the involvement of one or more third parties. For example, if the sending party has one type of resource (such as dollars) to send, but the receiving party expects to receive a different type of resource (such as euros), a third party may be needed to convert the sending party's resource (dollars) into the resource expected by the receiving party (euros). More parties can be introduced into a resource transfer. For example, a first intermediary may convert dollars to yen and a second intermediary may convert the yen into euros for the receiving party. As the number of intermediaries increase, the risk for the parties involved in the transfer may increase. For example, it may be possible for one of the third parties (such as an intermediary) in between the sending party and receiving party to take resources (such as dollars from the sending party), but keep them instead of converting them into a different type of resource (e.g., yen) and passing them on to another intermediary towards the receiving party. It may also be possible for a third party to transfer resources such as euros to the receiving party, and then fail to be reimbursed either by the sending party or an intermediary between the sending party and the third party. Malicious sending parties may also initiate resource transfers designed to fail on purpose to temporarily tie up resources held by one or more of the other parties to a transaction.

BRIEF SUMMARY

Systems and techniques disclosed herein may allow for a resource transfer system. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

An instruction may be received to transfer a first quantity of a first resource type from a first resource pool to a second resource pool. An instruction may be received to place a hold on a second quantity of the first resource type in the first resource pool. An authorization to place the hold on the second quantity of the first resource type in the first resource pool. Responsive to receiving the authorization, the hold may be placed on the second quantity of the first resource type in the first resource pool to create a held second quantity of the first resource type. The held second quantity of the first resource type cannot be transferred from the first resource pool until the hold is released.

A message may be received that fulfills a condition of the hold. An instruction may be received to execute the transfer of the first quantity of the first resource type from the first resource pool to the second resource pool. Responsive to receiving the message that fulfills the condition on the hold and the instruction to execute the transfer, the hold may be released on the held second quantity of the first resource type, a first register that is in the first resource pool and is associated with the first resource type may be decremented by the first quantity, and a second register that is in the second resource pool and is associated with the first resource type may be incremented by the first quantity.

A message may be received including a proposed transfer. The proposed transfer may include a source transfer of a first quantity of a first resource type from a first resource pool to a second resource pool and a destination transfer of a second quantity of a second resource type from a third resource pool to a fourth resource pool. A message may be received indicating that a hold has been placed on a third quantity of the first resource type in the first resource pool. A message associated with the performance of the destination transfer may be sent. A message indicating that a condition on the hold of the third quantity of the first resource type in the first resource pool has been fulfilled may be received. An instruction to execute the source transfer of the first quantity of the first resource type from the first resource pool to the second resource pool may be sent.

A prepared transfer receipt may be received from each of a number of resource tracking systems in a transfer chain. The prepared transfer receipt may indicate that each of the resource tracking systems has placed a hold on a respective quantity of a respective resource type. A signed message may be sent to each of the number of resource tracking systems and each of a number of intermediaries. The signed message may fulfill a condition on each of the holds placed by each of the resource tracking systems and cause each of the number of intermediaries to send at least on instruction to execute a transfer to one of the number of resource tracking systems.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIGS. 6A-D shows example arrangements suitable for a resource transfer system according to an implementation of the disclosed subject matter.

DETAILED DESCRIPTION

Figure 1:
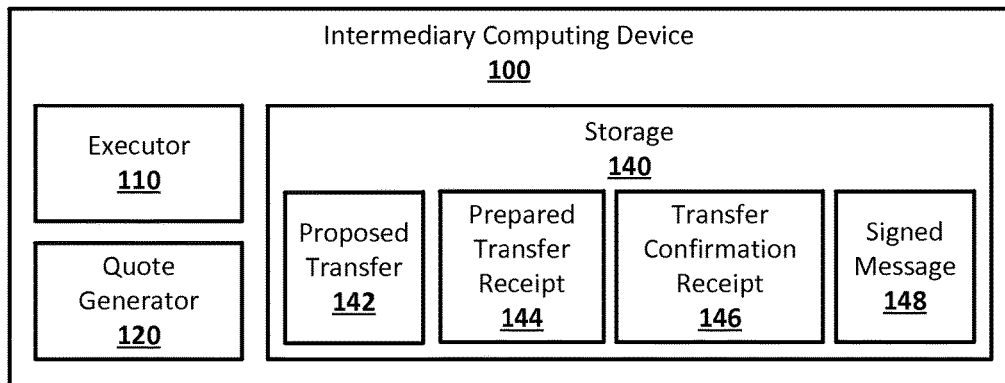
FIG. 1 shows an example system suitable for a resource transfer system according to an implementation of the disclosed subject matter.

According to embodiments disclosed herein, a resource transfer system may allow for the transfer of resources of different types from a sending party to a receiving party and involving one or more third parties (such as intermediary parties), while reducing the risk to the parties involved. A sending party may initiate a transfer of resources to a receiving party, using any suitable computing device. The transfer may be performed using resource tracking systems, which may be any suitable computing devices for tracking the ownership of resources by the various parties. The sending party, receiving party, and intermediary parties may use computing devices such as a sender, intermediary, and receiver. The sender, intermediaries, receiver, and resource tracking systems can be considered parts of a transfer chain from the sender to the receiver.

As used herein, for a given party in the transfer, a transfer of resources to that party on a resource tracking system is referred to as "source transfer", and a transfer of resource away from the party is referred to as a "destination transfer". Source and destination transfers for the same party may take place using two separate resource tracking systems, both of which can track resources controlled by the party. A resource tracking system may be between two parties when both parties have resources that are tracked by the resource tracking system, so that the resource tracking system may transfer resources between the parties.

Holds may be placed on resources to be transferred. A purpose of the hold is to reduce the amount of risk taken by one or more participants in a transfer chain. Generally, a "hold" prevents the transfer of a quantity of resources and/or specific resources unless and until certain conditions of the hold are fulfilled. The conditions may be, for example, the receiving of a signed message from a computing device or system trusted by all of the parties participating in the transfer indicating that the transfer can proceed. The conditions may also be, for example, that a source transfer of resources to a party may proceed upon receiving a message ("receipt") that may be evidence that a destination transfer of resources from that party has taken place. As another example, a condition may be the receiving of evidence that one or more other holds in place at one or more different points in a transfer chain. The conditions may also be, for example, evidence that a smart contract is being executed, or a digital signature or other signed message from a third-party indicating the occurrence of an event, such as a digital signature confirming the successful delivery of a physical package by a delivery service. The conditions of a hold may also be, for example, evidence of the fulfillment of multiple other, non-hold conditions, including, for example, the receipt of signatures from multiple other parties.

A sending party, using a sender computing device, or "sender," may initiate a transfer to a receiver by requesting a quote. A quote can relate to the resources required to make a transfer from the sender to the receiver. It can include an amount of resources to be transferred to a recipient, as well as any fees for effectuating the transfer. Such fees may be charged by intermediaries. The quote may be requested from any suitable party, with any suitable computing device or system that may be in communication with computing devices or system for various intermediaries.

For all transfer chains, using any conditions on held resources and number of intermediaries, the sending party may accept a quote and authorize a hold on its own resources that are to be transferred. The hold can be put in place on a resource tracking system between the sending party and the first intermediary party in the transfer chain, which may be a sender-intermediary resource tracking system. The sender-intermediary resource tracking system may track certain resources controlled by the sending party and other resources controlled by the first intermediary party. In general, a hold can be put in place on the resource tracking system responsible for tracking resources of adjacent parties in the transfer chain. For example, a record of the amount and type of a sending party resource may be stored in a database that is part of a resource tracking system. In placing a hold on a certain quantity of the resources belonging to the sending party, the resource tracking system may prevent the transfer of that quantity of resources and/or specific resources unless and until the specific conditions of the hold are fulfilled. The resources for both the sending party and for the next party in the transfer chain may be of the same type. Once the hold has been authorized, the next party in the transfer, for example, an intermediary party using an intermediary computing device, or "intermediary," may cause the resource tracking system to implement the hold on the resources as authorized by the sending party. This may lock up some quantity of the sending party's resources, preventing other transfers from reducing the quantity of the sending party's resources on the sender-intermediary resource tracking system below the held quantity for some time period. The sender-intermediary resource tracking system may send a hold receipt (a "prepared transfer receipt") that may indicate that the requested hold has been placed on the resource in preparation for the planned transfer. The hold may also be placed by transferring the held resources to a holding account on the resource tracking system. The holding account may be owned by the operator of the resource tracking system, or by owned by a third party. For example, a third party may establish an account on a resource tracking system to which a sending party may transfer resources to be used in a transfer. The sending party's resources may be transferred out of the third party's account on the resource tracking system when being transferred to an account of a first intermediary party in a transfer chain.

For a single intermediary transfer chain, the condition for the resource tracking system allowing the transfer of held resources may be receiving a signed message from a trusted system indicating that the transfer may proceed. The intermediary may receive the prepared transfer receipt that was sent out by the sender-intermediary resource tracking system. In response, the intermediary may place a hold on a certain amount of resources controlled by the intermediary party and tracked by an intermediary-receiver resource tracking system, which may also track resources controlled by the receiving party. When all of the resources for the transfer on both resource tracking systems have been put on hold for the transfer, the transfer may proceed. This can prevent partial transfers without the entire transfer going through. A condition for releasing the holds can be receiving a cryptographically signed statement from a trusted third party (a "trusted system") that has verified that appropriate the resources involved in the transfer on different resource tracking systems have been placed on hold and that the transfer may proceed. The trusted system can base this statement on verified messages from, for example, the resource tracking systems involved in the transfer (the sender-intermediary and intermediary-receiver resource tracking systems) that the amounts are on hold.

The trusted system may receive prepared transfer receipts (hold receipts) indicating that holds have been placed on the resources at both resource tracking systems in the transfer, and may send the resource tracking systems and the intermediary the signed message indicating that the transfer can proceed. The intermediary may send instructions to the intermediary-receiver resource tracking system to transfer the intermediary party's resources on which the hold was placed to the receiving party. The intermediary may also instruct the sender-intermediary resource tracking system to transfer the sending party's resources on which the hold was placed to the intermediary party. Because the hold conditions may have been fulfilled by the receiving of the signed message from the trusted system, the resource tracking systems may execute the transfers as instructed by the intermediary, and may send transfer confirmation receipts to the intermediary. The intermediary may notify the receiving party, for example, at a receiver computing device, or "receiver," and the sending party, at the sender, that the transfer was completed.

Another example of a condition that must be satisfied to release a hold on resources may be evidence that a certain transfer of resources has taken place. For example, in a single intermediary transfer chain, in response to receiving the prepared transfer receipt sent out by the sender-intermediary resource tracking system an intermediary may instruct the intermediary-receiver resource tracking system to transfer resources controlled by the intermediary party to the receiving party. The intermediary may receive a transfer confirmation receipt from the intermediary-receiver resource tracking system once the transfer is complete. This transfer confirmation receipt may be sent to the sender-intermediary resource tracking system as evidence that a destination transfer of resources from the intermediary party has taken place. This can fulfill the condition for releasing a hold on the sending party's resources at the sender-intermediary resource tracking system, allowing the sending party's resources to be transferred to the intermediary party. The intermediary may send a notification to the receiver and the sender that the transfer (from sender to receiver) was completed.

In some cases, there may be more than one intermediary, and the condition for the resource tracking system allowing the transfer of held resources may be a signed message from a trusted system. The trusted system may be any suitable centralized or decentralized system, such as, for example, consensus networks and simply independent signer nodes. The prepared transfer receipt sent out by the sender-intermediary resource tracking system may be received by the trusted system and by the intermediary. In response, the intermediary place a hold on resources its intermediary party controls at a resource tracking system between the intermediary party and the next intermediary party in the transfer chain. In a multi-intermediary transfer chain, a resource tracking system may be an intermediary-intermediary resource tracking system when it is between two intermediary parties. Two intermediaries in the transfer chain may both have access to a resource tracking system that tracks resources belonging to the intermediary party for each of the intermediaries. For example, a transfer chain may include a sender, intermediary A, intermediary B, intermediary C and a receiver. Such a transfer chain can also include intermediary A-intermediary B and intermediary B-intermediary C resource tracking systems.

When a party such as an intermediary places a hold on resources, the resource tracking system that tracks the held resources may send a prepared transfer receipt to a trusted system. The prepared transfer receipt may also be sent to the next intermediary in the transfer chain, a previous intermediary in the transfer chain, or the sender of the transfer chain, either directly or through the trusted system. The prepared transfer receipt can include an indication of the type and amount of resources held, the owner of the held resources, an identifier corresponding to the transfer in connection with which the resources are held, a time limit for the hold and/or other conditions that need to be satisfied for the hold to be released. Upon receiving the prepared transfer receipt, the next intermediary may also place a hold on resources its intermediary party controls at a next resource tracking system, resulting in another prepared transfer receipt, which may again be sent to yet another intermediary, until the last intermediary in the transfer chain is reached. The last intermediary in the transfer chain may place a hold on resources that its intermediary party controls at an intermediary-receiver resource tracking system between the last intermediary party and the receiving party, and send the prepared transfer receipt to the trusted system. The trusted system, having received prepared transfer receipts indicating that the appropriate resources are held at every resource tracking system in the transfer chain, may send out a signed message indicating that the transfer can proceed to all intermediaries and resource tracking systems in the transfer chain. All intermediaries (e.g., intermediaries A and B) in the transfer chain may then instruct the appropriate resource tracking systems to transfer the held resources to their intended destinations. For example, the amount on hold belonging to the sending party on the sender-intermediary A resource tracking system may be transferred to intermediary party A. Likewise, an amount on hold belonging to intermediary party A on the intermediary A-intermediary B resource tracking system may be transferred to intermediary party B. Intermediary B may instruct the intermediary B-receiver resource tracking system, which may be last resource tracking system in the transfer chain, to transfer the held resources of intermediary party to the receiving party. The transfers may be executed in any order, or all or in part simultaneously, as the condition for transferring held resources at each resource tracking system may have been fulfilled by the signed message from the trusted system. The sender and receiver may also be sent notifications that the transfer was completed from any suitable computing device or system involved in the transfer, including the trusted system and any of the intermediaries.

In some implementations, each intermediary may place a hold on resources that its intermediary party controls after receiving a message instructing that the hold be placed. The message may be, for example, a signed message from the trusted system, or a message from another intermediary. In such an implementation, the intermediaries may not need to receive a prepared transfer receipt before placing a hold on their respective intermediary party's resources.

In some situations, there may be more than one intermediary party and a condition for a resource tracking system allowing the transfer of held resources can be receiving a receipt indicating that a destination transfer of resources from that party has taken place. In that case, in response to receiving the prepared transfer receipt sent out by the sender-intermediary resource tracking system, the intermediary may place a hold on resources its intermediary party controls at a resource tracking system between the intermediary party and the next intermediary party, for example, an intermediary A-intermediary B resource tracking system. The hold may result in a prepared transfer receipt being sent to the next intermediary in the transfer chain. Upon receiving the prepared transfer receipt, the next intermediary may also place a hold on resources its intermediary party controls at a next resource tracking system, resulting in another prepared transfer receipt, which may again be sent to another intermediary, until the last intermediary in the transfer chain receives a prepared transfer receipt. The last intermediary in the transfer chain, may receive the prepared transfer receipt indicating that the preceding intermediary has placed a hold on resources at the resource tracking system between the preceding intermediary party and the last intermediary party. In response, the last intermediary in the transfer chain may instruct the resource tracking system between the last intermediary party and the receiving party, for example, a last intermediary-receiver resource tracking system, to transfer resources controlled by the last intermediary party to the receiving party. The resource tracking system between the intermediary party and the receiving party may perform the transfer, as the last intermediary party may be transferring resources that it controls, so no hold or other condition fulfillment of any condition may be necessary. This may be the destination transfer for the last intermediary party. The last intermediary may receive a transfer confirmation receipt from the last intermediary-receiver resource tracking system once the transfer has succeeded. This transfer confirmation receipt may be sent to the resource tracking system between the preceding intermediary party and the last intermediary party. The transfer confirmation receipt may be evidence that a destination transfer of resources from the last intermediary party has taken place, fulfilling the condition for allowing the source transfer of the preceding intermediary party's held resources to the last intermediary party. This may result in a transfer confirmation receipt being sent to the preceding intermediary, confirming the destination transfer for the preceding intermediary party. The preceding intermediary may send the transfer confirmation receipt to an appropriate resource tracking system and instruct that resource tracking system to perform the source transfer for the preceding intermediary party. The transfer confirmation receipt may be evidence that a destination transfer of resources from the preceding intermediary party has taken place, fulfilling the condition for allowing the source transfer of held resources to the preceding intermediary party. This source transfer may be the destination transfer for another intermediary party, and may generate another transfer confirmation receipt, which that intermediary party may then use as evidence to cause another resource tracking system to perform the source transfer for that intermediary party, and so on until the sender-intermediary resource tracking system is instructed to perform the source transfer for that intermediary party, transferring the sending party's resources. The last intermediary may instruct both its intermediary party's source and destination transfers, while every other intermediary in the transfer may instruct its intermediary party's source transfer upon receiving a transfer confirmation receipt confirming that intermediary party's destination transfer. The resource tracking systems in the transfer chain may transfer held resources in series, starting with the resource tracking system between the last intermediary party and the receiving party, for example, the last-intermediary-receiver resource tracking system, and ending with the resource tracking system between the sending party and an intermediary party, for example, the sender-intermediary resource tracking system. In some implementations, a resource tracking system may not transfer held resources if a resource tracking system closer in the transfer chain to the receiving party has not yet transferred held resources. The sender and receiver may also be sent a notification that the transfer was completed from any suitable computing device or system involved in the transfer, including the trusted system and any of the intermediaries. In some implementations, each intermediary party in a transfer chain may be a subcontractor. For example, a transfer chain may be constructed iteratively. The sending party may contact a first intermediary party that may agree to be responsible for the transfer of resources to the receiving party. The first intermediary party may then find a second intermediary party to act as a subcontractor, agreeing to be responsible for the transfer of resources from the first intermediary party to the receiving party. The second intermediary party may then find a third intermediary party to act as a subcontractor, and so on until an intermediary party that will directly transfer resources to the receiving party is subcontracted, completing the construction of the transfer chain.

In some implementations, an intermediary may instruct a resource tracking system to perform its source transfer at any time. For example, the intermediary may send an instruction to a resource tracking system between the intermediary and a preceding intermediary to perform the source transfer for the intermediary as soon as the intermediary receives an indication that the sender has authorized the transfer based on the quote. The resource tracking system may cache the instruction, and may only perform the transfer once a proper hold on the resources for the source transfer has been put in place, and the condition of that hold fulfilled by either the receiving of a signed message or the receiving of evidence, such as a transfer confirmation receipt, that the destination transfer was successful.

When resources are transferred to the receiving party, for example, on an intermediary-receiver resource tracking system, the transfer may include a notification to the receiving party indicating an identity of the sending party and/or an identification belonging to the particular transfer. This may allow the receiving party to determine the purpose of the received resources. For example, the received resources may be used to settle a debt owed to the receiving party by the sending party. To determine that the debt has been fulfilled, the transfer of resources may include, for example, an account number or other identifier associated with the sending party, so that the receiving party may apply the received resources to the debt of the sending party.

The sender may be a computing device or system used by a sending party, which may be any party who wishes to send, or transfer, resources under their control to some other party, for example, the receiving party. The sender may be used by, for example, any suitable person, group, organization, or computer hardware and software, and may be any suitable computing device or system. For example, the sender may a suitable computing device such as a laptop, used by person initiate a transfer of resources. The sender may be used by, for example, a person wishing to transfer currency to another person, business, or organization. The sender may be used by the sending party, or may be used on behalf of the sending party. For example, the sending party may be a person, and the sender may a bank computer system, which may be used to initiate a transfer of resources on behalf of the sending parting party. The sender may also be, for example, a server system used by a server management system running on the server system. The sender may be able to initiate a transfer by requesting a quote, for example, by sending communications over any suitable wired or wireless connection to an appropriate computing system or device for arranging a quote for a transfer. The connection may be a network connection, such as a WAN or LAN connection, or may be internal bus connection, for example, within a computing system. The sending party may use the sender to send out a request for a quote that may include a quantity they wish to transfer, a quantity they wish the receiver to receive, a type of resource to be transferred from the sending party, a type of resource to be received by the receiving party, and what conditions may be acceptable for the transfer.

The request for a quote may specify either the quantity of a resource the sending party wishes to send, or the quantity of a resource the sending party wishes for the receiving party to receive. For example, the sending party may wish to transfer money to a receiving party, and may have US dollars to transfer. The receiving party may expect to receive Euros. The sending party, when requesting a quote, may specify that it will send out a quantity of US dollars, and the receiving party will then receive some quantity of Euros based on exchange rates throughout the transfer and any fees that may be imposed on the transfer. The sending party may, alternatively, specify that the receiving party should receive some quantity of Euros, and the quote may include the quantity of US dollars the sending party will need to send out to ensure that the receiving receives the specified quantity of Euros, accounting for exchange rates and fees. As another example, a sending party may be offering to provide specific computational resources, such as processor cycles on a computing system controlled by the sending party, to a receiving party that wishes to receive a different computing resource, such as computer-readable storage space on a cloud-based storage system. Such a transfer may occur, for example, via an intermediary that provides a variety of computing resources, and thus is able to make use of and/or provide both processor time or cycles and storage space. Continuing the example, the sender may specify the quantity to be transferred either in processor operations or in an amount of storage. The quote will then provide the appropriate quantity of processor operations required from the sending party, taking into account the effective conversion factor between processor operations and storage space according to the intermediary.

Once the sender has received a quote, the sending party may accept the quote and authorize the transfer using the sender. The sender may authorize the transfer by, for example, sending a message to an appropriate system or computing device authorizing the placement of a hold on the resources the sending party will be transferring. The authorization may be sent, for example, to a trusted system or other system that may be responsible for coordinating the transfer, to an intermediary whose intermediary party has resources tracked by the same resource tracking system that tracks the resources the sending party wishes to send, or to the resource tracking system directly. Once the sender has sent out the authorization of the transfer, the sender may wait to receive notification that the transfer has succeeded or failed. The sending party may also use the sender to check the resource tracking system to verify the transfer of the sending party's resources.

A resource tracking system may be any suitable system for tracking resources owned by various parties, and for transferring resources between parties. A resource tracking system may be any suitable computing device or system, with any suitable combination of hardware and software, such as, for example, a system run by a financial institution, a hardware or software component of a server system or computing device, or a distributed system, such as, for example, a cryptocurrency ledger or blockchain which may exist on a number of different computing devices and be reconciled in a collaborative fashion, or may be centralized. A resource tracking system may track the ownership of resources for any number of parties. A party, such as, for example, a sending party, intermediary party, or receiving party, may have a resource pool on a resource tracking system. The resource pool for a party on a resource tracking system may include an identification of the party and quantities of each type of resource owned or controlled by the party and tracked by the resource tracking system. A party may have more than one resource type tracked by an individual resource tracking system For example, a resource tracking system that is a blockchain for a cryptocurrency may include a resource pool for each party, for example, individual or organization, which owns some quantity of the cryptocurrency. The resource pool may identify the owner of the cryptocurrency, for example, using a cryptographic public key stored with the resource pool, rendering the cryptocurrency accessible only to a party with the corresponding private key. The resource pool may also include the quantity of cryptocurrency. A resource tracking system for a financial institution may be a ledger, for example, hosted on a server system. The resource pools may be accounts owned by account holders at the financial institution, and may track the various assets owned by the account holder and tracked by the financial institution. For example, a resource pool for a party may include a type and quantity of one or more currencies and types and quantities of other types of assets, such as stocks, bonds, certificates of deposit, and the like. Alternatively or in addition, resource pools may include or record ownership of other resources, such as commodities or any resource that may be commoditized, finished physical goods, raw materials, computing resources, real property, or any other resource that may be owned by an entity and transferred from one entity to another. The account holder may be identified by any suitable information, and may need proof of identity, such as, for example, a username and password for the account, in order to access the account. A resource tracking system for a server system may be, for example, some suitable combination of hardware and software for tracking resources and ownership of those resources on the server system. For example, the resource tracking system for a server system may track computing resources such as storage space or processor time owned by various users of the server system, where the users may be physical individuals or organizations, or virtual users of a system, such as system accounts, or other processes running on the server system.

A resource tracking system may track any type of resource. For example, a resource may be a currency, cryptocurrency, financial instrument, commodity, or computational resource such as processor time, volatile and non-volatile storage space, and network bandwidth. The record of ownership and quantity of a resource by the resource tracking system may also be the resource itself, or may be a record of ownership of a resource that exists separately. For example, in a resource tracking system that is a blockchain for a cryptocurrency, the record of ownership for some quantity of the cryptocurrency may be the cryptocurrency. In a resource tracking system that tracks ownership of commodities, the record of ownership may correspond to physical resources, for example, gold, oil, or other commodities, that exist separately. Such resources may be transferred by transferring ownership, though the physical instantiation of the resource may not necessarily be moved.

A resource tracking system may be able to receive a proposed transfer. For example, when a sender requests and accepts a quote for a transfer, a resource tracking system to be involved in the transfer may receive a proposed transfer based on the quote accepted by the sender. The proposed transfer may indicate to the resource tracking system that certain resources are to be transferred from one resource pool, a source resource pool, of the resource tracking system, to another resource pool, a destination resource pool, of the resource tracking system. The proposed transfer may also indicate the type and quantity of resources to be transferred, as well as the conditions on which a hold on the resources to be transferred may be released and the transfer of resources may be effected. When a proposed transfer has been received, the resource tracking system may determine if an authorization to hold the resources being transferred is also present. If such a hold authorization is present, the resource tracking system may place the hold on the resources and send out a prepared transfer receipt. Otherwise, the resource tracking system may send out a proposed transfer receipt, and wait to receive the proper hold authorization for the transfer before sending out a prepared transfer receipt. Proposed and prepared transfer receipts may be sent to any suitable computing device or system, such as, for example, a trusted system, a coordinator of the transfer, or an intermediary for an intermediary party that may be the owner of the destination resource pool on the resource tracking system.

A resource tracking system may be able to place a hold on a resource. For example, a resource tracking system may receive authorization from the party that owns the resources tracked by the resource tracking system to place a hold on a specified quantity of a specified type of resource in connection with a transfer. The hold authorization may be sent along with a proposed transfer, or may arrive later, and may specify the proposed transfer to which it is connected.

The resource tracking system may place a hold on the specified quantity of the specified type of resource in the resource pool owned by the party that sent the hold authorization. The hold may prevent the transfer of the specified quantity of resources and/or a specific resources whose quantity is equal to the specified quantity unless and until the conditions of the hold are satisfied. For example, a hold may be placed on $20 of an account having a $100 balance. The hold may prevent $20 of the balance from being transferred until a message is received indicating that the condition of the hold has been fulfilled, ensuring that the account will always have at least $20 in it while the hold is in place. Similarly, for resources that may be distinct, such as where access to specific blocks of memory is to be transferred, the hold may prevent other transfers or uses of the particular resources unless and until the conditions of the hold are fulfilled. The hold may last for a certain time period. The time period may be any suitable time period, including seconds or fractions thereof, minutes, hours, or days. The resource tracking system may be able to release the hold on the resource when the time period expires. A hold may specify one or more conditions that must be satisfied to be released. For example, a hold may specify that a message be received from a third party indicating a level of trust associated with one or more counterparties before the hold can be released. Likewise, a hold may specify that a message be received from a third party indicating that the proposed transfer is compliant with relevant laws, regulations and/or rules.

A resource tracking system may automatically effect the transfer (i.e., cause the transfer to occur) of held resources from a source resource pool to a destination resource pool upon fulfillment of conditions associated with the hold, and the receiving of an instruction to execute the transfer. The conditions may be, for example, the receiving of a signed message from trusted system indicating that the transfer can proceed. For example, a resource tracking system may receive a signed message from a trusted system, in connection with a prepared transfer for which resources have been held. Upon receiving the signed message from the trusted system and an execute instruction sent out, for example, from a computing device, by the party which owns the destination resource pool for the prepared transfer, the resource tracking system may automatically transfer the held resources from the source resource pool to the destination resource pool. The conditions may be, for example, the receiving of a receipt that may be evidence that the destination transfer for the transfer, which may be a source transfer, has taken place on another resource tracking system. For example, a resource tracking system may receive a transfer confirmation receipt, which may be cryptographically signed, which may indicate that the party which owns the destination resource pool has had resources they own on another resource tracking system transferred on that resource tracking system to another party in the transfer chain. This may be evidence that the destination transfer for the source transfer has been completed. Upon receiving the transfer confirmation receipt and an execute instruction sent by a computing device used by the party which owns the destination resource pool for the prepared transfer, the resource tracking system may automatically transfer the held resources from the source resource pool to the destination resource pool. The conditions may be, for example, evidence that a smart contract is being executed. For example, the transfer chain may be set up in connection with a smart contract, and may be transferred upon execution of the smart contract. A signed message, for example, from the system executing the smart contract, may be received by a resource tracking system. Upon receiving the signed message indicating that the smart contract is being executed, the resource tracking system may automatically transfer the held resources from the source resource pool to the destination resource pool. The conditions may also be, for example, a digital signature confirming the occurrence of an event, such as the delivery of a physical package or goods by a delivery service.

When a transfer is completed, the resource tracking system may be able to send out a transfer confirmation receipt, indicating that the transfer of resources was successful. The transfer confirmation receipt may be sent to any suitable computing device or system, including, for example, a trusted system, a coordinator of the transfer, or a computing device or system used by any other party to the transfer, including, for example the party who owned the source resource pool for the transfer. A transfer confirmation receipt from a resource tracking system may be evidence that the destination transfer for a source transfer was completed, fulfilling transfer conditions at another resource tracking system.

A resource tracking system may effect the transfer of held resources by modifying the quantities of resources recorded as held by the parties who own the resource pools involved in the transfer For example, to transfer held resources from a source resource pool to destination resource pool, the resource tracking system may, simultaneously or sequentially, decrease the quantity of the resource recorded as owned by the party which owns the source resource pool and increase the quantity of the resource recorded as owned by the party which owns the destination resource pool. The quantity of the resource recorded in the source resource pool may be decreased by the same quantity that the quantity of the resource recorded in the destination resource pool is increased. This quantity may be, for example, the quantity of the resource on which the hold was placed, or may be a different quantity, for example, higher or lower, for example to account for positive or negative fees involved in the transfer. A resource tracking system may be able to increase and decrease the quantity of resources that are tracked in resource pools on the resource tracking system, and may only be able to transfer resources between two parties who both have resource pools on the resource tracking system. When held resources are transferred, the resource transfer system may transfer specific resources that were held, or may transfer an appropriate quantity of resources, which may or not include any specific resources that may have been held. For example, if a hold is place on 20 US dollars in an account with 100 US dollars, the hold may be placed on any 20 US dollars, or on specific US dollars, for example, US dollars 1-20. When the held US dollars are transferred, the resource tracking system may transfer specifically held dollars, for example, US dollars 1-20, or may transfer any 20 US dollars, for example, US dollars 11-30, or US dollars 81-100, or US dollars 51-60 and 75-84.

In some implementations, a resource tracking system may be able to transfer specific resources between resources tracking pools. For example, when transferring commodities, a resource tracking system may be able to transfer commodities held at a specific location between resource pools. The resource quantities for a resource with a physical instantiation may also indicate where the physical intention is located. For example, gold may be held at specific storage facility. The resource tracking system may transfer such resources by decrementing and incrementing in both resource pools a quantity of resource located in a particular location. For example, a resource pool may include gold stored at a storage facility and a storage facility B. The resource tracking system may transfer, to another resource pool, only gold from storage facility A. The resource tracking system may decrement the amount of gold recorded as stored at storage facility A in the source resource pool, and increase the amount of gold recorded as stored in storage facility A in the destination resource pool. Specific resources transferred by the resource tracking system may also include, for example, physical items of which there may be one or few copies, such as, for example, artwork including painting, sculptures, and prints, artifacts, collector's items such as sports memorabilia and comic books, jewelry, precious stones, and any other such item, or mass marketed goods, such as smartphones, foodstuffs, and so on.

The transfer of held resources from a source resource pool to a destination resource pool by the resource tracking system may be deterministic upon the fulfillment of the conditions associated with the hold and the receiving of an instruction to execute the transfer. The resource tracking system, as a computing device or system with any suitable combination of hardware and software, may always automatically effect the transfer of held resources on fulfillment of the conditions and the receiving of an instruction to execute the transfer, without the ability to interrupt or halt the transfer once the conditions are fulfilled and the instruction received. This may eliminate the risk that held resources will not be transferred even after the conditions associated with the hold are fulfilled and the instruction to transfer has been received, as the transfer may take place without intervention from outside parties, human or otherwise. This may ensure that any party that has resources transferred from it in a destination transfer and has received a transfer confirmation receipt may have resources transferred to it in a source transfer by sending transfer execute instruction and transfer confirmation receipt.

An intermediary may be a computing device or system used by any intermediary party who agrees to participate in a transfer, as part of the transfer chain between the sending party and the receiving party. The intermediary may be used by, for example, any suitable person, group, organization, or computer hardware and software, such as a program or process, and may be any suitable computing device or system. For example, the intermediary may be a person using a suitable computing device to participate in transfers, a computing system belonging to an exchange, financial institution, or trader, or may be, for example, part of a server management system running on a server system. The intermediary may be able to receive requests for quotes, and respond with quotes, for example, by sending communications over any suitable wired or wireless connection to an appropriate computing system or device that may be responsible for arranging the transfer chain from the sending party to the receiving party. The connection may be a network connection, such as a WAN or LAN connection, or may be internal bus connection, for example, within a computing system. The intermediary party use the intermediary to respond to quote requests with quotes that may include, for example, any limits on the quantity of resources the intermediary party may be able to transfer, and any exchange rate the intermediary party may use, and any fees that the intermediary party may extract during the transfer.

The intermediary may be able to receive proposed transfers. When a quote sent out by the intermediary has been accepted, for example, by the sending party using the sender, the intermediary may be added to the transfer chain between the sending party and the receiving party. The proposed transfer received by the intermediary may indicate only the portion of the overall transfer in which the intermediary will participate, including the resource tracking system on which the intermediary party will receive resources from another party, and the resource tracking system on which the intermediary party will transfer resources. The proposed transfer may also include identify the party to which the intermediary party will transfer resources, and the party the intermediary party will receive resources from. The proposed transfer may also include the conditions associated with the holds on resources that will be placed during the transfer. The intermediary may verify that that the conditions on the holds are either the receiving of a signed message from a computing device or system trusted by all of the parties participating in the transfer indicating that the transfer can proceed or that a source transfer of resources to a party may proceed upon receiving a receipt that may be evidence that a destination transfer of resources from that party has taken place. If the proposed transfer does not include either of these conditions on the holds, the intermediary may refuse to participate in the transfer.

The intermediary may be able to place a hold on resources controlled by the intermediary party at a resource tracking system. For example, if there is a trusted system, the intermediary may send an authorization to hold the intermediary party's resources to the resource tracking system that will transfer the intermediary's party resources once the proposed transfer has been received and verified. If there is no trusted system, the intermediary may send the authorization to hold the intermediary party's resources to the resource tracking system that will transfer the intermediary's party resources after receiving a prepared transfer receipt indicating that the resources that will be transferred to the intermediary party have been held at the resource tracking system that will transfer the resources to the intermediary party. This may allow the intermediary party to ensure that the resources for its source transfer are held and ready to be transferred before the intermediary party authorizes a hold on the resources for its destination transfer.

The intermediary party may be able to receive signed message from a trusted system and send execute instructions to resource tracking systems based on the receiving of the signed message. For example, the trusted system may send a signed message to all computing devices and systems in a transfer chain once it has received prepared transfer receipts from all resource tracking systems in the transfer chain. Upon receiving the signed message, the intermediary may send executions instructions to resource tracking systems. For example, the intermediary may send an execute instruction to resource tracking system on which the intermediary party and a party which has held resources to transfer to the intermediary party, have resource pools, causing the resources to be transferred to the intermediary party's resource pool. If there is also a resource tracking system at which the intermediary party and the receiving party have resource pools, the intermediary may send an execute instruction to that resource tracking system to transfer resources from the intermediary party to the receiving party. The resource tracking systems may perform the transfers automatically, as the signed message from the trusted system may have fulfilled the conditions for transferring any held resource and the execute instruction from the intermediary may have been received.

The intermediary may be able to send execute instruction to a resource tracking system based on the receiving of a prepared transfer receipt. For example, if there is no trusted system and the intermediary is the last intermediary in the transfer chain, the intermediary may send instructions to a resource tracking system between the intermediary party and the receiving party to execute a transfer of the intermediary party's resources to the receiving party upon receiving a prepared transfer receipt indicating that resources to be transferred to the intermediary party have been held at another resource tracking system. This may ensure that the intermediary only sends an instruction to transfer the intermediary party's resources to the receiving party, as the destination transfer for the intermediary party, when the resources that will be transferred to the receiving party, as the source transfer for the intermediary party, have been held.

The intermediary may be able to receive a transfer confirmation receipt from a resource tracking system and send the received transfer confirmation receipt to another resource tracking system. For example, if there is a trusted system, the intermediary may receive a transfer confirmation receipt for any transfers performed by resource tracking systems on instruction from the intermediary. If there is no trusted system, the intermediary may receive a transfer confirmation receipt from a resource tracking system on which a destination transfer for the intermediary party occurred, transferring resources from the intermediary party to another party, such as another intermediary party or the receiving party. The intermediary may then send the transfer confirmation receipt to a resource tracking system on which resources to be transferred to the intermediary party, from, for example, another intermediary party or the sending party, have been held, as the source transfer for the intermediary party. The intermediary may also send an instruction to execute the transfer to the resource tracking system along with the transfer confirmation receipt. The transfer confirmation receipt may fulfill the condition of the hold on the resources to be transferred to the intermediary party, so the instruction to execute the transfer may cause the resource tracking system to automatically transfer the held resources to the intermediary party.

The trusted system may be any suitable computing device or system that may be trusted by all of the parties and systems involved in a transfer chain between the sending party and the receiving party. For example, the trusted system may be associated with a financial institution or an exchange, a computing resource trading system, an energy exchange system or may be trusted process on a server system. The trusted system may be any computing device or system in the transfer chain, for example, one of the intermediaries, or may be a computing device or system outside of the transfer chain. The trusted system may also be a network, for example, an exchange network, which may include several intermediaries for several intermediary parties, all of which are trusted by the trusted by the trusted system. The trusted system may also be a decentralized consensus network. The trusted system may also be a group of independent servers that may verify the fulfillment of non-hold conditions, such as conditions related to smart contracts, and may provide signed messages to fulfill hold conditions on various resource tracking systems in the transfer chain.

The trusted system may be selected by, for example, the sending party, and may also be used by the sending party to receive a quote based on quotes from the intermediary parties and to coordinate the transfer across all of the parties and computing devices and systems in the transfer chain. The trusted system may be able to communicate with all computing devices and systems involved in the transfer chain in any suitable manner, such as through a network connection, although the trusted system may not need to be able to communicate with the receiver. The trusted system may receive proposed transfer receipts and prepared transfer receipts, and may be able to verify when all of the resource tracking systems in the transfer chain have sent prepared transfer receipts. Once all the prepared transfer receipts have received, the trusted system may signed a signed message, which may be, for example, cryptographically signed, to the intermediaries and resource tracking systems in the transfer chain. The signed message from the trusted system may fulfill the condition of the holds on resources at the resource tracking systems, and may cause the intermediary parties to send transfer execute instructions to the resource tracking systems, resulting in the resource tracking systems automatically transferring the held resources, completing the transfer across the transfer chain.

For example, a sending party may have an account at a financial institution that includes a quantity of US dollars. The sending party may accept a quote to send 100 US dollars to a receiving party, who may expect to receive Euros, involving a transfer chain with an intermediary party that has an account at the same financial institution as the sending party, and has an account at another financial institution where the receiving party also has an account. The sender, used by the sending party, may send a hold authorization to the resource tracking system, or ledger, of the financial institution at which the sending party has an account. The resource tracking system of the financial institution may also receive the proposed transfer, indicating that the resource tracking system should transfer 100 US dollars from the account of the sending party to the account of the intermediary party. The hold authorization sent by the sender may indicate that 100 US dollars are to be held in the sending party's account. The resource tracking system of the financial institution may place a hold on 100 US dollars in the account of the sending party, and may send out a prepared transfer receipt indicating the hold has been placed. The prepared transfer receipt may be sent to a trusted system, which may then send the prepared transfer receipt to the intermediary, or may be sent to a coordinator of the transfer and then to the intermediary, or directly to the intermediary.

If there is a trusted system, the condition of the hold of the 100 US dollars in the sending party's account may be the receiving of a signed message from the trusted system indicating that the transfer can proceed. The trusted system may receive the prepared transfer receipt from the resource tracking system of the financial institution where the sending party and intermediary party have accounts. The trusted system may then wait to receive another prepared transfer receipt from the resource tracking system of the financial institution at which the intermediary party and receiving party have accounts. Upon receiving the prepared transfer receipt indicating that the hold has been placed on the 100 US dollars in the sending party's account, the intermediary may send out an authorization of a hold on a quantity of Euros in the intermediary party's account at the resource tracking system of the financial institution where the intermediary party and receiving party have accounts. The hold may be for a quantity of Euros of equal value to 100 US dollars, depending on the exchange rate used by the intermediary, and adjusted for any fees. For example, if the intermediary uses an exchange rate of 1.10 US dollars to 1 Euro and a fee of 0.5%, the intermediary may place a hold on 90.46 Euros, with the condition of the hold being the receiving of the signed message from the trusted system indicating that the transfer can proceed. The resource tracking system, after receiving the authorization to hold the 90.46 Euros in the intermediary party's account, may send a prepared transfer receipt to the trusted system indicating that the 90.46 Euros have been held at the intermediary party's account. The trusted system may then send a signed message to the computing devices or system for all of the parties in the transfer chain, including the resource tracking systems and the intermediary, indicating that the transfer may proceed. In some implementations, the trusted system may not send the signed message to the sender and receiver. The intermediary may send an instruction to execute transfers to both resources tracking systems in the transfer chain, which, combined with the signed message from the trusted system, may fulfill the conditions of the holds on both the 100 US dollars and the 90.46 Euros. The resource tracking system at the financial institution at which the sending party and intermediary party have accounts may automatically transfer the held 100 US dollars from the sending party's account to the intermediary party's account, for example, decreasing the sending party's account by 100 US dollars and increasing the intermediary party's account by 100 US dollars. The resource tracking system at the financial institution at which the intermediary party and receiving party have accounts may automatically transfer the held 90.46 Euros from the intermediary party's account to the sending party's account, for example, decreasing the intermediary party's account by 90.46 Euros and increasing the receiving party's account by 90.46 US dollars. The receiver may receive transfer confirmation receipts from both resource tracking systems, and notification of the completion of the transfer may be sent to the sender and to the receiver.

If there is no trusted system, the condition of the hold of the 100 US dollars in the sending party's account may be the receiving of evidence that a destination transfer has occurred at another resource tracking system, for which the transfer of the 100 US dollars from the sending party to the intermediary party may serve as the source transfer. The destination transfer may be, for example, the transfer of Euros from the intermediary party to the receiving party by the resource tracking system at the financial institution at which both the intermediary party and receiving party have accounts. Upon receiving the prepared transfer receipt indicating that the 100 US dollars have been held, the intermediary may send an instruction to the resource tracking system at the financial institution where both the intermediary party and receiving party have accounts to transfer Euros from the account of the intermediary party to the account of the receiving party. Because no hold has been placed on the Euros, no condition may need to be met for their transfer so long as their owner, the intermediary party, has instructed the transfer. The instruction sent by the intermediary may indicate that 90.46 Euros should be transferred from the intermediary party's account to the receiving party's account. The resource tracking system that receives the instruction may complete the transfer, for example, decreasing the intermediary party's account by 90.46 Euros, and increasing the receiving party's account by 90.46 Euros. The receiver may be notified of the transfer. Completion of the transfer of the 90.46 Euros may result in a transfer confirmation receipt being sent to the intermediary. The intermediary may then send the transfer confirmation receipt to the resource tracking system of the financial institution at which the sending party and the intermediary party have accounts. The transfer confirmation receipt may be evidence that the destination transfer, the transfer of the 90.46 Euros, for the source transfer, the transfer of the 100 US dollars, has been completed. The resource tracking system may, upon receiving an instruction from the intermediary to transfer the 100 US dollars, determine that the conditions on the hold of the 100 US dollars have been fulfilled, and may automatically transfer the 100 US dollars, for example, decreasing the sending party's account by 100 US dollars, and increasing the intermediary party's account by 100 US dollars. The intermediary may receive a transfer confirmation receipt, and the sender may be notified that the transfer was completed.

For example, a sending party may have an account at a first bank that includes a quantity of US dollars. The account may be recorded on the first bank's ledger. The sending party may owe a receiving party 100 Euros. The sending party may send out a request for a quote. The request may specify that the sending party will be transferring US dollars, and that the receiving party will need to receive 100 Euros. The quote request may be sent to various traders to obtain quotes, and a transfer chain and may be assembled from their quotes. The sending party may receive a quote which may be assembled from the quotes of the traders that are part of the transfer chain, and may specify how many US dollars the sending party will have to transfer, and the trader to whom the US dollars will be transferred, in order for the receiving party to receive 100 Euros. For example, if total transfer costs across the transfer chain are 1.5% of the amount to be received by the receiving party, and the exchange rate is 1.10 US dollars per 1 Euro, the sending party may need to transfer out 111.65 US dollars for the receiving party to receive 100 Euros. During the transfer, 1.65 US dollars, or 1.5% of the 110 US dollars needed to ensure the receiving party receives 100 Euros, may be kept by the first trader and the second trader in total as transfer costs.

The transfer chain may include a first trader, which may have an account in US dollars at the first bank and a cryptocurrency account on decentralized ledger and a second trader, which may have a cryptocurrency account on the decentralized ledger and an account in Euros at a second bank, recorded on the second bank's ledger. The receiving party may also have an account in Euros in the second bank. The cryptocurrency may be converted into dollars at an exchange rate of 1000 units per 1 US dollar.

The first trader, second trader, first bank, decentralized ledger, and second bank may each receive a separate proposed transfer. The proposed transfers may be received before, after, or in conjunction with a hold authorization sent by the sending party to the first bank, indicating that the send party has accepted the quote and initiated the transfer across the transfer chain. The proposed transfers may include the conditions on any holds placed by the first bank, decentralized ledger, and second bank. The hold conditions may be either the receiving of a signed message from a trusted system, or the receiving of evidence that a destination transfer was completed.

The proposed transfer received by the first bank may indicate that the first bank will receive a hold on 111.65 US dollars in the sending party's account, place the hold once authorization is received from the sending party, and transfer the 116.50 US dollars to the first trader's account when the hold condition is fulfilled and instructions are received from the first trader.

The proposed transfer received by the first trader may indicate that the first trader will receive 111.65 US dollars into its account at the first bank, as a source transfer, and will authorize a hold on 110,770 units of cryptocurrency in its account on the decentralized ledger to be transferred to the second trader, as a destination transfer, accounting for a transfer cost of 0.08% of 110 US dollars.

The proposed transfer received by the decentralized ledger may indicate that the decentralized ledger will receive a hold on 110,770 units of cryptocurrency in the first trader's account, place the hold once authorization is received from the first trader, and transfer the 110,770 units to the second trader's account when the hold condition is fulfilled and instructions are received from the first trader.

The proposed transfer received by the second trader may indicate that the second trader will receive 110,770 units of cryptocurrency from the first trader, as a source transfer, and will either authorize a hold on 100 Euros in it account at the second bank to be sent to the receiving party or instruct the second bank to transfer 100 Euros from its account to the receiving party's account without a hold, as a destination transfer, in both cases accounting for a transaction cost of 0.07% of 110 US dollars.

The proposed transfer received by the second bank may indicate that the second bank will either receive a hold on 100 Euros in the second trader's account, place the hold once authorization is received from the second trader, and transfer the 100 Euros to the receiving party's account when the hold condition is fulfilled and instructions are received from the first trader, or will transfer 100 Euros from the second trader's account to the receiving party's account when instructions are received from the second trader without placing any hold.

The sending party may send a hold authorization to the first bank's ledger, authorizing the first bank to place a hold on 111.65 US dollars in the sending party's account in conjunction with the proposed transfer. The hold authorization may be a cryptographically signed message from the sending party. The first bank's ledger, upon receiving the hold authorization, may place the hold on 111.65 US dollars in the sending party's account on the first bank's ledger, and may send out a prepared transfer receipt indicating that the hold has been placed on 111.65 US dollars in the sender's account at the first bank.

The first trader may receive the prepared transfer receipt that was sent out by the first bank's ledger. This may indicate to the first trader that the 111.65 US dollars that will be transferred to it have been held in the sending party's account at the first bank. The first trader may send a hold authorization to the decentralized ledger, authorizing the decentralized ledger to place a hold on 110,770 units of cryptocurrency in the first trader's account in conjunction with the proposed transfer. The decentralized ledger, upon receiving the hold authorization, may place the hold on 110,770 units of cryptocurrency in the first trader's account, and may send out a prepared transfer receipt indicating that the hold has been placed on 110,770 units of cryptocurrency in first trader's account at the decentralized ledger.

The second trader may receive the prepared transfer receipt that was sent out by the decentralized ledger. This may indicate to the second trader that the 110,770 units of cryptocurrency that will be transferred to it have been held in the first trader's account at the decentralized ledger.

If there is a trusted system, and the condition of the holds as indicated in the proposed transfers is the receiving of a signed message from the trusted system, the second trader may send a hold authorization to the second bank's ledger, authorizing the second bank to place a hold on 100 Euros in the second trader's account in conjunction with the proposed transfer. The second bank's ledger, upon receiving the hold authorization, may place the hold on 100 Euros in the second trader's account, and may send out a prepared transfer receipt indicating that the hold has been placed on 100 Euros in the second trader's account at the second bank.

The trusted system may receive the prepared transfer receipts from the first bank's ledger, the decentralized ledger, and the second bank's ledger. The trusted system may confirm that the proper quantities of the proper asset types have been held at each ledger in the transfer chain. The trusted system may then send the signed message to the first bank's ledger, the first trader, the decentralized ledger, the second trader, and the second bank's ledger.

The signed message may fulfill the conditions on each of the holds at each of the ledgers, and may cause the first trader to send an execute instruction to the first bank's ledger and the second trader to send an execute instruction to the decentralized ledger and to the second bank's ledger. The first bank's ledger, upon receiving the signed message from the trusted system and execute instruction from the first trader, may release the hold on 111.65 US dollars in the sending party's account and transfer 111.65 US dollars out of the sending party's account and into the first trader's account. The decentralized ledger, upon receiving the signed message from the trusted system and the execute instruction from the second trader, may release the hold on 110,770 units of cryptocurrency in the first trader's account and transfer 110,770 units of cryptocurrency out of the first trader's account and into the second trader's account. The second bank's ledger, upon receiving the signed message from the trusted system and execute instruction from the second trader, may release the hold on 100 Euros in the second trader's account and transfer 100 Euros out of the sending party's account and into the receiving party's account. Each ledger may send out a transfer confirmation receipt, which may be used to confirm a successful transfer.

If there is no trusted system, and the condition of the holds as indicated in the proposed transfers is the receiving of a evidence that destination transfer was completed, the second trader may, upon receiving the prepared transfer receipt from the decentralized ledger, send an execute instruction to the second bank's ledger to cause 100 Euros to be transferred from the second trader's account to the receiving party's account. The second bank's ledger, upon receiving the execute instruction from the second trader, may execute the transfer, taking 100 Euros from the second trader's account and adding 100 Euros to the receiving party's account. The second bank's ledger may send out a transfer confirmation receipt, which may indicate the success of the transfer of the 100 Euros from the second trader to the receiving party.

The second trader may receive the transfer confirmation receipt, and may send the transfer confirmation receipt and an execute instruction to the decentralized ledger. The transfer confirmation receipt may indicate to the decentralized ledger that the destination transfer of 100 Euros from the second trader to the receiving party was completed successfully, fulfilling the hold on 110,770 units of cryptocurrency in the first trader's account. The decentralized ledger may release the hold on 110,770 units of cryptocurrency in the first trader's account, and may transfer 110,770 units of cryptocurrency out of the first trader's account and into the second trader's account. The decentralized ledger may send out a transfer confirmation receipt, which may indicate the success of the transfer of the 110,770 units of cryptocurrency from the first trader to the second trader.

The first trader may receive the transfer confirmation receipt, and may send the transfer confirmation receipt and an execute instruction to the first bank's ledger. The transfer confirmation receipt may indicate to the first bank's ledger that the destination transfer of 110,770 units of cryptocurrency from the first trader to the second trader was completed successfully, fulfilling the hold on 111.65 US dollars in the sending party's account. The first bank's ledger may release the hold on 111.65 US dollars in the sending party's account, and may transfer 111.65 US dollars out of the sending party's account and into the first trader's account. The first bank's ledger may send out a transfer confirmation receipt, which may indicate the success of the transfer of the 111.65 US dollars from the sending party to the first trader.

In this way, the sending party may send out 111.65 US dollars, and the receiving party may receive 100 Euros. The first trader may keep a transfer fee of 0.88 US dollars, as it may receive 111.65 US dollars, and may transfer out 110,770 units of cryptocurrency, worth 110.77 US dollars. The second trader may keep a transfer fee of 0.77 US dollars in the form of 770 units of cryptocurrency, as it may receive 110,770 units of cryptocurrency, worth 110.77 US dollars, and may transfer out 100 Euros, worth 110 US dollars.

Each intermediary party may, as part of the quote sent from its intermediary, request a guaranteed minimum transfer. The guaranteed minimum transfer may indicate some minimum quantity of resources that will be transferred to the intermediary party in the event that the transfer fails. The guaranteed minimum may be based on, for example, how trustworthy the requester of the quote, or sending party, is to the intermediary party, what percent of the intermediary party's resources may need to have a hold placed on them during the transfer, and a lock timeout the intermediary is requesting for the transfer. The guaranteed minimum transfer may ensure that, if the transfer fails, for example, due to malicious action by the sending party, the intermediary party may be compensate for having placed a hold its resources and therefore being unable to use them for the period of time before the transfer failed. Each intermediary party in a transfer chain may have a smaller guaranteed minimum transfer than the preceding intermediary party, as each intermediary party may request a shorter lock timeout than the preceding intermediary party, and each intermediary party may need to cover the minimum guaranteed transfer that may be required by all subsequent intermediary parties in the transfer chain.

A guaranteed minimum transfer may occur when a transfer fails and holds on resources are rolled back. For example, the sending party may, using the sender, request and approve a quote, setting up a transfer. After placing a hold on the sending party's resources at a sender-intermediary resource tracking system, in preparation for transferring the resources to an intermediary party, the sender may send a cancellation message to the resource tracking system, cancelling the transfer and removing the hold on the sending party's resources. The resource tracking system may be aware of the guaranteed minimum transfer, and may release the hold on the portion of the sending party's resources that are not covered by the guaranteed minimum. In this way, the intermediary may still send an execute instruction to the resource tracking system to have the guaranteed minimum of the sending party's resources transferred to the intermediary party. Similarly, if there are other intermediary parties involved in the transfer, those parties may claim a guaranteed minimum transfer from the held resources of a preceding intermediary party. The guaranteed minimum transfer for an intermediary party may cover both the resources the intermediary party wishes to claim as a guaranteed minimum, and the resources that succeeding intermediary parties will claim as a guaranteed minimum. In this way, all intermediary parties in a transfer may claim some resources from the sending party when the transfer fails, preventing a malicious sending party from purposefully setting up multiple failed transfers to tie up resources belonging to the intermediary parties.

As used herein a hold (or "lock") timeout refers to a specified amount of time that an intermediary will agree to have its resource held at a resource tracking system. If the transfer from the sending party to the receiving party does not complete before a lock timeout expires, the hold on the resources may be released, and the transfer may fail. The lock timeout may be short when there is no trusted system, which may prevent a malicious actor from tying up resources held by intermediary parties for long periods of time. When there is a trusted system, the lock timeout may be long, for example, days, or unlimited, as all parties may trust the trusted system and therefore be less worried about the risk posed by malicious actors. The lock timeouts in a transfer chain may be specified by the requestor of the quote, for example, the sending party or by a coordinator of the transfer. Intermediaries may also advertise their acceptable lock timeouts for transfers on various resource tracking systems.

Any number of resource types may be used between the sending party and the receiving party. For example, a transfer may involve three intermediaries for three intermediary parties. The sending party may transfer US dollars to the first intermediary party on a first resource tracking system at which the sending party and first intermediary party have resource pools. The first intermediary party may transfer a cryptocurrency to the second intermediary party on a second resource tracking system at which the first intermediary party and the second intermediary party have resource pools. The second intermediary party may transfer a commodity, for example, oil, to the third intermediary party on a third resource tracking system on which both the second intermediary party and the third intermediary party have resource pools. The third intermediary party may transfer Euros to the receiving party on a fourth resource tracking system on which both the third intermediary party and the receiving party have resource pools. In this way, the sending party may use US dollars to send Euros to the receiving party.

For each transfer, the value of the resource transferred by a party, in the destination transfer for the party, may be different from than the value of the resource that was transferred to that party, in the source transfer for the party. For example, the value of cryptocurrency transferred from the first intermediary party to the second intermediary party may be less than the value of the US dollars transferred to the first intermediary party from the sending party. The difference in value may be, for example, a transfer cost or fee imposed by the intermediary party on the transfer. Likewise, the value of the oil transferred by the second intermediary party to the third intermediary party may be less than the value of the cryptocurrency transferred to the second intermediary party by the first intermediary party. The quotes provided by intermediary parties may include any fees or transfer costs, and the sending party may determine the quantity of its resources that will be held based on these fees or transfer cost and the value of the resources the sending party intends for the receiving party to receive. The transfer costs or fees may be zero, or may be negative, for example, resulting in a party transferring resources of greater value than the resources the party has transferred to it.

A transfer may be initiated by parties other than the sending party. For example, the receiving party may use the receiver to initiate a pull transfer. In a pull transfer, the receiver may request, receive, and accept a quote, and may then obtain the sending party's authorization to hold the sending parties resources to initiate the transfer. The sending party may be obligated to authorize the hold on its resources, and the hold authorization may be automatically sent from the sender upon request from the receiver. A transfer may also be initiated by a party that is not the sending party or receiving party. For example, the sending party and receiving party may have agreed to a smart contract, which may be a computer-based contract that uses any suitable combination of hardware and software to determine when contract conditions have been met and execute the terms of the contract. For example, the smart contract may specify that when a condition is met, the sending party will transfer 100 US dollars in Euros to the receiving party. Upon detecting that the condition has been met, the computing device or system on which the smart contract is hosted may request, receive, and accept a quote for a transfer of 100 US dollars in Euros from the sending party to the receiving party. The smart contract's computing device may be able to place a hold on the sending party's resources, the 100 US dollars, to initiate the transfer, or may otherwise be able to compel the sender to automatically send out such a hold authorization.

A transfer chain may include parallel paths. For example, a sending party may wish to transfer a large quantity of resources to the receiving party. There may be no suitable intermediary party that, by itself, controls enough resources on a resource tracking system on which the receiving party has a resource pool to make the transfer to the receiving party. The transfer chain may be set up with parallel paths, so that the sending party transfers resources to more than one intermediary party, and the receiving party receives resources from more than one more intermediary. The sending party may transfer resources to intermediary parties on the same resources tracking system, on which all parties have a resource pool, or on separate resource tracking systems. Likewise, the receiving party may receive resources on a resource tracking system on which the receiving party, and all parties transferring resources to the resource pool of the receiving party, have a resource pool, or on separate resource tracking systems. Because the paths may be parallel, it may be possible for the transfer across one of the paths to fail while the transfer on other paths succeeds.

For example, a sending party may wish to transfer 1,000,000 US dollars, in Euros, to a receiving party. No single intermediary party may have enough Euros in a resource pool on a resource tracking system on which the receiving party has a resource pool to complete this transfer. Parallel paths may be set up in the transfer chain, for example, with a first path through a first intermediary for a first intermediary party that has 600,000 US dollars' worth of Euros in a resource pool on the resource tracking system between the first intermediary party and the receiving party, and a second path through a second intermediary for a second intermediary party that has 400,000 US dollars' worth of Euros in a resource pool on the same resource tracking system. Transfers along with the first and second path may execute in parallel. For example, the sender may send a hold authorization for 1,000,000 US dollars to a resource tracking system on which the sending party, first intermediary party, and second intermediary party all have resource pools. The hold authorization may indicate that 600,000 US dollars are being held for the first intermediary party, and 400,000 US dollars are being held for the second intermediary party. Prepared transfer receipts may be sent to the first intermediary and the second intermediary. Upon receipt of the prepared transfer receipts, the first intermediary may send an execute instruction to the resource tracking system on which the first intermediary party has 600,000 US dollars' worth of Euros, transferring those Euros to the receiving party's resource pool, and the second intermediary may send an execute instruction to the same resource tracking system, transferring 400,000 US dollars' worth of Euros to the receiving party's resource pool. Both the first intermediary and second intermediary may receive transfer confirmation receipts, which they may send to the resource tracking system at which the sending party's 1,000,000 US dollars are on hold, along with execute instructions. The transfer confirmation receipts may fulfill the condition of the hold of the 1,000,000 US dollars', and the execute instruction may result in the resource tracking system transferring 600,000 US dollars to the first intermediary party's resource pool, and 400,000 US dollars' to the second intermediary party's resource pool, completing the transfer. If one of the parallel paths fails, for example, the second intermediary does not execute the transfer to the receiving party, the other path may still succeed, for example, the first intermediary may still execute the transfer to the receiving party, receive a transfer confirmation receipt, and use the transfer confirmation receipt to fulfill the condition of the hold of 600,000 of the 1,000,000 US dollars controlled by the sending party, resulting in the transfer of 600,000 US dollars to the resource pool of the first intermediary.

The resources involved in a transfer may be computational resources, such as, for example, processing time on CPUs, GPUs, cryptographic processors, or other general or specialized processor types, storage, either permanent or on a rental basis, including non-volatile storage such as magnetic platter based HDD's, Solid State Disks, and other forms of non-volatile flash memory, and volatile memory such as caches and RAM, and bandwidth, including, for example, total amount of incoming and outgoing network traffic and maximum speeds for incoming and outgoing network traffic. For example, a sending party may have an account on a server system that includes a quantity of processor time the sending party may be entitled to use on the server system. The sending party may be, for example, a user or organization with an account on the server system, or may be a process or program running on the server system, which may or not have its own user account on the server system, but may have separately tracked resources which it may use on the server system. The sending party may accept a quote to send 12 months of 1 Terabyte of SSD storage to a receiving party, who may expect to receive CPU processing time, involving a transfer chain with an intermediary party that has an account on the same server system as the sending party, and has an account at another server system where the receiving party also has an account. The sender, used by the sending party, may send a hold authorization to the resource tracking system of the server system at which the sending party has an account. The resource tracking system of the server system may also receive the proposed transfer, indicating that the resource tracking system should transfer 12 months of 1 TB of SSD storage from the account of the sending party to the account of the intermediary party. The hold authorization sent by the sender may indicate that 12 months of 1 TB of SSD storage are to be held in the sending party's account. The resource tracking system of the server system may place a hold on the 12 months of 1 TB of SSD storage in the account of the sending party, and may send out a prepared transfer receipt indicating the hold has been placed. The prepared transfer receipt may be sent to a trusted system, which may then send the prepared transfer receipt to the intermediary, or may be sent to a coordinator of the transfer and then to the intermediary, or directly to the intermediary.

If there is a trusted system, the condition of the hold of the 12 months of 1 TB of SSD storage in the sending party's account may be the receiving of a signed message from the trusted system indicating that the transfer can proceed. The trusted system may receive the prepared transfer receipt from the resource tracking system of the financial institution where the sending party and intermediary party have accounts. The trusted system may then wait to receive another prepared transfer receipt from the resource tracking system of the financial institution at which the intermediary party and receiving party have accounts. Upon receiving the prepared transfer receipt indicating that the hold has been placed on the 12 months of 1 TB of SSD storage in the sending party's account, the intermediary may send out an authorization of a hold on a quantity of CPU processing time in the intermediary party's account at the resource tracking system of the financial institution where the intermediary party and receiving party have accounts. The hold may be for a quantity of CPU processing of equal value to 12 months of 1 TB of SSD storage, depending on the exchange rate used by the intermediary, and adjusted for any fees. For example, if the intermediary uses an exchange rate of 1 TB/month of SSD storage for 600 hours of CPU processing time, and a fee of 0.5%, the intermediary may place a hold on 7164 hours of CPU processing time, with the condition of the hold being the receiving of the signed message from the trusted system indicating that the transfer can proceed. The resource tracking system, after receiving the authorization to hold the 7164 hours of CPU processing time in the intermediary party's account, may send a prepared transfer receipt to the trusted system indicating that the 7164 hours of CPU processing time have been held at the intermediary party's account. The trusted system may then send a signed message to the computing devices or system for all of the parties in the transfer chain, including the resource tracking systems and the intermediary, indicating that the transfer may proceed. In some implementations, the trusted system may not send the signed message to the sender and receiver. The intermediary may send an instruction to execute transfers to both resources tracking systems in the transfer chain, which, combined with the signed message from the trusted system, may fulfill the conditions of the holds on both the 12 months of 1 TB of SSD storage and the 7164 hours of CPU processing time. The resource tracking system at the server system at which the sending party and intermediary party have accounts may automatically transfer the held 12 months of 1 TB of SSD storage from the sending party's account to the intermediary party's account, for example, decreasing the sending party's account by 12 months of 1 TB of SSD storage and increasing the intermediary party's account by 12 months of 1 TB of SSD storage. The resource tracking system at the server system at which the intermediary party and receiving party have accounts may automatically transfer the held 7164 hours of CPU processing time from the intermediary party's account to the sending party's account, for example, decreasing the intermediary party's account by 7164 hours of CPU processing time and increasing the receiving party's account by 7164 hours of CPU processing time. The receiver may receive transfer confirmation receipts from both resource tracking systems, and notification of the completion of the transfer may be sent to the sender and to the receiver.

If there is no trusted system, the condition of the hold of the 12 months of 1 TB of SSD storage in the sending party's account may be the receiving of evidence that a destination transfer has occurred at another resource tracking system, for which the transfer of the 12 months of 1 TB of SSD storage from the sending party to the intermediary party may serve as the source transfer. The destination transfer may be, for example, the transfer of CPU processing time from the intermediary party to the receiving party by the resource tracking system at the server system at which both the intermediary party and receiving party have accounts. Upon receiving the prepared transfer receipt indicating that the 12 months of 1 TB of SSD storage have been held, the intermediary may send an instruction to the resource tracking system at the server system where both the intermediary party and receiving party have accounts to transfer CPU processing time from the account of the intermediary party to the account of the receiving party. Because no hold has been placed on the CPU processing time, no condition may need to be met for their transfer so long as their owner, the intermediary party, has instructed the transfer. The instruction sent by the intermediary may indicate that 7164 hours of CPU processing time should be transferred from the intermediary party's account to the receiving party's account. The resource tracking system that receives the instruction may complete the transfer, for example, decreasing the intermediary party's account by 7164 hours of CPU processing time, and increasing the receiving party's account by 7164 hours of CPU processing time. The receiver may be notified of the transfer. Completion of the transfer of the 7164 hours of CPU processing time may result in a transfer confirmation receipt being sent to the intermediary. The intermediary may then send the transfer confirmation receipt to the resource tracking system of the server system at which the sending party and the intermediary party have accounts. The transfer confirmation receipt may be evidence that the destination transfer, the transfer of the 7164 hours of CPU processing time, for the source transfer, the transfer of the 12 months of 1 TB of SSD storage, has been completed. The resource tracking system may, upon receiving an instruction from the intermediary to transfer the 12 months of 1 TB of SSD storage, determine that the conditions on the hold of the 100 US dollars have been fulfilled, and may automatically transfer the 12 months of 1 TB of SSD storage, for example, decreasing the sending party's account by 12 months of 1 TB of SSD storage, and increasing the intermediary party's account by 12 months of 1 TB of SSD storage. The intermediary may receive a transfer confirmation receipt, and the sender may be notified that the transfer was completed.

The transfer of computational resources across accounts on different server systems may allow, for example, the trading of owned computational resources between parties that use different cloud computing platforms. It may also allow a party that has accounts on separate cloud computing platforms to use computational resources it controls on the server system of one of the cloud computing platforms to obtain computational resources for its account on a server system for a different cloud computing platform. In this case, the same party may be both the sending party and receiving party, as it may control both accounts at both server systems, and may be using the intermediary to facilitate the obtaining of computational resources on one server system using computational resources on another server system.

The resources in a transfer may also be, for example, of computational resources from any computational device connected to a network such as the Internet, outputs from small scale manufacturing and 3D printing devices, shares of time on smart devices, such as, for example, vehicles, and shipped physical goods. Shipped physical goods may be, for example, physical gold, or other real commodities or items. A hold on shipped physical goods may be enforced by, for example, a delivery service that effects the delivery of the physical goods.

Communication between the computing devices and systems for the parties may occur directly, for example, between any of the sender, the intermediaries, the receiver and the resource tracking systems, or may be routed in any suitable manner. For example, communications may be routed through a trusted system, or through a transfer coordinator which may not be a trusted system, but may coordinate the transfer process. The transfer coordinator may be any suitable computing device or system that may be part of the transfer chain, such as, for example, an intermediary, or may be outside of the transfer chain. Communications may occur directly using any suitable communications protocols, such as, for example, HTTPS. In some implementations, instead of messages being sent by one computing device or system to another, a computing device or system may check for a message on another computing device or system. For example, if there is a trusted system for a transfer chain, the other computing devices and systems in the transfer chain may be able to check the trusted system for messages, such as, for example, the signed message indicating that a transfer may proceed, rather than waiting for the trusted system to send out the message.

All communication between the computing devices and systems for the parties, including proposed transfers, execute instructions for transfers, signed messages from trusted systems, proposed and prepared transfer receipts, and transfer confirmation receipts, may be cryptographically signed. For example, a communication may be cryptographically signed with a private key held by a party sending the communication, and verified with a corresponding public key held by a party receiving the communication, in order to confirm that the communication is valid. This may ensure that only parties involved in a transfer chain are able to communicate, preventing a malicious party from inserting communications into the transfer chain. Communications may also use symmetric encryption, or a shared secret or token between the communicating computing devices and systems.

FIG. 1 shows an example system suitable for a resource transfer system according to an implementation of the disclosed subject matter. An intermediary computing device 100 may include an executor 110, a quote generator 120, and a storage 140. The intermediary computing device 100 may be any suitable computing device, such as, for example, a computer 20 as described in FIG. 21, or component thereof, for implementing the executor 110, the quote generator 120, and the storage 140. The intermediary computing device 100 may be a single computing device, or may include multiple connected computing devices, and may be, for example, a laptop, a desktop, an individual server, a server farm, or a distributed server system, or may be a virtual computing device or system. The intermediary computing device 100 may be part of a computing system and network infrastructure, or may be otherwise connected to the computing system and network infrastructure. The executor 110 may be any suitable combination of hardware and software on the intermediary computing device 100 for verifying the conditions on a proposed transfer, sending out a hold authorization allowing resources owned by the intermediary party to be held, and determining when an execute instruction may be issued to effect a transfer, based on receipts and messages in the storage 140, and for sending out the execute instruction. The quote generator 120 may be any suitable combination of hardware and software on the intermediary computing device 100 for receiving a quote request, and generating and sending out a quote in response to the quote request. The storage 140 may store receipts and other messages, such as a proposed transfer message 142, a prepared transfer receipt 144, a transfer confirmation receipt 146, or a signed message 148 from a trusted system, in any suitable manner. The intermediary computing device 100 may be an intermediary used by an intermediary party, such as, for example, a trader, exchange, or user of a server system.

The executor 110 may be any suitable combination of hardware and software for verifying conditions on a proposed transfer 142, sending out a hold authorization allowing resources owned by the intermediary party to be held based on a prepared transfer receipt 144, determining when an execute instruction may be issued to effect a transfer based on a prepare transfer receipt 144, a transfer confirmation receipt 146 or signed message 148, and for sending out the execute instruction, for example, to a resource tracking system. The executor 110 may be able to receive a proposed transfer 142 from the storage 140. The proposed transfer 142 may include an indication of a source transfer and destination transfer involving resources owned by the intermediary party that uses the intermediary computing device 100, for example, as part of a quote sent out by the intermediary party and accepted by a sending party. The executor 110 may be able to determine if the conditions on the hold for resources for a source transfer and destination transfer in the proposed transfer 142 are the same, for example, the receiving of a signed message 148 from a trusted system, or if the source transfer is conditioned on receiving a transfer confirmation receipt 146 indicating the destination transfer has succeeded. If either is determined to be true, the executor 110 may be able to accept the proposed transfer 142. The executor 110 may also be able to determine if a proposed transfer includes the transfer costs or fees, guaranteed minimum transfer, and lock timeouts sent out by the intermediary computing device 100 in response to the quote request, and reject the proposed transfer if any of them are not included. The executor 110 may be able to receive the prepared transfer receipt 144 from the storage 140, where it may have been stored after being received from another computing device or system. The executor 110 may be able to authorize a hold on resource owned by the intermediary party at a resource tracking system based on the prepared transfer receipt 144, or may issue an execute instruction to effect a transfer on a resource tracking system based on the prepared transfer receipt 144. The executor 110 may be able to receive either the transfer confirmation receipt 146 or the signed message 148 from the storage 140, where they may have been stored after being received at the intermediary computing device 100 from another computing device or system. The executor 110 may be able to send an execute instruction to effect a transfer on a resource tracking system upon receiving the signed message 148, and may be able to send the transfer confirmation receipt 146 and the execute instruction to effect a transfer on a resource tracking system upon receiving the transfer confirmation receipt 146. The execute instruction may, for example, effect a transfer of resources into a resource pool owned by the intermediary party or out of a resource pool owned by the intermediary party.

The quote generator 120 may be able to receive a request for a quote, for example, from a trusted system, transfer coordinator, or other computing device or system. The request for a quote may include a source transfer and destination transfer that the quote requestor wants the intermediary party to make using the intermediary computing device 100, including the type and quantity of resources and identities of the parties involved in both the source and destination transfer. The quote request may also identify the resource tracking systems on which the source and destination transfers should take place. The quote generator 120 may be able to generate a quote in response to the request for a quote. The quote may include any transfer costs or fee, guaranteed transfer minimums, and lock timeouts that the intermediary party may wish to make a condition of its acceptance of a proposed transfer based on the quote request.

Figure 2:
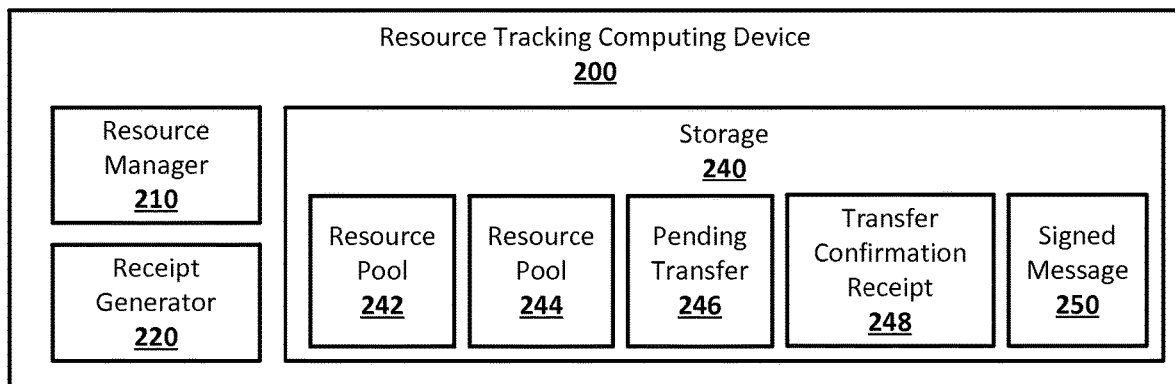
FIG. 2 shows an example system suitable for a resource transfer system according to an implementation of the disclosed subject matter.

FIG. 2 shows an example system suitable for a resource transfer system according to an implementation of the disclosed subject matter. A resource tracking computing device 200 may include a resource manager 210, a receipt generator 220, and a storage 240. The resource tracking computing device 200 may be any suitable computing device, such as, for example, a computer 20 as described in FIG. 21, or component thereof, for implementing the resource manager 210, the receipt generator 220, and the storage 240. The resource tracking computing device 200 may be a single computing device, or may include multiple connected computing devices, and may be, for example, a laptop, a desktop, an individual server, a server farm, or a distributed server system, or may be a virtual computing device or system. The resource tracking computing device 200 may be part of a computing system and network infrastructure, or may be otherwise connected to the computing system and network infrastructure. The resource manager 210 may be any suitable combination of hardware and software on the resource tracking computing device 200 for managing resources belonging to various parties and tracked by the resource tracking computing device 200. The resources may be tracked in resource pools, such as, for example, the resource pools 242 and 244 in the storage 140. The receipt generator 220 may be any suitable combination of hardware and software for generating receipts, such as the prepared transfer receipt 144 and transfer confirmation receipt 146, based on the actions of the resource manager 210. The storage 240 may store pending transfer 246, along with the resource pools, such as the resource pools 242 and 244, for the various parties with resource tracked by the resource tracking computing device 200. The storage 240 may also store receipts, such as the transfer confirmation receipt 248, or the signed message 250. The resource pools 242 and 244 may be records of resources owned by parties and tracked by the resource tracking computing device 200, including the types and quantities of the resources, and an identification of the party that owns or controls the resources in the resource pool. The resource tracking computing device 200 may be a resource tracking system, which may or may not be affiliated or belong to a particular person or organization, or may be a component of a server system.

The resource manager 210 may be any suitable combination of hardware and software on the resource tracking computing device 200 for managing resources belonging to various parties and tracked by the resource tracking computing device 200. The resource manager 210 may be able to receive a proposed transfer, which may indicate that resource tracked by the resource tracking computing device 200 are to be transferred from one resource pool on the resource tracking computing device 200 to another resource pool on the resource tracking computing device 200, and conditions to associated with any hold on resources placed in connection with the proposed transfer. The resource manager 210 may be able to determine if a hold authorization for the resources to be transferred by the proposed transfer has also been received from the party which controls the resources to be transferred. When the hold authorization has not yet been received, the resource manager 210 may generate the pending transfer 246, which may be stored in the storage 240, and may indicate that the proposed transfer is still awaiting a hold authorization.

When the hold authorization has been received, the resource manager 210 may be able to place a hold on the type and quantity of resources in the appropriate resource pool, as was indicated by the propose transfer. For example, the resource manager 210 may place a hold on resources recorded in the resource pool 242 when the proposed transfer indicates that resources are to be transferred from the resource pool 242 to the resource pool 244, and a hold authorization from the party that owns the resource pool 242 has been received. A hold placed by the resource manager 210 may tie up the resources on which the hold has been placed, so that the resources cannot be moved or transferred except in conjunction with the proposed transfer which resulted in the hold. The hold may tie up specific resources, or some quantity of a resource. The hold may include a lock timeout, which may be a time period after which the resource manager 210 may release the hold without transferring the resources. The lock timeout may be indicated in the proposed transfer received by the resource tracking computing device 200.

The resource manager 210 may be able to verify when the conditions on a hold placed on resources has been fulfilled. For example, if a hold is conditional on receiving of evidence that a destination transfer has occurred, the resource manager 210 may be able to determine whether the transfer confirmation receipt 250, confirming the destination transfer at another resource tracking computing device, has been received. If the hold is conditional on receiving a signed message from a trusted system, the resource manager 210 may be able to determine whether the signed message 250, indicating that the trusted system has instructed the transfer to proceed, has been received. Upon determining that the conditions on the hold have been fulfilled, the resource manager 210 may be able to receive an execute instruction from the appropriate intermediary computing device 100, and execute the transfer of resource. The resource manager 210 may be deterministic, so that the fulfillment of the condition of a hold on resources, and receiving of the instruction to execute a transfer of those resource, may always result in the automatic transfer of those resources.

The resource manager 210 may be able to transfer resources between resource pools, such as the resource pool 242 and the resource pool 244, by decrementing the quantity of the resources in one resource pool and incrementing the quantity of the resources in the other resource pool by the same quantity. For example, the resource manager 210 may transfer 100 US dollars from the resource pool 242 to the resource pool 244 by decrementing the quantity of US dollars recorded by the resource pool 242 by 100, and incrementing the quantity of US dollars recorded by the resource pool 244 by 100.

The receipt generator 220 may be any suitable combination of hardware and software for generating receipts, such as the prepared transfer receipt 144 and transfer confirmation receipt 146, based on the actions of the resource manager 210. The receipt generator 220 may be able to determine when the resource manager 210 has placed a hold on resources in a resource pool in connection with a proposed transfer, and may be able to generate a prepared transfer receipt, such as the prepared transfer receipt 144, indicating that the resources needed for the transfer have been held. The prepared transfer receipt may include, for example, an indication of the resources that have been held, including type and quantity, the party who owns the held resources, the condition of the hold on the resources, and any lock timeout on the hold on the resources. The prepared transfer receipt generated by the receipt generator 220 may be sent to any suitable computing device or system, such as, for example, to a trusted system or transfer coordinator, or to an intermediary party computing device 100. The receipt generator 220 may be able to determine when the resource manager 210 has executed a transfer of resources from one resource pool to another on the resource tracking computing device 200, and may be able to generate a transfer confirmation receipt, such as the transfer confirmation receipt 146, indicating that the transfer was executed. The transfer confirmation receipt may include, for example, an indication of the resources that were transferred, including type and quantity, the party which owns of the resource pool the resources were transferred from, the party which owns the resource pool the resources were transferred to, the condition of the hold on the resources that were transferred, and an indication of the evidence that fulfilled the condition of the hold allowing the transfer to occur. The transfer confirmation receipt generated by the receipt generator 220 may be sent to any suitable computing device or system, such as, for example, to a trusted system or transfer coordinator, or to an intermediary party computing device 100.

Figure 3:
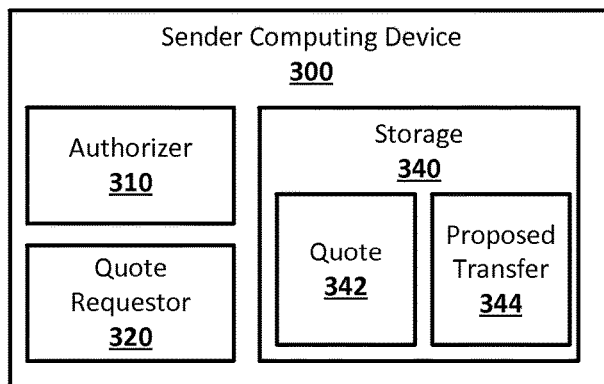
FIG. 3 shows an example system suitable for a resource transfer system according to an implementation of the disclosed subject matter.

FIG. 3 shows an example system suitable for a resource transfer system according to an implementation of the disclosed subject matter. A sender computing device 300 may include an authorizer 310, a quote requestor 320, and a storage 340. The sender computing device 300 may be any suitable computing device, such as, for example, a computer 20 as described in FIG. 21, or component thereof, for implementing the authorizer 310, the quote requestor 320, and the storage 240. The resource tracking computing device 200 may be a single computing device, or may include multiple connected computing devices, and may be, for example, a laptop, a desktop, an individual server, a server farm, or a distributed server system, or may be a virtual computing device or system. The sender computing device 300 may be part of a computing system and network infrastructure, or may be otherwise connected to the computing system and network infrastructure. The authorizer 310 may be any suitable combination of hardware and software on the sender computing device 300 for verifying the hold conditions on source and destination transfers included in a quote for a transfer, and for sending an authorization to hold resources owned by a sending party on a resource tracking computing device 200 in connection with a transfer, such as the transfer in the quote or a proposed transfer received by the sender computing device 300. The quote requestor 320 may be any suitable combination of hardware and software for requesting a quote for a transfer of resources that a sending party wishes to make to a receiving party using the sender computing device 300. The storage 340 may store a quote 342 or a proposed transfer 344 in any suitable manner. The sender computing device 300 may be a sender used by a sending party, which may be any suitable party that may wish to transfer resources to a receiving party. The sending party may be the same party as another party in the transfer chain, or may be a separate party. For example the sending party and receiving party may be the same party, for example, an organization with multiple branches that uses resource held at one branch to obtain resources of another type for a another branch.

The authorizer 310 may be any suitable combination of hardware and software on the sender computing device 300 for verifying the hold conditions on source and destination transfers, and for sending an authorization to hold resources owned by a sending party on a resource tracking computing device 200 in connection with a transfer. The authorizer 310 may be able to verify hold conditions on source and destination transfers that may be part of quote for a transfer, such as the quote 342, or a proposed transfer, such as the proposed transfer 344, received by the sender computing device 300, and which the sending party wishes to participate in to send resources to a receiving party. The authorizer 310 may be able to determine whether the condition on a hold of resources owned by the sending party for a source transfer is either the receiving of evidence that a destination transfer has occurred or the receiving of a signed message from a trusted system. If either is true, the authorizer 310 may be able to send a hold authorization for the resources to the resource tracking computing device 200 on which the resources are tracked. This may be a resource tracking computing device 200 on which the sending party has a resource pool, such as the resource pool 242.

The quote requestor 320 may be any suitable combination of hardware and software for requesting a quote for a transfer of resources that a sending party wishes to make to a receiving party using the sender computing device 300. The quote requestor 320 may be able to receive parameters for the transfer, for example, from the sending party inputting the parameters into the sender computing device 300, or from the storage 340 of the sender computing device. The parameters of the quote request may include, for example, an indication of the receiving party for the transfer, the type of resource the sending party will transfer out, the type of resource the receiving party expects to receive, and either the quantity of resources that that the sending party will transfer out or the quantity of the resources that the sending party wishes to arrive at the receiving party. For example, the quote may indicate the sending party will transfer out 100 US dollars, and that the receiving party will receive some quantity of Euros based on the exchange rate and the value of the resources deducted from the 100 US dollars by, for example, the intermediary parties, or the quote may indicate the receiving party will receive 100 Euros, and the quantity of US dollars transferred out by the sending party may be determined so as to sure that the receiving party will receive 100 Euros accounting for the exchange rate and any deducted resources. The quote request may also include a transfer chain, including the identity of the intermediary computing devices and resource tracking computing devices that the sending party wants to be used in the transfer chain, the identities of the parties in the transfer chain, the amounts to be transferred from each party and to each party, and other appropriate details about the transfer and transfer chain.

The quote request generated by the quote requestor 320 may be sent to any suitable computing device or system. For example, the quote request may be sent to various possible intermediary computing devices 100, which may evaluate the quote request and respond with a quote for their participation in the transfer in the transfer chain to the receiving party. The quote request may be sent to a trusted system, or a transfer coordinator, or other computing device that may perform pathfinding to get quotes from various possible intermediary computing devices 100 to set up a transfer chain between the sending party and the receiving party. No pathfinding may be necessary, if, for example, the quote request includes a transfer path specified by the sending party, or the computing device or system that receives the quote request has liquidity information regarding various intermediary computing devices and resource tracking computing devices pre-indexed.

Figure 4:
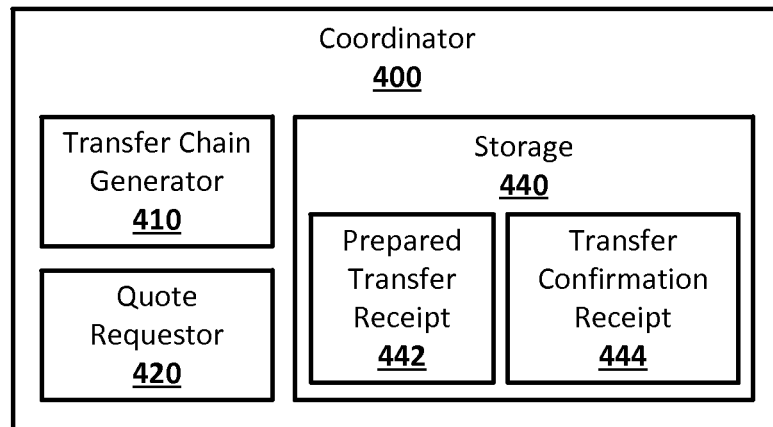
FIG. 4 shows an example system suitable for a resource transfer system according to an implementation of the disclosed subject matter.

FIG. 4 shows an example system suitable for a resource transfer system according to an implementation of the disclosed subject matter. A coordinator 400 may include a transfer chain generator 410, a quote requestor 420, and a storage 440. The coordinator 400 may be any suitable computing device, such as, for example, a computer 20 as described in FIG. 21, or component thereof, for implementing the transfer chain generator 410, the quote requestor 420, and the storage 440. The coordinator 400 may be a single computing device, or may include multiple connected computing devices, and may be, for example, a laptop, a desktop, an individual server, a server farm, or a distributed server system, or may be a virtual computing device or system, or may be distributed among the various computing devices and systems in the transfer chain, such as, for example, the intermediary computing devices 100 and sender computing device 200. The coordinator 400 may be part of a computing system and network infrastructure, or may be otherwise connected to the computing system and network infrastructure. The transfer chain generator 410 may be any suitable combination of hardware for generating a transfer chain from a sending party to a receiving party, for example, assembling the chain from various quotes collected from various intermediary parties as received from various intermediary computing devices 100. The quote requestor 420 may be any suitable combination of hardware and software for requesting a quote for a transfer of resources that a sending party wishes to make to a receiving party using the sender computing device 300. The storage 440 may store prepared transfer receipts, such as the prepared transfer receipts 442, and transfer confirmation receipts, such as the transfer confirmation receipt 444, in any suitable manner. The coordinator 400 may be a computing device or system, or may be a component thereof, and may have its functionality distributed among a number of computing devices or systems. The coordinator 400 may be, for example, a trusted system, or may be a transfer coordinator for the transfer from the sending party to the receiving party. The coordinator 400 may be, or be part of, an intermediary computing device 100 in the transfer chain between the sending party and the receiving party.

The coordinator 400 may be able to set up the transfer chain for a transfer, for example, using transfer chain generator 410 and the quote requester 420. For example, the coordinator 400 may be able to receive a quote request from the sender computing device 300, may be able to determine intermediary computing devices 300 that may be part of the transfer chain to satisfy the quote, may generate quote requests that may be sent to these intermediary computing devices 100, and may, using the transfer chain generator 410, be able to use the quotes received from the intermediary computing devices 100 to construct a transfer chain between the sending party, which requested the quote, and the receiving party indicating in the original quote request. The coordinator 400 may also include, in the storage 400, an index of liquidity information for various intermediary computing devices and resource tracking computing devices, which may be used instead of the quote requestor 420 to construct a transfer chain.

The coordinator 400 may be able to coordinate communication and message passing among the various computing devices and systems in the transfer chain. For example, the coordinator 400 may receive various receipts, such as the prepared transfer receipt 442 and the transfer confirmation receipt 444, and send them to appropriate computing devices and systems, such as the intermediary computing devices 100 and resource tracking computing devices 200 in the transfer chain.

The coordinator 400 may be a trusted system. When the coordinator 400 is a trusted system, the condition on all holds placed on resources on resource tracking computing devices 200 in the transfer chain may be the receiving of a signed message from the coordinator 400. The coordinator 400 may be able to determine when all resource tracking computing devices 200 in the transfer chain have sent prepared transfer receipts to the coordinator 400, indicating all the resources being transferred in the transfer chain have been held, and may be able to generate the signed message and distribute the signed message to all of the intermediary computing devices 100 and resources tracking computing devices 200 in the transfer chain to cause the transfer to proceed. The signed message may also be able to cancel the transfer, if necessary.

Figure 5:
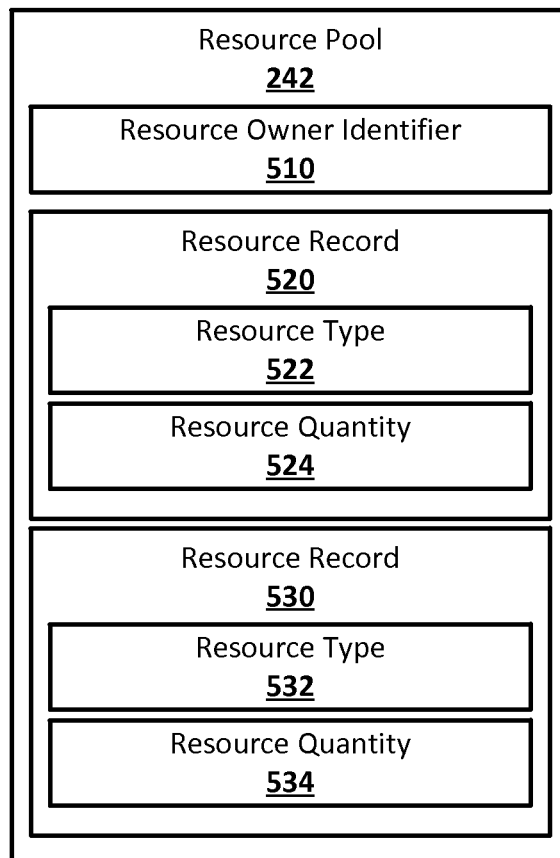
FIG. 5 shows an example system suitable for a resource transfer system according to an implementation of the disclosed subject matter.

FIG. 5 shows an example system suitable for a resource transfer system according to an implementation of the disclosed subject matter. The resource pool 242 on the resource tracking computing device 200 may include a resource owner identifier 510, and resource records 520 and 530. The resource owner identifier 510 may be any suitable identification of the party that owns the resources recorded in the resource pool 242. For example, the resource owner identifier may be a name of a person, organization, or user or process on a server system, an arbitrary name, a username and password combination, a passphrase or passcode, a unique number, or a cryptographic public key. The resource records 520 and 530 may include resource types 522 and 532, and resource quantities 524 and 534. The resource types 522 and 532 may indicate the type of resource that is recorded in the resource records 520 and 530. The resource types 522 and 532 may be any suitable resource of asset, such as, for example, currency, cryptocurrency, commodities, financial instruments, or computational resources. The resource quantities 522 and 524 may indicate the quantity of the resource types 522 and 532 owned by the party identified by the resource owner identifier 510 and tracked in the resource pool 242. The resource quantities 522 and 524 may be stored in, for example, registers or memory cells on the resource tracking computing device 200.

The resource tracking computing device 200 may track resources in any suitable manner. For example, the resource tracking computing device 200 may pool resources by type, with each resource pool, such as the resource pool 242, tracking a particular resource type, such as the resource type 522. The resource pool 242 may then include the resource quantity 524 of the resource type 522 held by each party that owns any amount of the resource type 522, using resource owner identifiers such as the resource owner identifier 510.

Figure 6B:
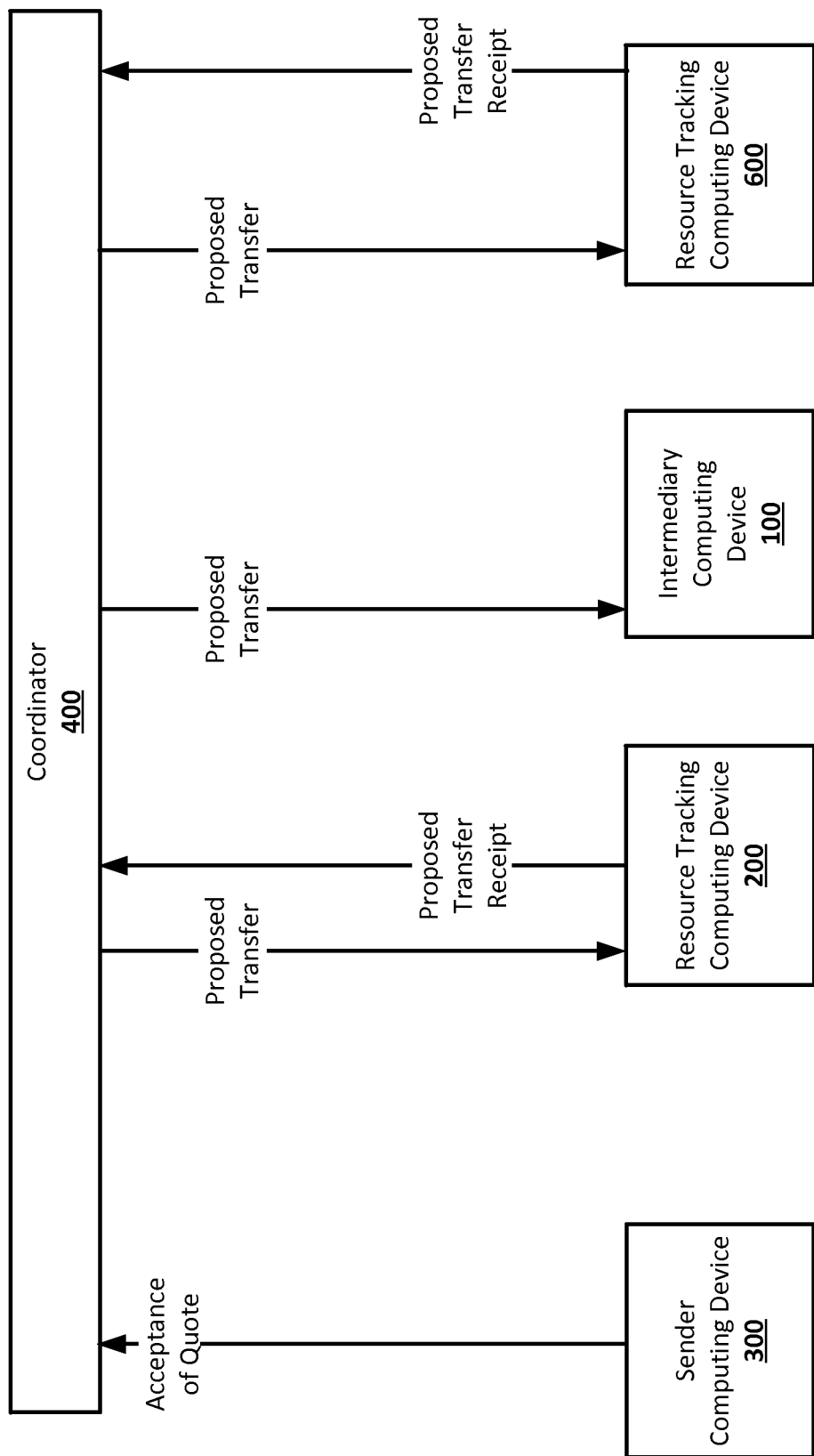

FIGS. 6A-D shows example arrangements suitable for a resource transfer system according to an implementation of the disclosed subject matter. In FIG. 6A, a sender computing device 200 may send out a request for a quote. The quote may indicate a receiving party to which a sending party wishes to transfer resources using the sender computing device 300. The request for quote may be received by, for example, the coordinator 400, which may distribute the request for quote to various intermediary computing devices. The intermediary computing device 100 may respond with a quote, which may be sent back to the sending computing device 300.

In FIG. 6B, the sending computing device 300 may send an acceptance of the quote, for example, back to the coordinator 400. For example, the sending party may accept the quote from the intermediary computing device 100, including any transfer costs, guaranteed minimum transfers, and lock timeouts requested in the quote. The coordinator 400 may send a proposed transfer to the intermediary computing device 100, and to the resource tracking computing device 200, which may act as a sender-intermediary resource tracking system, between the sending computing device 300 and the intermediary computing device 100, and the resource tracking computing device 600, which may act as an intermediary-receiver resource tracking system, which may be between the intermediary computing device 100 and the receiver, as the receiving party may have a resource pool on the resource tracking computing device 600. The resource tracking computing devices 200 and 600 may verify the conditions on the proposed transfers, and may return proposed transfer receipts to the coordinator 400. The proposed transfers may indicate to the resource tracking systems 200 and 600 what type and quantity of resources are to be moved, and between which resource pools, to effect the transfer desired by the sending party.

In FIG. 6C, the sender computing device 300 may send a hold authorization to the resource tracking computing device 200, on which the sending party may have a resource pool. The hold authorization may be sent through the coordinator 400. Upon receiving the hold authorization, the resource tracking computing device 200 may place a hold on the resources owned by the sending party that are to be used in the transfer, and may send a prepared transfer receipt, for example, the intermediary computing device 100, for example, through the coordinator 400.

Figure 6D:
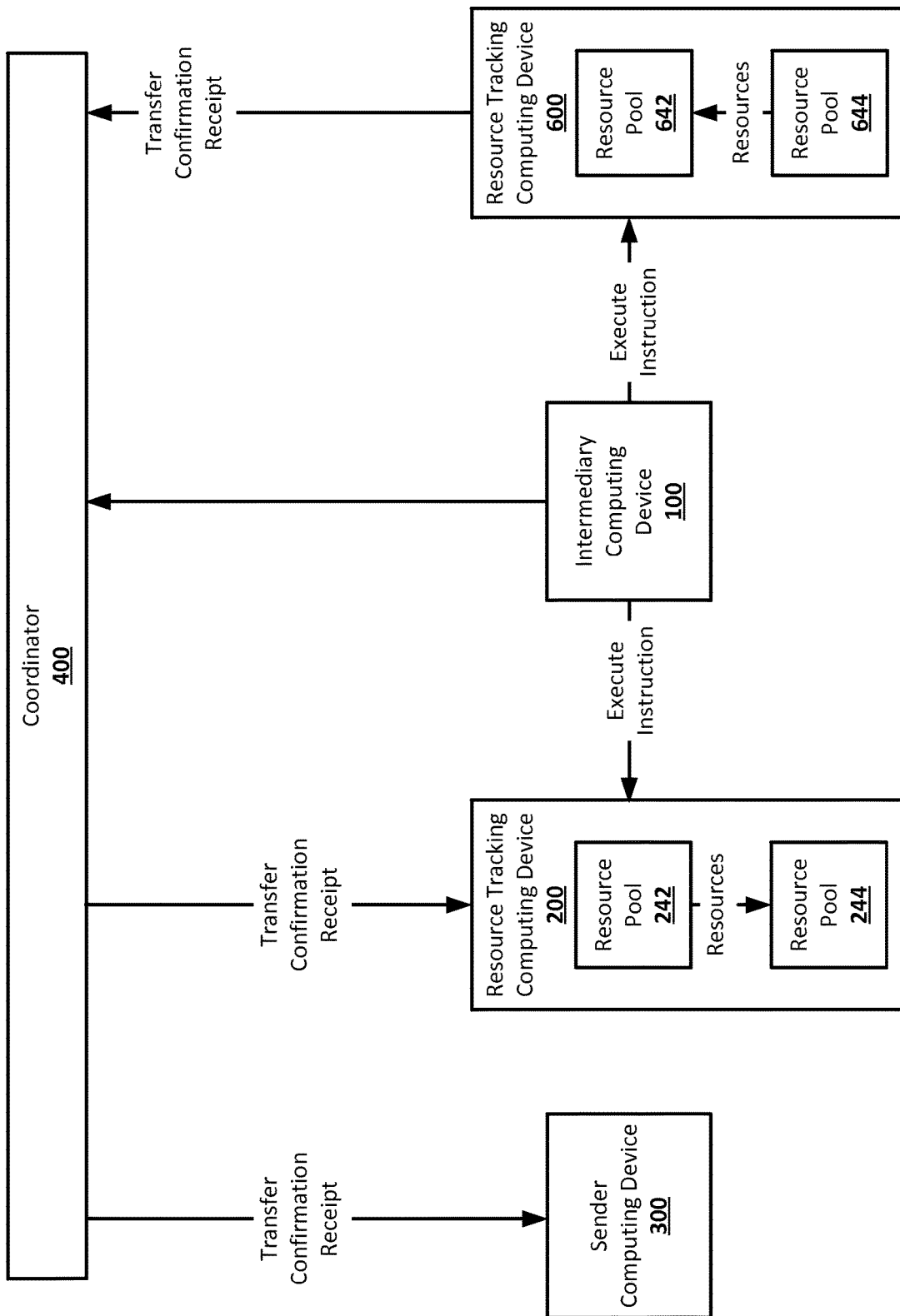

In FIG. 6D, the intermediary computing device 100, upon receiving the prepared transfer receipt, may send an execute instruction, or an authorization for the transfer, to the resource tracking computing device 600. The execute instruction may cause the resource tracking computing device 600 to transfer resources from the resource pool 644, which may be owned by the intermediary party that uses the intermediary computing device 100, to the resource pool 642, which may be owned by the receiving party, in accordance with the proposed transfer that was sent to the resource tracking computing device 600 and the intermediary computing device 100. This may be the destination transfer for the intermediary party that uses the intermediary computing device 100. If the intermediary computing device 100 sends out an authorization for the transfer, the resource tracking computing device 600 may transfer resources from the resource pool 644 to the resource pool 642 upon receiving a suitable message from the coordinator 400.

The resource tracking computing device 600 may send a transfer confirmation receipt of the destination transfer, which may reach the resource tracking computing device 200, for example, through the intermediary computing device 100, the coordinator 400, or both. The intermediary computing device 100 may also send an execute instruction to the resource tracking computing device 200. The transfer confirmation receipt may fulfill the condition of the hold that was placed on the sending party's resource on the resource tracking computing device 200. The resource tracking computing device 200, upon receiving the execute instruction, may automatically transfer the held resources from the resource pool 242, which may be owned by the sending party, to the resource pool 244, which may be owned by the intermediary party that uses the intermediary computing device 100.

Figure 7A:
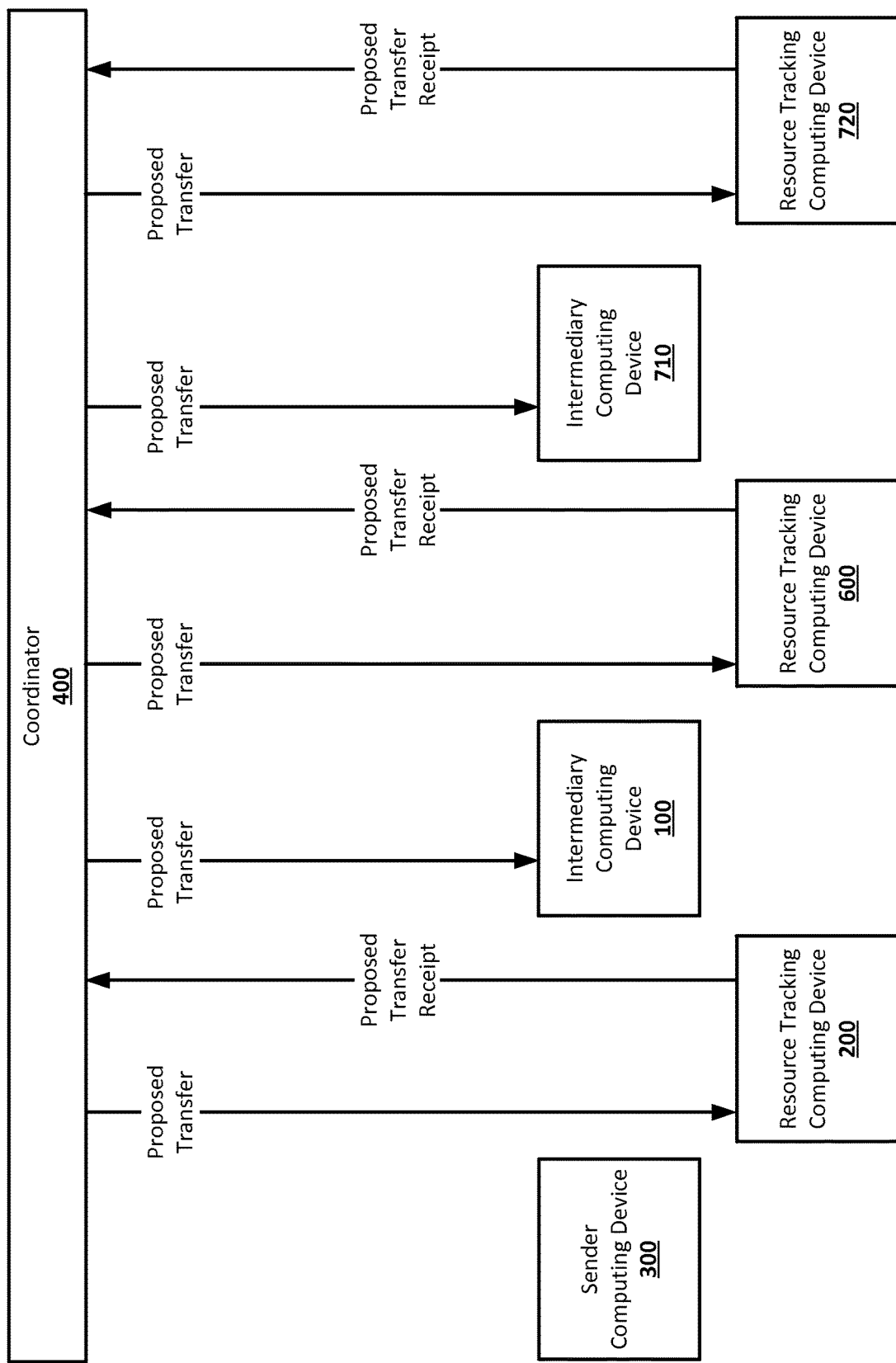
FIGS. 7A-C shows example arrangements suitable for a resource transfer system according to an implementation of the disclosed subject matter.
Figure 7B:
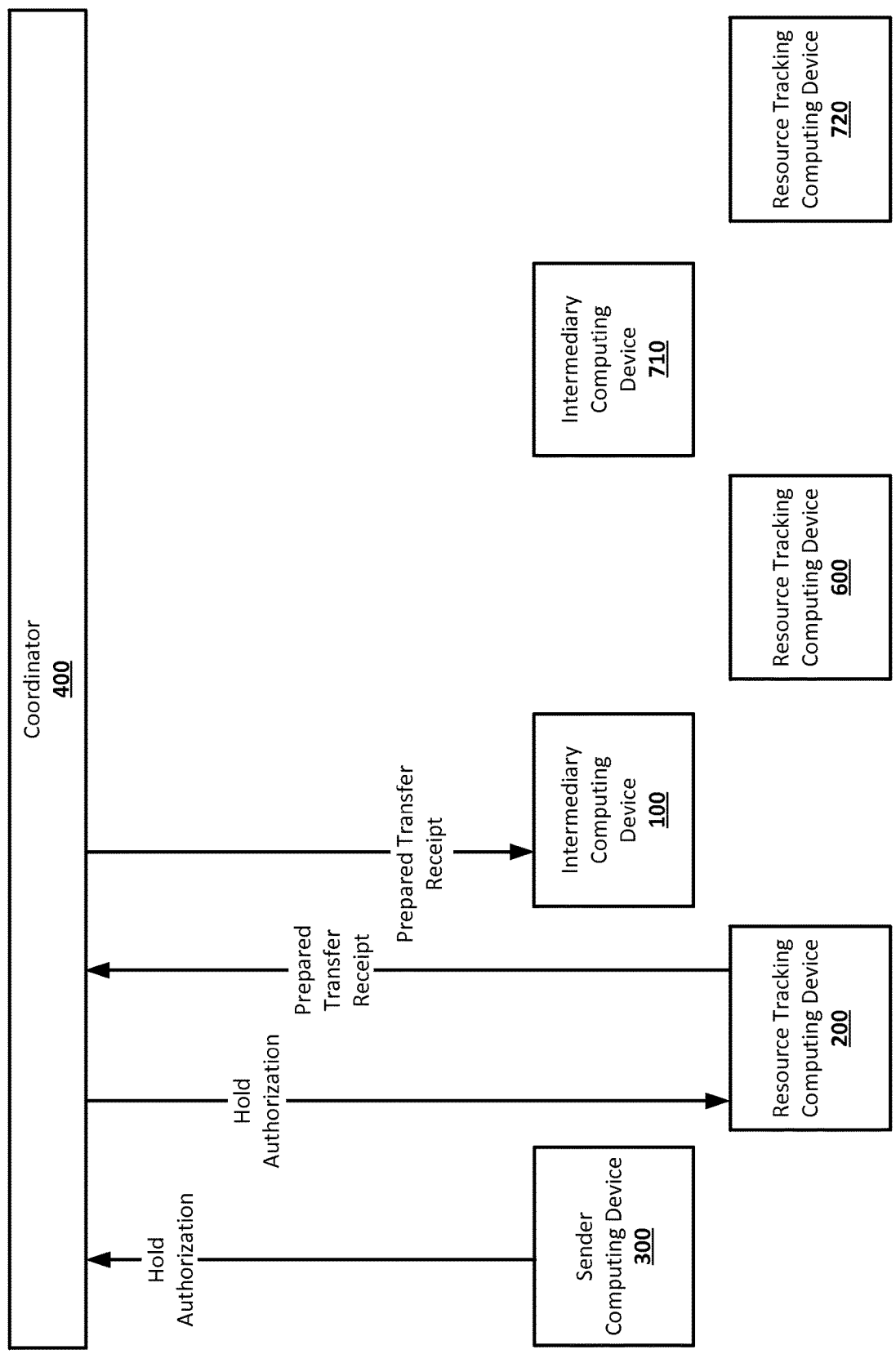
Figure 7C:
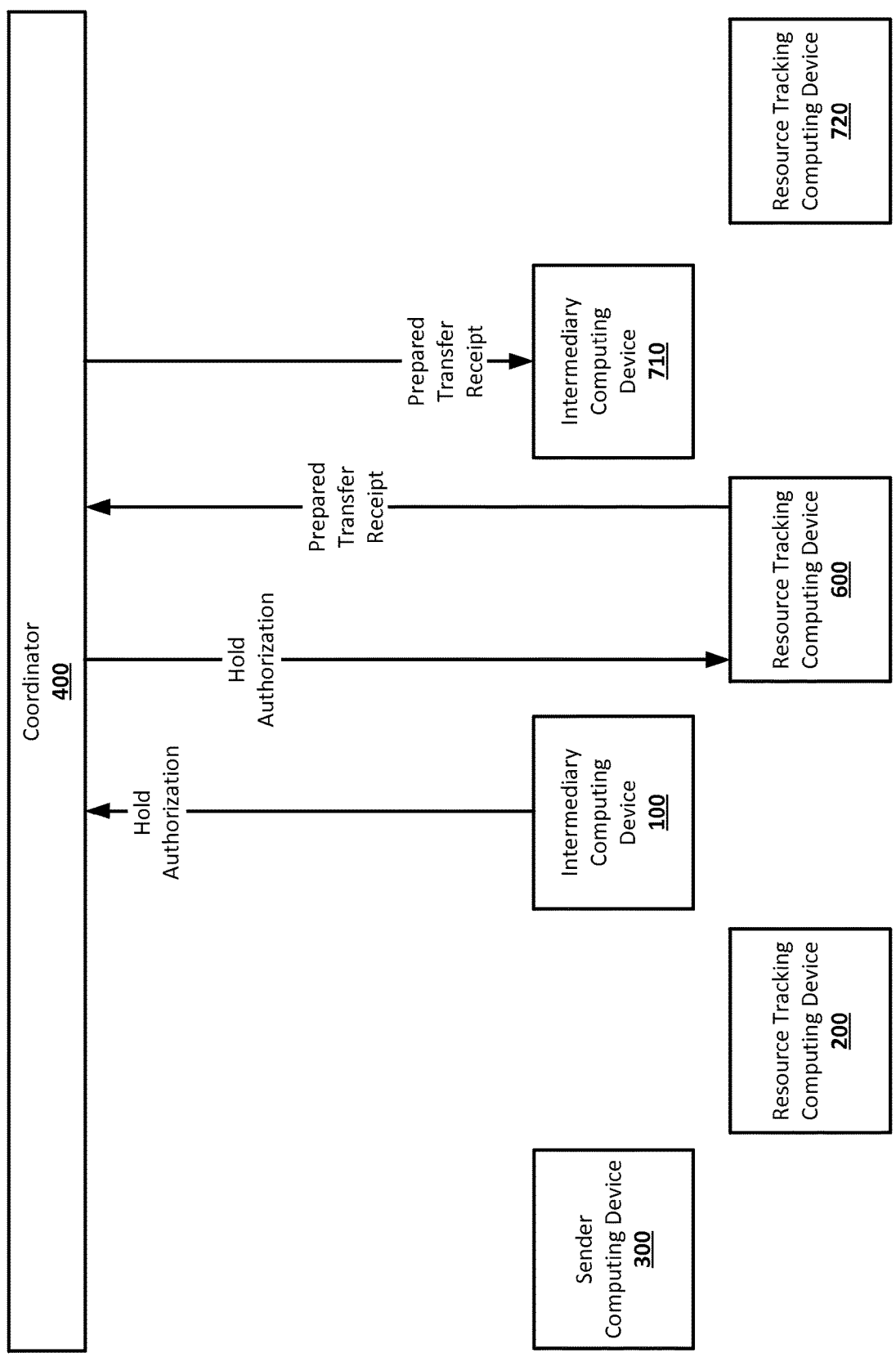

FIGS. 7A-C shows example arrangements suitable for a resource transfer system according to an implementation of the disclosed subject matter. In FIG. 7A, the sender computing device 300 may have requested, received, and agreed to a quote for a transfer from the sending party to a receiving party. The coordinator 400 may send proposed transfers to the resource tracking computing devices 200, 600, and 720, and the intermediary computing devices 100 and 710, in the transfer chain. The resource tracking computing devices 200, 600, and 720 may send out proposed transfer receipts, for example, to the coordinator 400, indicating that they have verified the conditions on the proposed transfers and are waiting for authorization to hold the resources indicated by the proposed transfers.

In FIG. 7B, the sender computing device 300 may send a hold authorization to the resource tracking computing device 200, on which the sending party may have a resource pool. The hold authorization may be sent through the coordinator 400. Upon receiving the hold authorization, the resource tracking computing device 200 may place a hold on the resources owned by the sending party that are to be used in the transfer, and may send a prepared transfer receipt, for example, to the intermediary computing device 100, for example, through the coordinator 400.

In FIG. 7C, the intermediary computing device 100 may send a hold authorization to the resource tracking computing device 600, which may act as an intermediary-intermediary resource tracking system, on which the intermediary party that uses the intermediary computing device 100 may have a resource pool. The hold authorization may be sent through the coordinator 400. Upon receiving the hold authorization, the resource tracking computing device 600 may place a hold on the resources owned by the intermediary party that uses the intermediary computing device 100 that are to be used in the transfer, and may send a prepared transfer receipt, for example, to the intermediary computing device 710, for example, through the coordinator 400.

Figure 8A:
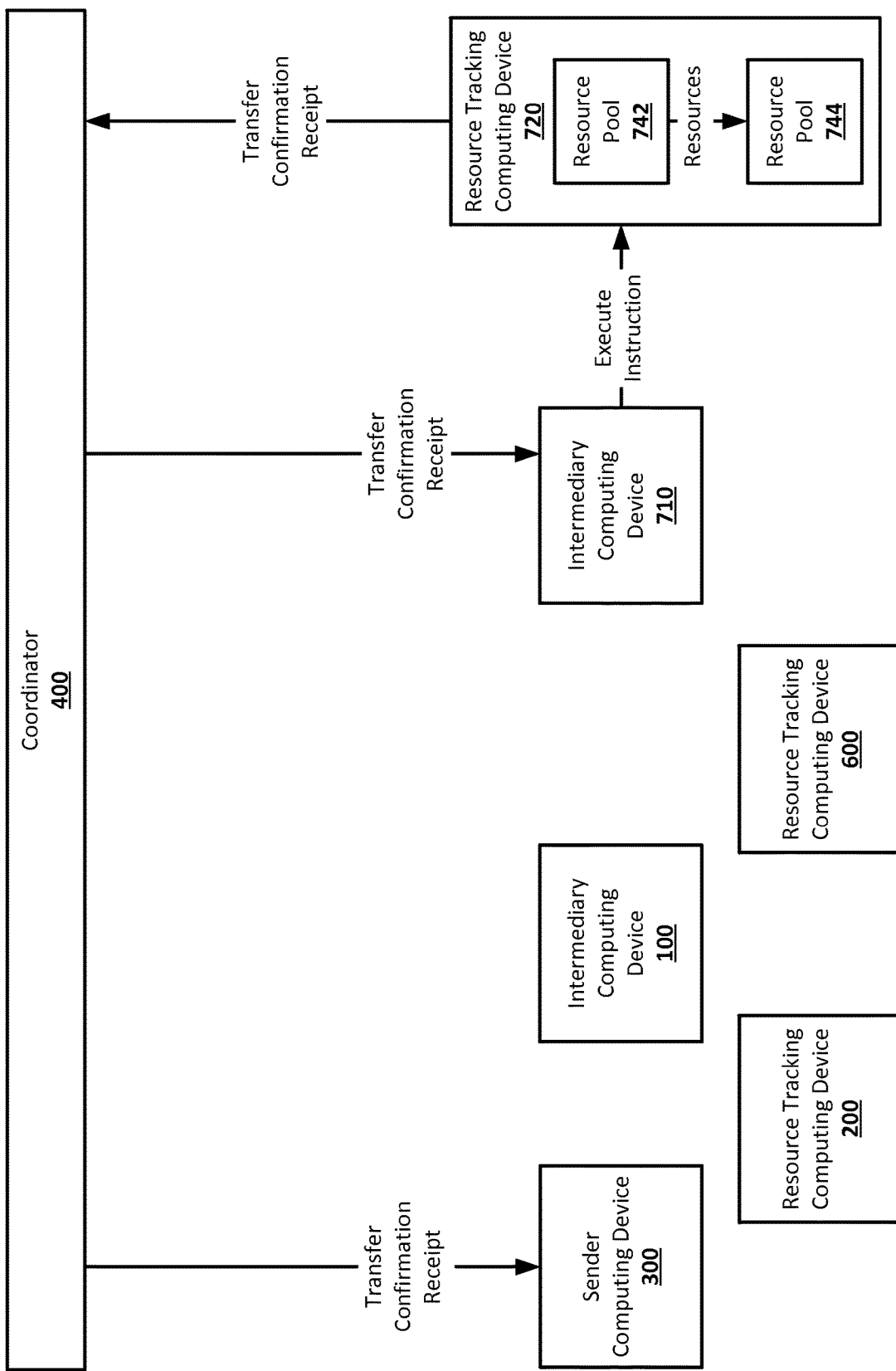
FIGS. 8A-C shows example arrangements suitable for a resource transfer system according to an implementation of the disclosed subject matter.
Figure 8B:
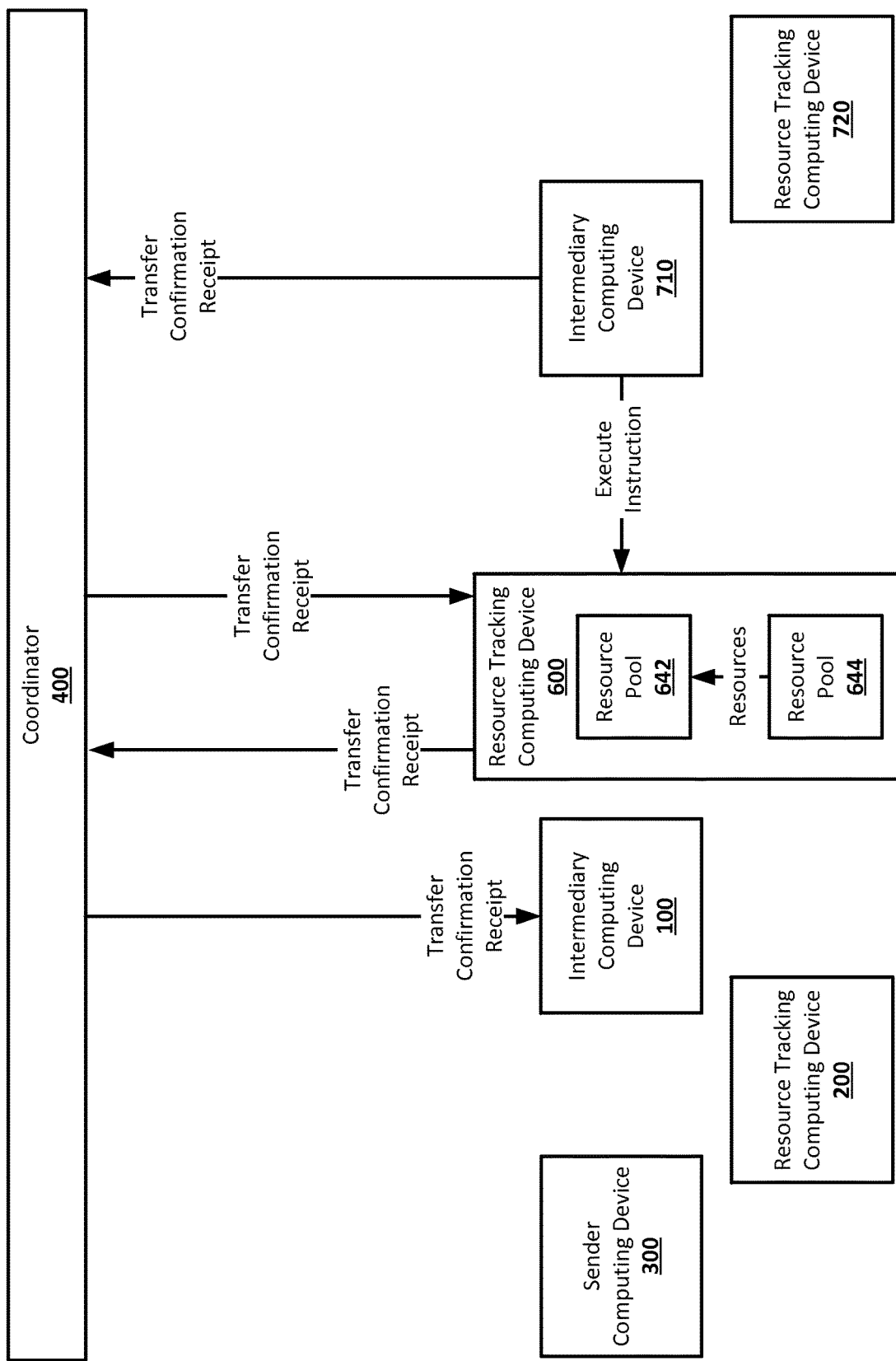
Figure 8C:
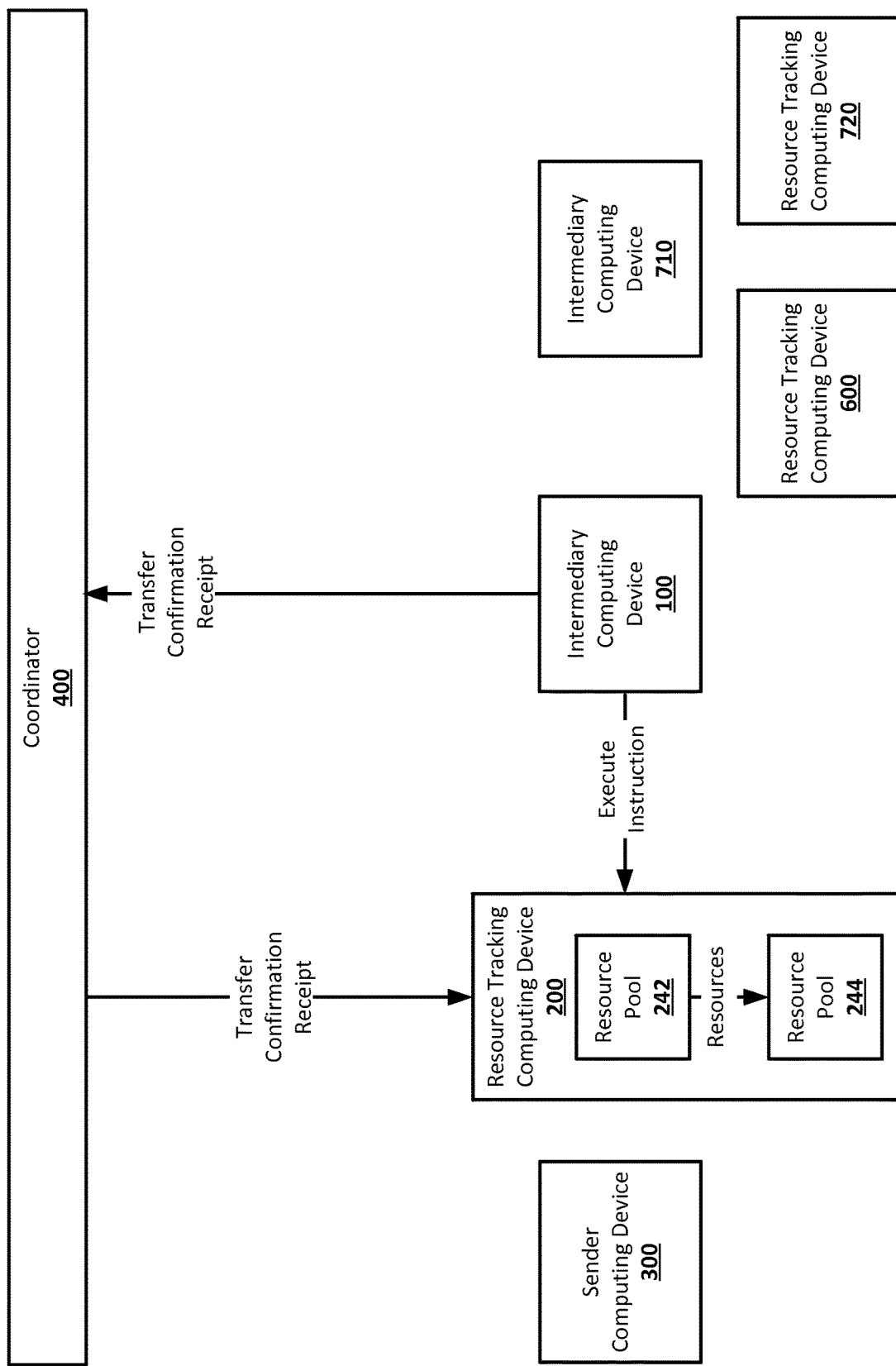

FIGS. 8A-C shows example arrangements suitable for a resource transfer system according to an implementation of the disclosed subject matter. If the transfer does not include a trusted system, the intermediary computing device 710 may, upon receiving the prepared transfer confirmation receipt as in FIG. 7A, send an execute instruction to the resource tracking computing device 720, which may act as an intermediary-receiver resource tracking system. The execute instruction may cause the resource tracking computing device 720 to transfer resources from the resource pool 742, which may be owned by the intermediary party that uses the intermediary computing device 710, to the resource pool 744, which may be owned by the receiving party. The type and quantity of resources transferred may be as indicated in the proposed transfer sent to the intermediary computing device 710 and resource tracking computing system 720. The resource tracking computing device 720 may send out a transfer confirmation receipt, which may go to, for example, the intermediary computing device 710. The transfer confirmation receipt, or some other notification of the transfer, may also be sent to the sender computing device 300, to notify the sending party that the receiving party successfully received the resources.

In FIG. 8B, the intermediary computing device 710 may send the transfer confirmation receipt received from the resource tracking computing device 700 to the resource tracking computing device 600, for example, through the coordinator 400. The intermediary computing device 710 may also send an execute instruction to the resource tracking computing device 600 to effect a transfer of the resources owned by the intermediary party that uses the intermediary computing device 100 and held at the resource tracking computing device 600 in the resource pool 644 to the resource pool 642 owned intermediary party using the intermediary computing device 720. This may be the source transfer for the intermediary party that uses the intermediary computing device 720. The transfer confirmation receipt may fulfill the condition of the hold on the resources owned by the intermediary party that uses the intermediary computing device 100, as it may be evidence that the destination transfer of resources from intermediary party using the intermediary computing device 600 was completed. The resource tracking computing device 600 may transfer the held resources automatically from the resource pool 644 to the resource pool 642 upon receiving the execute instruction from the intermediary computing device 600. The resource tracking computing device 600 may send out a transfer confirmation receipt, which may go to, for example, the intermediary computing device 100.

In FIG. 8C, the intermediary computing device 100 may send the transfer confirmation receipt received from the resource tracking computing device 600 to the resource tracking computing device 200, for example, through the coordinator 400. The intermediary computing device 100 may also send an execute instruction to the resource tracking computing device 200 to effect a transfer of the resources owned by the sending party that uses the sender computing device 300 and held at the resource tracking computing device 200 in the resource pool 242 to the resource pool 244 owned intermediary party using the intermediary computing device 100. This may be the source transfer for the intermediary party that uses the intermediary computing device 100. The transfer confirmation receipt may fulfill the condition of the hold on the resources owned by the sending party that uses sender computing device 300, as it may be evidence that the destination transfer of resources from intermediary party using the intermediary computing device 100 was completed. The resource tracking computing device 200 may transfer the held resources automatically from the resource pool 242 to the resource pool 244 upon receiving the execute instruction from the intermediary computing device 100. This may complete the transfer, as the receiving party may have received resources, the sending party may have sent resources, and the intermediary parties may have both sent and received resources to facilitate the transfer chain.

Figure 9A:
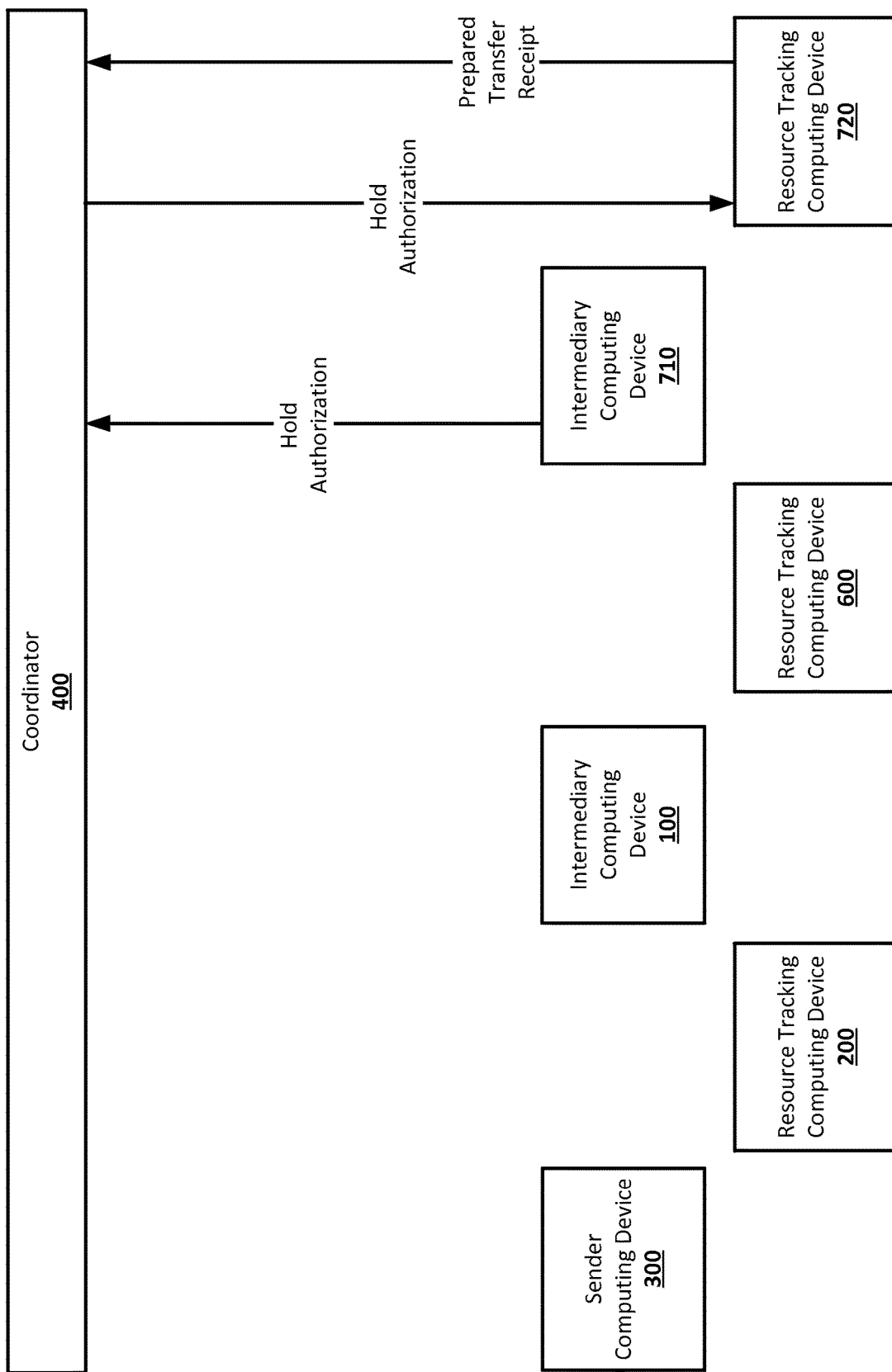
FIGS. 9A-C shows example arrangements suitable for a resource transfer system according to an implementation of the disclosed subject matter.
Figure 9B:
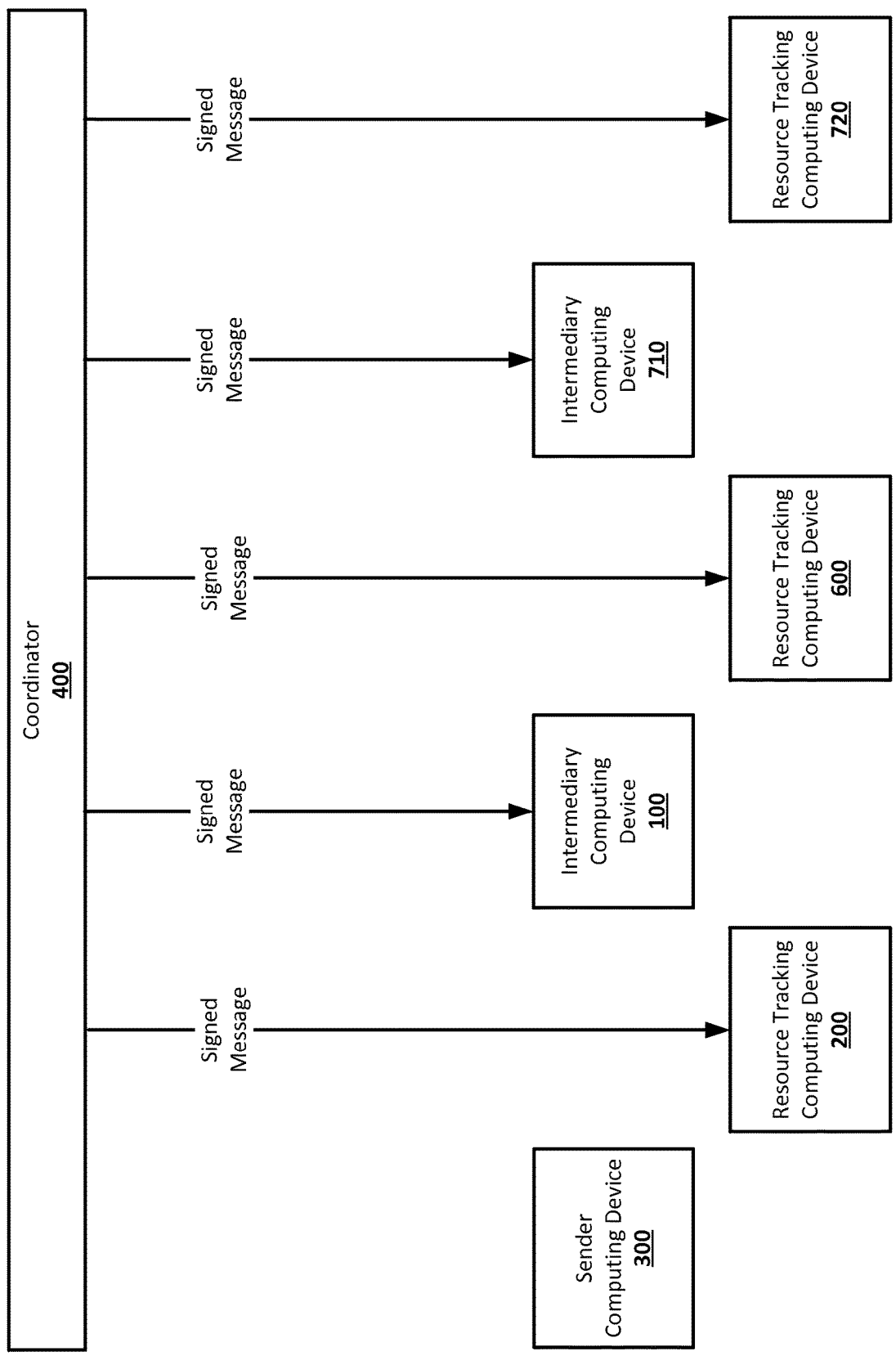
Figure 9C:
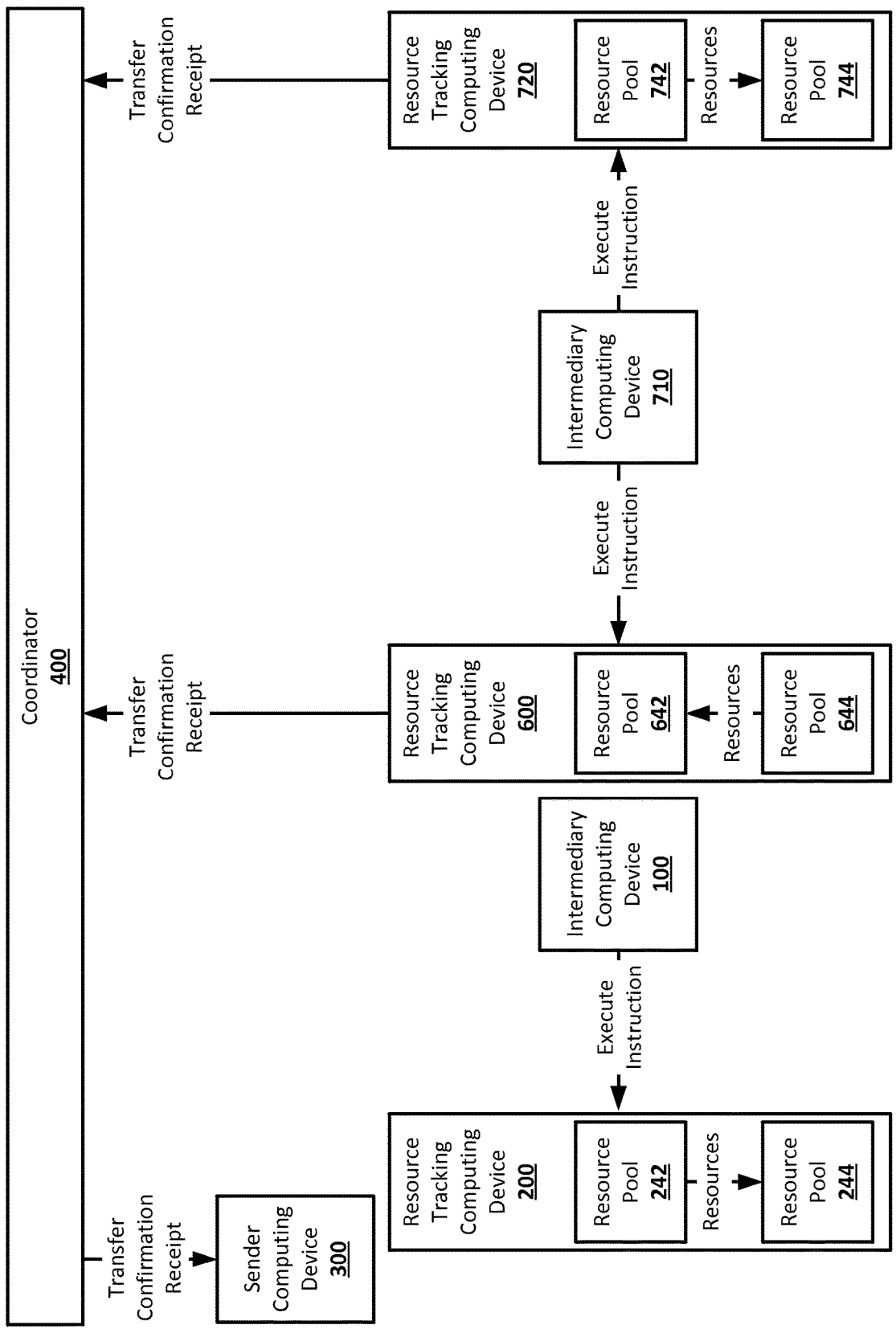

FIGS. 9A-C shows example arrangements suitable for a resource transfer system according to an implementation of the disclosed subject matter. In FIG. 9A, if the transfer does include a trusted system, for example, the coordinator 400, the intermediary computing device 710 may, upon receiving the prepared transfer confirmation receipt as in FIG. 7A, send a hold authorization to the resource tracking computing device 720. Upon receiving the hold authorization, the resource tracking computing device 720 may place a hold on the resources owned by the intermediary party that uses the intermediary computing device 720 that are to be transferred to the receiving party, and may send a prepared transfer receipt, for example, to the coordinator 400. In some implementations, when there is a trusted system, such as the coordinator 400, the sender computing device 300, intermediary computing device 100, and intermediary computing device 710 may send their respective hold authorizations at the same time, for example, upon receiving a message from the coordinator 400 indicating that the transfer is to proceed.

In FIG. 9B, the coordinator 400 may send a signed message to, or store a signed message that may be retrieved by, the resource tracking computing devices 200, 600, and 720, and the intermediary computing devices 100 and 710. For example, the coordinator 400 may have received prepared transfer receipts from the resource tracking computing devices 200, 600, and 720, indicating the all of the resources to be transferred in the transfer chain have been held. The coordinator 400 may determine that the transfer can proceeds, and send out the signed message, which may be, for example, a message signed with a private cryptographic key held by the coordinator 400, and verifiable with a corresponding public key which the resource tracking computing devices 200, 600, and 720, and the intermediary computing devices 100 and 710 have a copy of.

In FIG. 9C, the intermediary computing device 710 may send execute instructions to the resource tracking computing devices 600 and 720, for its source and destination transfers, respectively. The signed message received by the resource tracking computing devices 600 and 720 may have fulfilled the condition of the holds on the resources in the resource pools 644 and 742. The resource tracking computing device 720 may, upon receiving the execute instruction, automatically transfer the held resources from the resource pool 742, owned by the intermediary party that uses the intermediary computing device 710, to the resource pool 744, owned by the receiving party. The resource tracking computing device 720 may generate a transfer confirmation receipt or other notification, for example, to be sent to the sender computing device 300 to notify the sender that the receiving party has received the resources. The resource tracking computing device 600 may, upon receiving the execute instruction, automatically transfer the held resources from the resource pool 644, owned by the intermediary party that uses the intermediary computing device 100, to the resource pool 642, owned by the intermediary party that uses the intermediary computing device 710.

The intermediary computing device 100 may send an execute instruction to the resource tracking computing device 200 for its source. The signed message received by the resource tracking computing devices 200 may have fulfilled the condition of the hold on the resources in the resource pool 242. The resource tracking computing device 200 may, upon receiving the execute instruction, automatically transfer the held resources from the resource pool 242, owned by sending party using the sending computing device 300, to the resource pool 244, owned by the intermediary party that uses the intermediary computing device 100.

Figure 10:
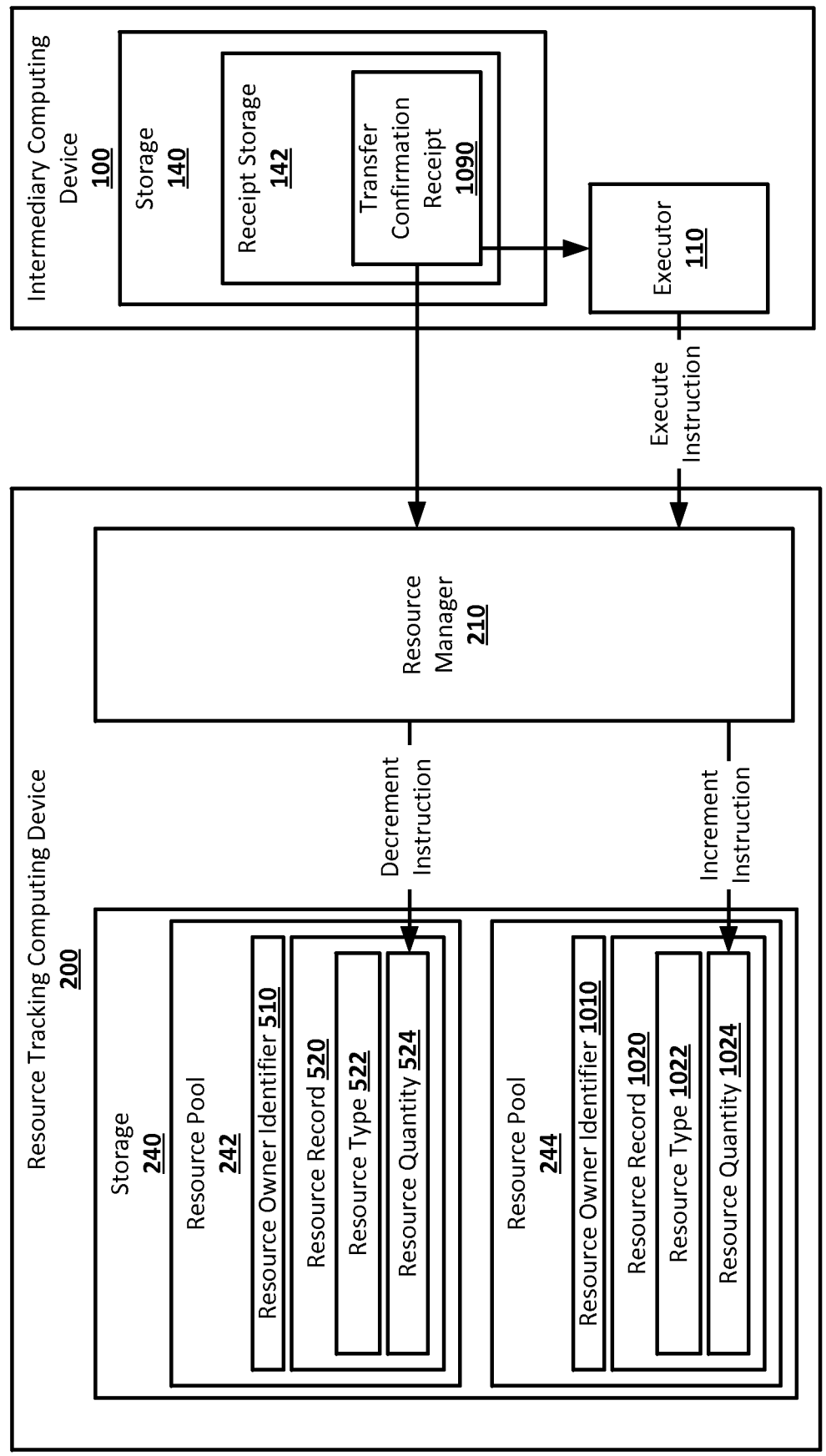
FIG. 10 shows an example arrangement suitable for a resource transfer system according to an implementation of the disclosed subject matter.

FIG. 10 shows an example arrangement suitable for a resource transfer system according to an implementation of the disclosed subject matter. To effect a transfer of held resources on the resource tracking computing device 200 from the resource pool 242 to the resource pool 244, the condition of the hold on the resources must be fulfilled. The condition may be fulfilled by, for example, the sending of a transfer confirmation receipt 1090 from the intermediary computing device 100 to the resource tracking computing device 200, where the transfer confirmation receipt 1090 indicates that the destination transfer for the source transfer of resources from the resource pool 242 to the resource pool 244 has been completed. Alternatively, a trusted system may send a signed message to the resource tracking computing device 200.

The intermediary computing device 100 may send an execute instruction to the resource tracking computing device 200. The execute instruction may be received by the resource manager 210, which may verify that the condition of the hold on the resources has been fulfilled. The resource manager 210 may then decrement the resource quantity 524, by, the quantity of held resources, and increment the resource quantity 1024, in the resource pool 244, by that same quantity. The resource types 522 and 1022 may be the same. This may result in the resource pool 244 recording that the party identified by the resource owner identifier 1010, which may be, for example, the intermediary party that uses the intermediary computing device 100, owns an increased quantity of the resource type 1022. The resource pool 242 may record that the party identified by the resource owner identifier 510, for example, a sending party or other intermediary party, now owns a decreased quantity of the resource type 522. The total quantity of the resource type 522 or 1022 tracked by the resource tracking computing device 200 may not have changed, only the quantities of the resource owned by the parties who own the resource pools 242 and 244 may change.

The resource quantities 524 and 1024 may be counters stored in registers or memory cells. When the resource quantity 524 is decremented, the quantity recorded by the counter may be decreased by the quantity of held resources, although the actual resources identified as held may not be the resources removed when the resource quantity 524 is decremented. For example, the resource quantity 524 may be 1000, for a resource type 522 of US dollars. A hold may be placed on 100 of the US dollars. When the hold condition is fulfilled and the transfer occurs, the resource quantity 524 may be decremented by 100, but this may represent the removal of any set of 100 US dollars from the resource record 520. The hold ensures that there will be at least 100 US dollars to transfer, but if there are more than 100, any of the US dollars may be transferred. The resource quantities 524 and 1024 may also include locations or other identifiers for specific resources, such as those with physical instantiations such as commodities or block of memory, or financial instruments or other resources that may be individually distinguishable. This may allow the transfer of specific resources, such as specific commodities stored at specific locations, specific shares of stock, specific bonds, specific contracts such as, for example options contracts, and so on.

Figure 11:
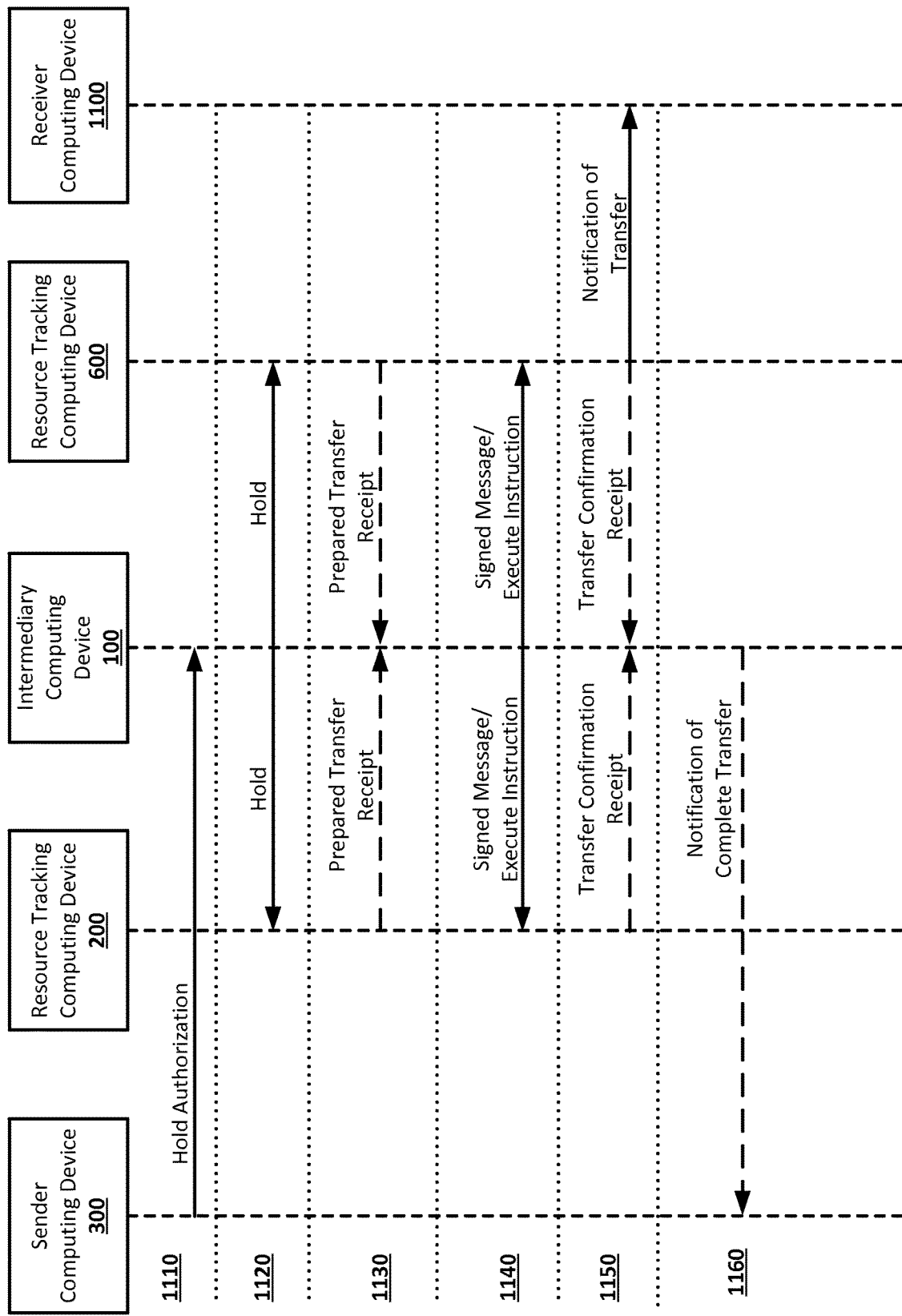
FIG. 11 shows an example sequence suitable for a resource transfer system according to an implementation of the disclosed subject matter.

FIG. 11 shows an example sequence suitable for a resource transfer system according to an implementation of the disclosed subject matter. A transfer chain may have one intermediary computing device, the intermediary computing device 100, which may also be a trusted system for the transfer chain. At time 1110, the sender computing device 300 may send a hold authorization to the intermediary computing device 100. At time 1120, the intermediary computing device 100 may instruct the resource tracking computing device 200, which may act as a sender-intermediary resource tracking system, to put a hold on resources owned by the sending party. The instruction may include the hold authorization from the sender computing device 300. The intermediary computing device 100 may instruct the resource tracking computing device 600, which may act as an intermediary-receiver resource tracking system, to put a hold on resources owned by the intermediary party that uses the intermediary computing device 100. At time 1130, the intermediary computing device 100 may receive prepared transfer receipts from the resource tracking computing devices 200 and 600, indicating that holds have been placed on the sending party's resource and the intermediary party's resources. At time 1140, the intermediary computing device 100 may send both the signed message and execute instructions to both the resource tracking computing devices 200 and 600. At time 1150, the resource tracking computing devices 200 and 600, which may have executed their respective transfers on receiving the signed message and execute instruction from the intermediary computing device 100, may send transfer confirmation receipts to the intermediary computing device 100. The resource tracking computing device 600 may also send a notification that the transfer of resources was completed to a receiver computing device 1100, which may be any suitable computing device used by the receiving party. At time 1160, the intermediary computing device 100 may notify the sender computing device 300 that the transfer is complete.

Figure 12:
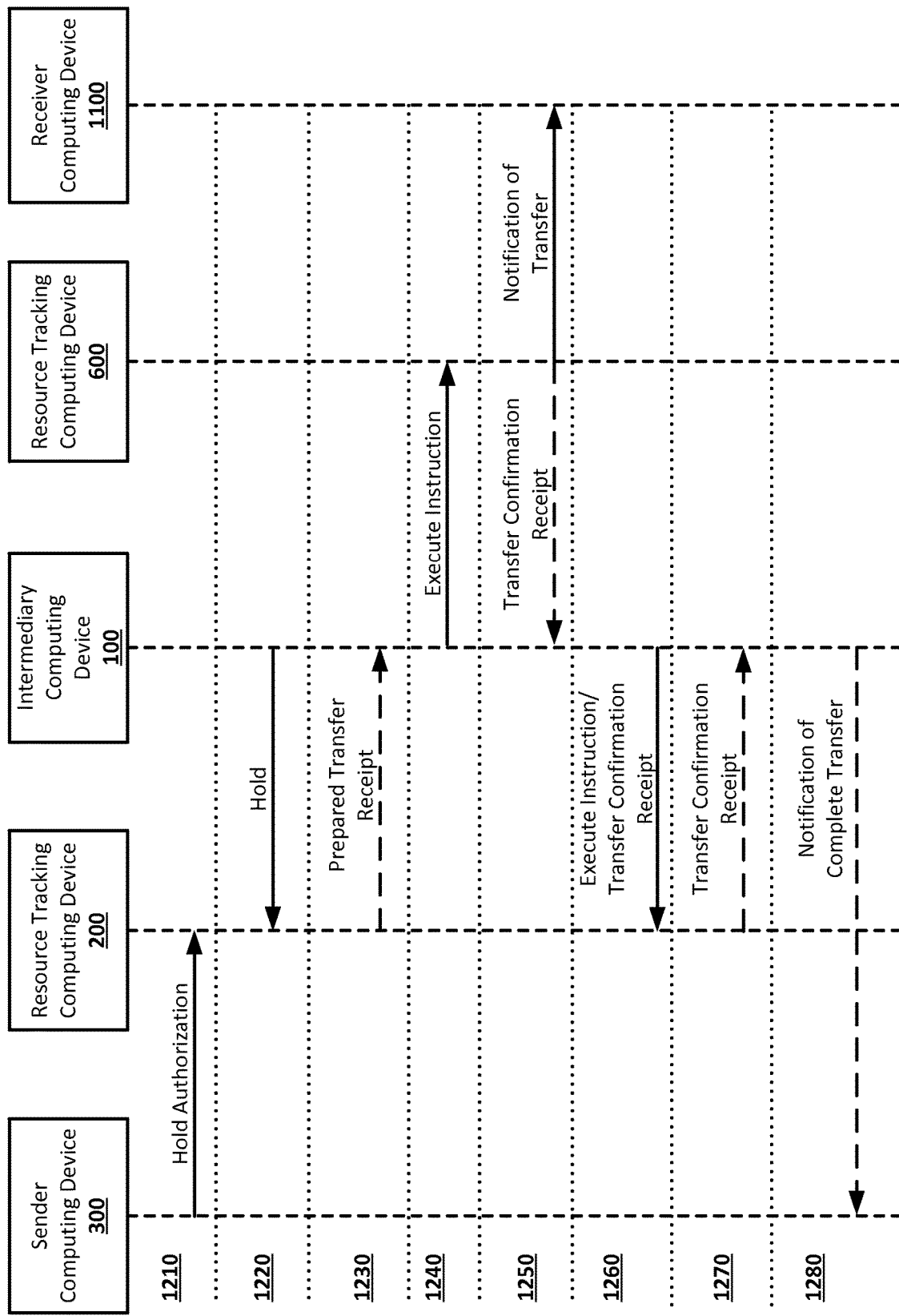
FIG. 12 shows an example sequence suitable for a resource transfer system according to an implementation of the disclosed subject matter.

FIG. 12 shows an example sequence suitable for a resource transfer system according to an implementation of the disclosed subject matter. A transfer chain may have one intermediary computing device, the intermediary computing device 100, and may have no trusted system. At time 1210, the sender computing device 300 may send a hold authorization to the resource tracking computing device 200, which may act as a sender-intermediary resource tracking system. At time 1220, the intermediary computing device 100 may instruct may instruct the resource tracking computing device 200 to put a hold on resources owned by the sending party, as authorized by the hold authorization. At time 1230, the intermediary computing device 100 may receive a prepared transfer receipt from the resource tracking computing device 200, indicating that the sending party's resource have been held. At time 1240, the intermediary computing device 100 may send an execute instruction to the resource tracking computing device 600, which may act as an intermediary-receiver resource tracking system. At time 1250, the resource tracking computing device 600, which may have executed the transfer of resources from the intermediary party to the receiving party upon receiving the execute instruction from the intermediary computing device 100, may send a transfer confirmation receipt to the intermediary computing device 100. The resource tracking computing device 600 may also send a notification that the transfer of resources was completed to the receiver computing device 1100. At time 1260, the intermediary computing device 100 send an execute instruction and the transfer confirmation receipt from the resource tracking computing device 600 to the resource tracking computing device 200. At time 1270, the resource tracking computing device 200, which may have executed the transfer of resources from the sending party to the receiving party upon receiving the execute instruction from the intermediary computing device 100 and the transfer confirmation receipt to fulfill the condition of the hold on the sending party's resources, may send a transfer confirmation receipt to the intermediary computing device 100 confirming the transfer of resources to the intermediary party. At time 1280 the intermediary computing device 100 may notify the sender computing device 300 that the transfer is complete.

Figure 13:
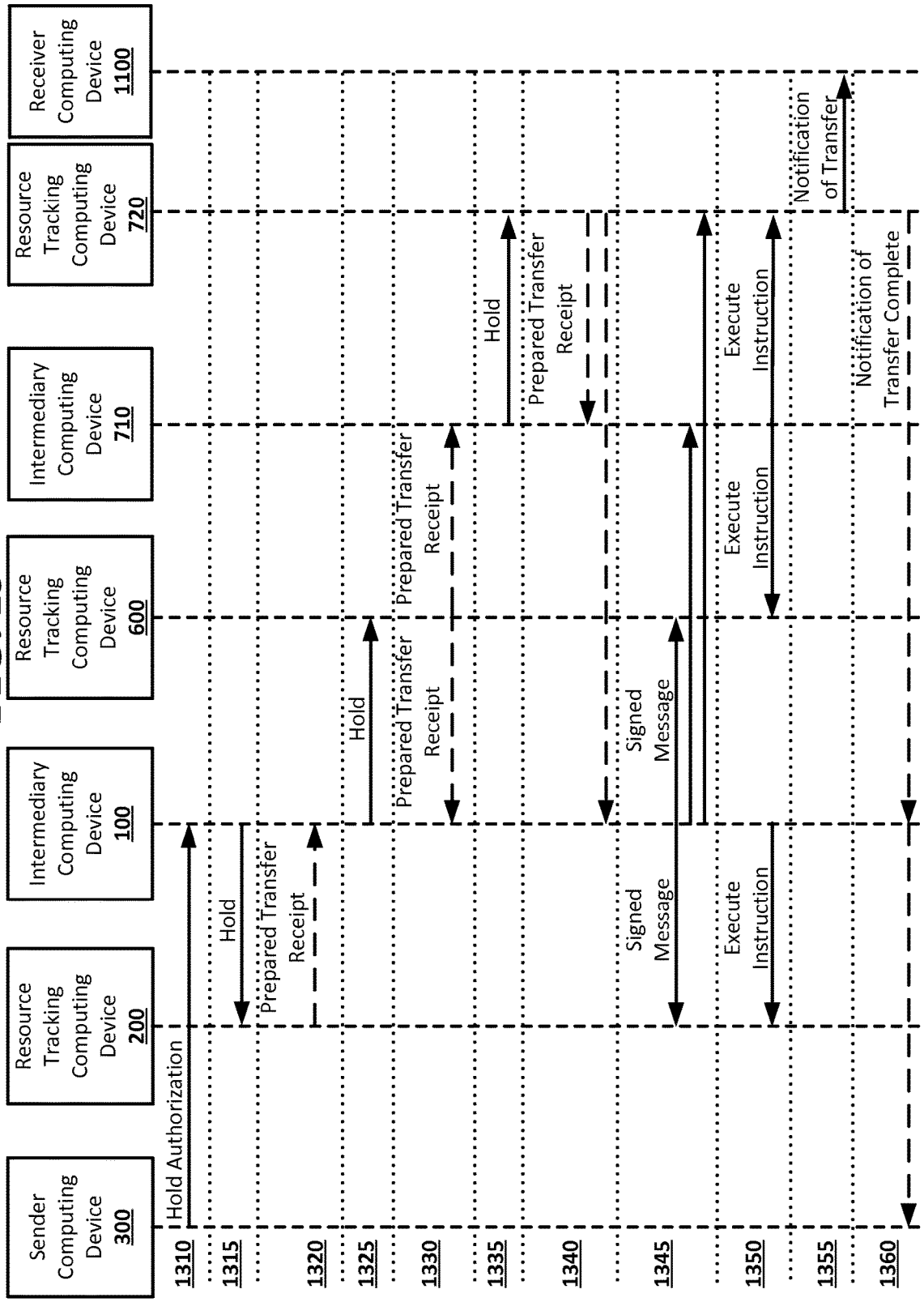
FIG. 13 shows an example sequence suitable for a resource transfer system according to an implementation of the disclosed subject matter.

FIG. 13 shows an example sequence suitable for a resource transfer system according to an implementation of the disclosed subject matter. A transfer chain may have two intermediary computing devices, the intermediary computing devices 100, which may also be a trusted system for the transfer chain, and the intermediary computing device 710. At time 1310, the sender computing device 300 may send a hold authorization to the intermediary computing device 100. At time 1315, the intermediary computing device 100 may instruct the resource tracking computing device 200, which may act as a sender-intermediary resource tracking system, to put a hold on resources owned by the sending party. The instruction may include the hold authorization from the sender computing device 300. At time 1320, the intermediary computing device 100 may receive a prepared transfer receipt from the resource tracking computing device 200, indicating that the sending party's resource have been held. At time 1325, the intermediary computing device 100 may instruct the resource tracking computing device 600, which may act as an intermediary-intermediary resource tracking system, to put a hold on resources owned by the intermediary party that uses the intermediary computing device 100. At time 1330, the resource tracking computing device 200 may send a prepared transfer receipt to the intermediary computing device 100. The prepared transfer receipt may also be sent to the intermediary computing device 710, by, for example, the intermediary computing device 100, or by the resource tracking computing device 200. At 1335, the intermediary computing device 710 may instruct the resource tracking computing device 720, which may act as an intermediary-receiver resource tracking system to put a hold on resources owned by the intermediary party that uses the intermediary computing device 710. At time 1340, the resource tracking computing device 720 may send a prepared transfer receipt to the intermediary computing device 710, and to the intermediary computing device 100. At time 1345, the intermediary computing device 100, which may be the trusted system in, or involved with, the transfer chain, may determine from the prepared transfer receipts that all the resources to be transferred have been held, and may send the signed message to the resource tracking systems 200, 600, and 720, and to the intermediary computing device 710. At 1350, the intermediary computing device 710 may send execute instructions to both the resource tracking computing devices 600 and 720, and the intermediary computing device 100 may send an execute instruction to the resource tracking computing device 200. The resource tracking computing devices 100, 600, and 720, may execute their respective transfers, with the resource tracking computing device 720 transferring held resources to the receiving party from the intermediary party that uses the intermediary computing device 710, the resource tracking computing device 600 transferring held resources to the intermediary party that uses the intermediary computing device 710 from the intermediary party that uses the intermediary computing device 100, and the resource tracking computing device 200 transferring held resources to the intermediary party that uses the intermediary computing device 100 from the sending party. At 1355, the resource tracking computing device 720 may send a notification that the transfer of resources was completed to a receiver computing device 1100. At time 1360 the intermediary computing device 100 may notify the sender computing device 300 that the transfer is complete.

Figure 14:
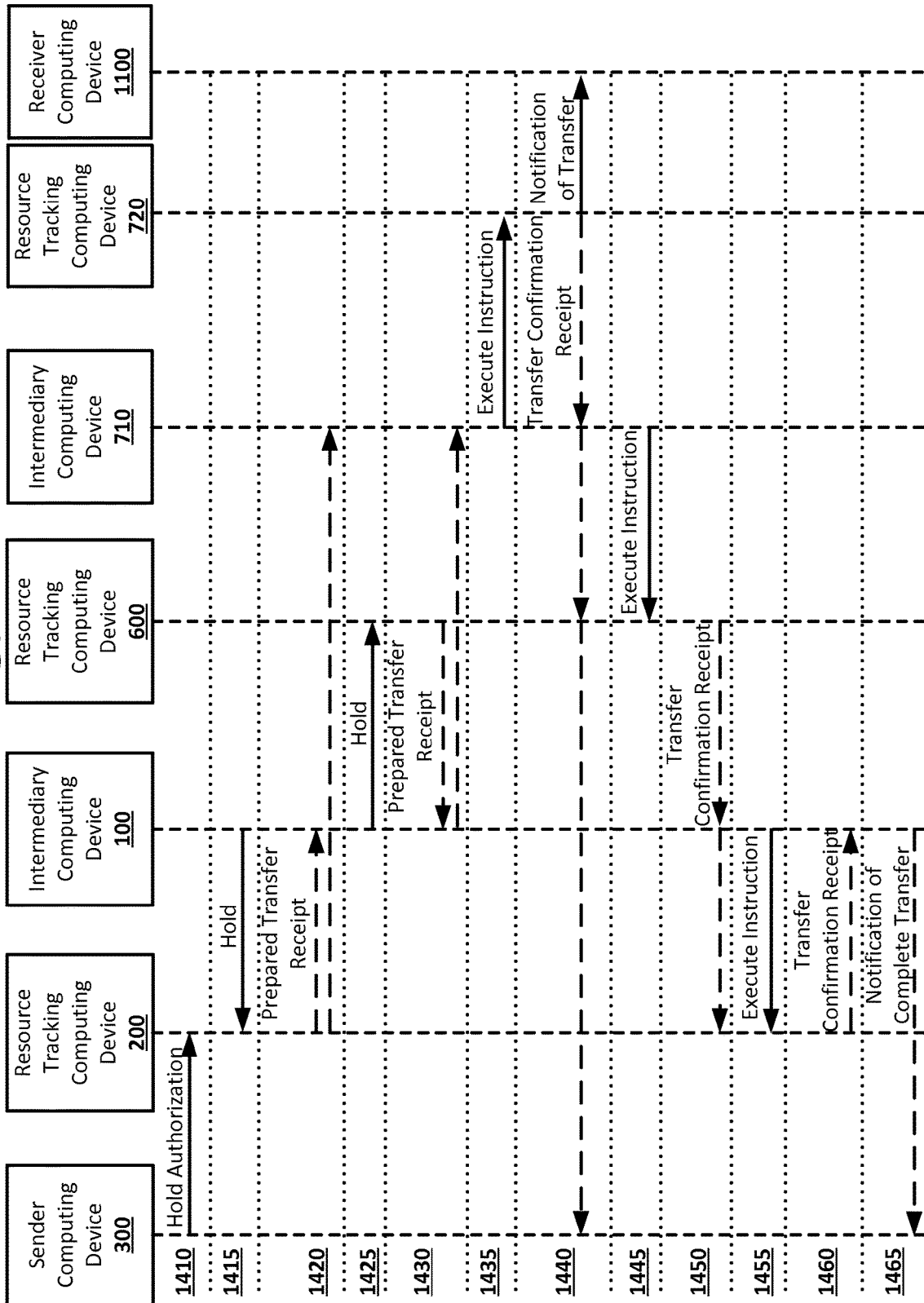
FIG. 14 shows an example sequence suitable for a resource transfer system according to an implementation of the disclosed subject matter.

FIG. 14 shows an example arrangement suitable for a resource transfer system according to an implementation of the disclosed subject matter. A transfer chain may have two intermediary computing devices, the intermediary computing devices 100 and the intermediary computing device 710, and may have no trusted system. At time 1410 the sender computing device 300 may send a hold authorization to the resource tracking computing device 200. At time 1415, the intermediary computing device 100 may instruct may instruct the resource tracking computing device 200, which may act as a sender-intermediary resource tracking system, to put a hold on resources owned by the sending party, as authorized by the hold authorization. At time 1420, the intermediary computing device 100 may receive a prepared transfer receipt from the resource tracking computing device 200, indicating that the sending party's resource have been held. At time 1425, the intermediary computing device 100 may instruct the resource tracking computing device 600, which may act as an intermediary-intermediary resource tracking system, to put a hold on resources owned by the intermediary party that uses the intermediary computing device 100. At time 1430, the resource tracking computing device 200 may send a prepared transfer receipt to the intermediary computing device 100. The prepared transfer receipt may also be sent to the intermediary computing device 710, by, for example, the intermediary computing device 100, or by the resource tracking computing device 200. At time 1435, the intermediary computing device 710 may send an execute instruction to the resource tracking computing device 720, which may act as an intermediary-receiver resource tracking system. At time 1440, the resource tracking computing device 720, which may have executed the transfer of resources from the intermediary party that uses the intermediary computing device 710 to the receiving party upon receiving the execute instruction from the intermediary computing device 710, may send a transfer confirmation receipt to the intermediary computing device 710. The transfer confirmation receipt may also be sent to the resource tracking computing device 600. The resource tracking computing device 720 may also send a notification that the transfer of resources was completed to the receiver computing device 1100. At time 1445, the intermediary computing device 710 may send an execute instruction to the resource tracking computing device 600. At time 1450, the resource tracking computing device 600, which may have transferred held resources from the intermediary party that uses the intermediary computing device 100 to the intermediary party that uses the intermediary computing device 710, may send a transfer confirmation receipt to the intermediary computing device 100. The transfer confirmation receipt may also be sent to the resource tracking computing device 200 At time 1455, the intermediary computing device 100 may send an execute instruction to the resource tracking computing device 200. At time 1460, the resource tracking computing device 200, which may have transferred held resources from the sending party to the intermediary party that uses the intermediary computing device 100, may send a transfer confirmation receipt to the intermediary computing device 100. At time 1465 the intermediary computing device 100 may notify the sender computing device 300 that the transfer is complete.

Figure 15:
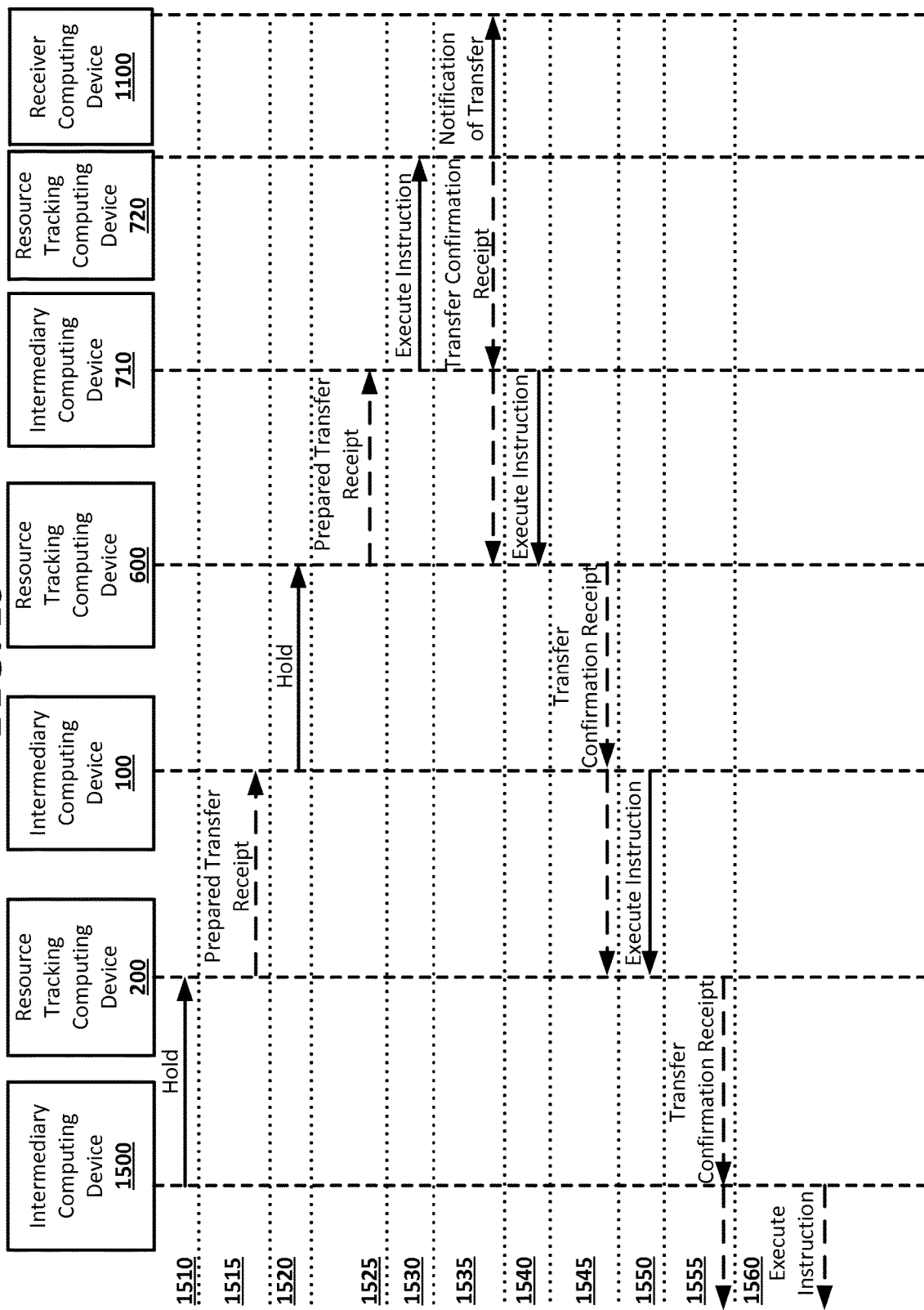
FIG. 15 shows an example sequence suitable for a resource transfer system according to an implementation of the disclosed subject matter.

FIG. 15 shows an example arrangement suitable for a resource transfer system according to an implementation of the disclosed subject matter. A transfer chain may include more than two intermediary computing devices, and no trusted system. For example, the transfer chain may include an intermediary computing device 1500. At time 1510, the intermediary computing device 1500 may instruct the resource tracking computing device 200, which may act as an intermediary-intermediary resource tracking system, to put a hold on resources owned by the intermediary party that uses the intermediary computing device 1500. The intermediary computing device 1500 may instruct the hold after receiving, for example, a prepared transfer receipt from another resource tracking system, which may have placed a hold on resources owned by the sending party, or by another intermediary party using an intermediary computing device that is immediately prior to the intermediary computing device 1500 in the transfer chain. At time 1515, the resource tracking computing device 200 may send a prepared transfer receipt to the intermediary computing device 100, either directly, or through the intermediary computing device 1500, or through a system that may act as the coordinator 400. For example, if the intermediary computing device 100 is the coordinator 400 for the transfer chain, the intermediary computing device 100 may receive the prepared transfer receipt directly from the resource tracking computing device 200. At time 1520, the intermediary computing device 100 may instruct the resource tracking computing device 600, which may act as an intermediary-intermediary resource tracking system, to put a hold on resources owned by the intermediary party that uses the intermediary computing device 600. At time 1525, the resource tracking computing device 600 may send a prepared transfer receipt to the intermediary computing device 710, either directly, or through the intermediary computing device 100, or through a system that may act as the coordinator 400. At time 1530, the intermediary computing device 710 may send an execute instruction to the resource tracking computing device 720, which may act as an intermediary-receiver resource tracking system. At time 1535, the resource tracking computing device 720, which may have executed the transfer of resources from the intermediary party that uses the intermediary computing device 710 to the receiving party upon receiving the execute instruction from the intermediary computing device 710, may send a transfer confirmation receipt to the intermediary computing device 710, directly or through a system that may act as the coordinator 400. The transfer confirmation receipt may also be sent to the resource tracking computing device 600. The resource tracking computing device 720 may also send a notification that the transfer of resources was completed to the receiver computing device 1100. At time 1540, the intermediary computing device 710 may send an execute instruction to the resource tracking computing device 600. At time 1545, the resource tracking computing device 600, which may have transferred held resources from the intermediary party that uses the intermediary computing device 100 to the intermediary party that uses the intermediary computing device 710, may send a transfer confirmation receipt to the intermediary computing device 100, directly or through a system that may act as the coordinator 400. The transfer confirmation receipt may also be sent to the resource tracking computing device 200. At time 1550, the intermediary computing device 100 may send an execute instruction to the resource tracking computing device 200. At time 1555, the resource tracking computing device 200, which may have transferred held resources from the intermediary party that uses the intermediary computing device 1500 to the intermediary party that uses the intermediary computing device 100, may send a transfer confirmation receipt to the intermediary computing device 1500, directly or through intermediary computing device 100, or through a system that may act as the coordinator 400. At time 1560 the intermediary computing device 1500 may send an execute instruction to a resource tracking computing device between the intermediary computing device 1500 and sender computing device 300 or other intermediary computing device prior to the intermediary computing device 1500 in the transfer chain. This may result in a transfer of resources to the intermediary party that uses the intermediary computing device 1500. If the sender computing device 300 is immediately prior to the intermediary computing device 1500 in the transfer chain, the transfer may be complete. Otherwise, the immediately prior intermediate computing device may receive a transfer confirmation receipt, which may then be sent to another resource tracking system, and so on until the transfer is complete.

Figure 16:
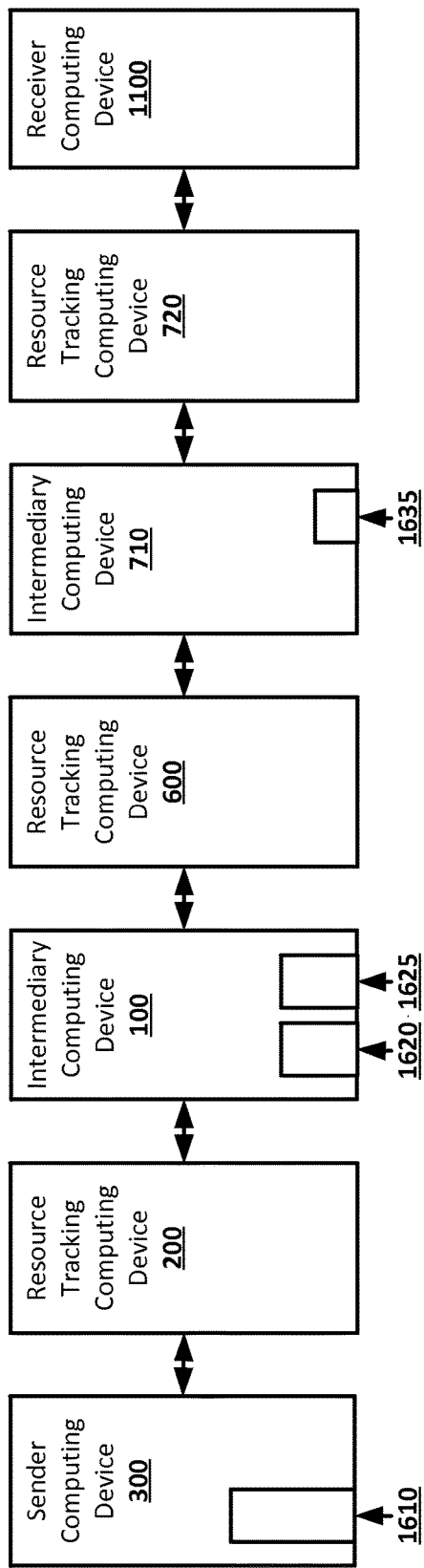
FIG. 16 shows an example arrangement suitable for a resource transfer system according to an implementation of the disclosed subject matter.

FIG. 16 shows an example arrangement suitable for a resource transfer system according to an implementation of the disclosed subject matter. A transfer chain may include guaranteed minimum transfers and lock timeouts on holds placed on resources. For example, the guaranteed minimum transfer 1610 may be a transfer of resources from the sending party to the intermediary party that uses the intermediary computing system 100 which occurs when transfer from the sending party to the receiving party fails. The guaranteed minimum transfer 1610 may be higher than the guaranteed minimum transfer 1620, which may be a transfer of resources from the intermediary party that uses the intermediary computing system 100 to the intermediary party that uses the intermediary computing system 710 that occurs when the transfer from the sending party to the receiving party fails. In this way, both the intermediary parties may receive compensation for the time their resources were held if the transfer ultimately fails, discouraging a malicious sending party from purposefully initiating transfers that will fail, as the sending party will still transfer out some resources in a failed transfer.

The lock timeout 1625 may be a time period for which the resource tracking computing device 200 will hold the resources owned by the intermediary party that uses the intermediary computing device 100, before releasing them without transferring them. The lock timeout 1625 for the intermediary party that uses the intermediary computing device 100 may be longer than the lock timeout 1635 for the intermediary party that uses the intermediary computing device 710. This may ensure that a malicious sending party cannot lock up resources owned by intermediary parties indefinitely, as the transfer will fail if a lock timeout expires and held resources will be released. The expiration of a lock timeout may also result in a guaranteed minimum transfer being made.

Figure 17:
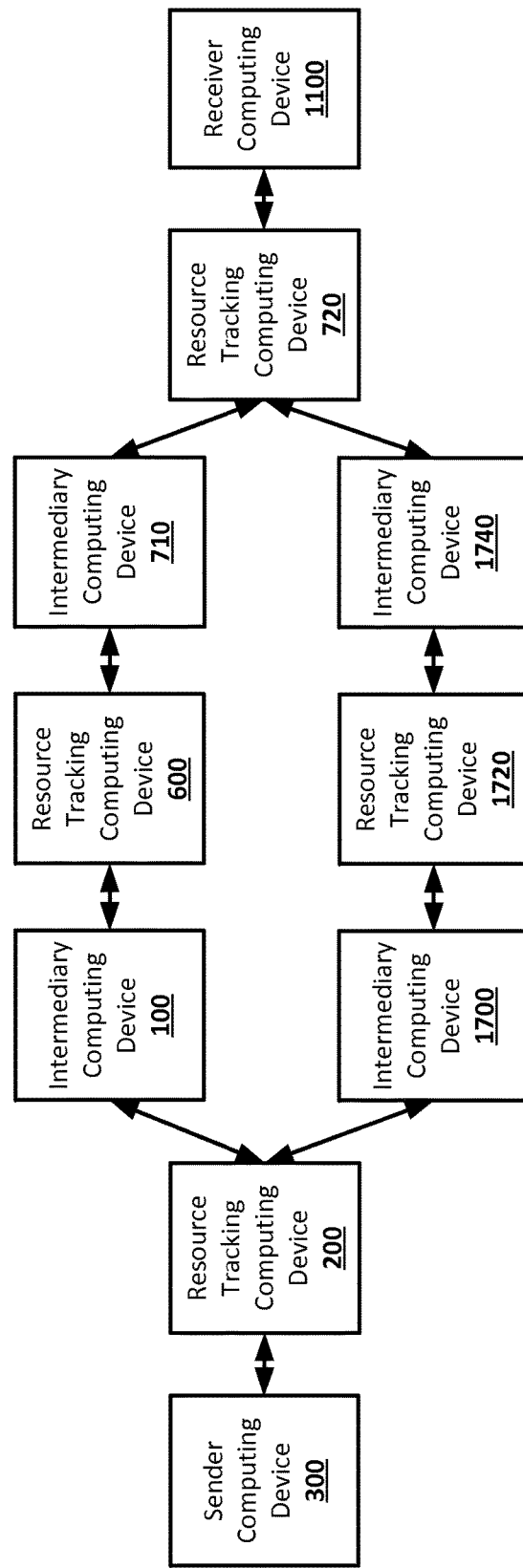
FIG. 17 shows an example arrangement suitable for a resource transfer system according to an implementation of the disclosed subject matter.

FIG. 17 shows an example arrangement suitable for a resource transfer system according to an implementation of the disclosed subject matter. The transfer chain between the receiving party and the sending party may include parallel paths. For example, a transfer chain may involve a first path that includes the intermediary computing device 100, the resource tracking system 600, and the intermediary computing device 710, and a second path includes the intermediary computing device 1700, the resource tracking system 1720, and the intermediary computing device 1740. The total value of the resources that are transferred to the receiving party may be divided among the paths in any suitable manner, so long as the value of the resources transferred from the party that uses the intermediary computing device 710 and from the party that uses the intermediary computing device 1740 sum to the total value that sending party intends for the receiving party to receive.

Figure 18:
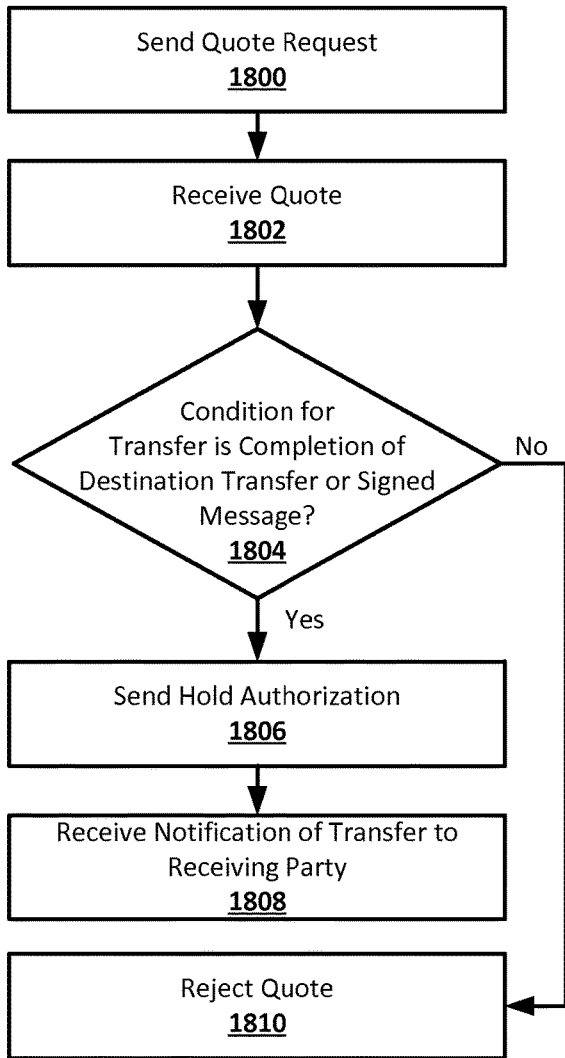
FIG. 18 shows an example procedure suitable for a resource transfer system according to an implementation of the disclosed subject matter.

FIG. 18 shows an example procedure suitable for a resource transfer system according to an implementation of the disclosed subject matter. At 1800, a quote request may be sent. For example, the sending party, using the sender computing device 300, may send out a request for a quote that may include an indication of a transfer of resources the sending party would like to make to a receiving party. The quote request may include, for example, the type and quantity of resources the sending party would like to send out, the type and quantity of resources the receiver should receive, the identity of resource tracking computing devices 200 on which the sending party has a resource pool with the resource type it would like to send out, the identity of resource tracking computing devices 200 on which the receiving party has a resource pool that can receive the type of resource that will be transferred to the receiving party, and any other suitable parameters, including, for example, a maximum level for minimum guaranteed transfers, lock timeouts, and transfer costs or fees that the sending party will accept in a quote. The quote request may be sent to any suitable computing device or system for obtaining quotes and setting up a transfer chain for the sending party's transfer.

At 1802, a quote may be received. For example, the sender computing device 300 may receive a quote that may indicate the costs of a transfer chain that may be used to effect the transfer for which the sending party requested a quote. The quote may indicate, for example, any transfer costs or fees, guaranteed minimum transfers, and lock timeouts associated with any of the intermediary computing devices 100 that have returned a quote for their participation in the transfer chain. The quote may or may not indicate the identities of the intermediary computing devices 100 and their associated intermediary parties, and may or may not indicate the types and quantities of resources that may be transferred between intermediary parties in the transfer chain. If the sending party's request for a quote indicating a specific quantity of a resource, or value of the quantity of the resources, that the receiving party will receive, the quote may indicate the quantity of resources the sending party must transfer out. The quote may include a proposed transfer from the sending party to a first intermediary party in the transfer chain, At 1804, whether the conditions on the proposed transfer from the sending party to a first intermediary party in the quote is either the receipt of a signed message or the completion of the destination transfer may be verified. For example, the sender computing device 300 may analyze the quote to determine the conditions that will be placed on a hold the sending party may authorize on the resources it owns that will be transferred out. If the condition of the hold that must be fulfilled before the held resources are transferred is either the receiving, by the resource tracking computing device 200 on which the resources are held, of a signed message from a trusted system or evidence, such as transfer confirmation receipt, that a destination transfer has occurred on another resource tracking computing device, such as the resource tracking computing device 600, then the sender computing device 300 may verify the conditions and flow may proceed to 1806. Otherwise, flow may proceed to 1810, where the quote may be rejected.

At 1806, a hold authorization may be sent. For example, the sender computing device 300 may send a hold authorization to the resource tracking computing device 200. The hold authorization may act as an authorization of the transfer through the transfer chain provided in the quote received by the sender computing device 300. The hold authorization may allow the resource tracking computing device 200 to place a hold on resources in a resource pool owned by the sending party, for example, the resource pool. The type and quantity of resources to be held may be specified in the hold authorization, along with the party to which the resources are to be transferred when the hold conditions are filled. The resource tracking computing device 200 may also have a received a proposed transfer indicating that type and quantity of resources, the conditions on the transfer of the held resources, and the party to which the resources are to be transferred, and the hold authorization may only indicate the proposed transfer for which the resources may be held.

At 1808, a notification that the transfer was made to the receiving party may be received. For example, the sender computing device 300 may receive a notification in any suitable form indicating that resources have been transferred to the receiving party, as requested by the sending party in the quote request. The sender computing device 300 may receive, for example, a transfer confirmation receipt that was generated when the last resource tracking computing device in a transfer chain, for example, the resource tracking computing device 720, has effected a transfer of resource form the last intermediary party to the receiving party At 1810, the quote may be rejected. For example, the sender computing device 300 may determine that the condition of the hold that must be fulfilled before the held resources are transferred are neither the receiving, by the resource tracking computing device 200 on which the resources are held, of a signed message from a trusted system or evidence, such as transfer confirmation receipt, that a destination transfer has occurred on another resource tracking computing device, for example, the resource tracking computing system 600. This may indicate that the sending party's resources may be transferred with no assurance that the receiving party has received, or will receive, the resources the sending party wishes to be transferred to the receiving party, making the transfer chain in the quote risky and unreliable. The sending party may reject the quote.

Figure 19:
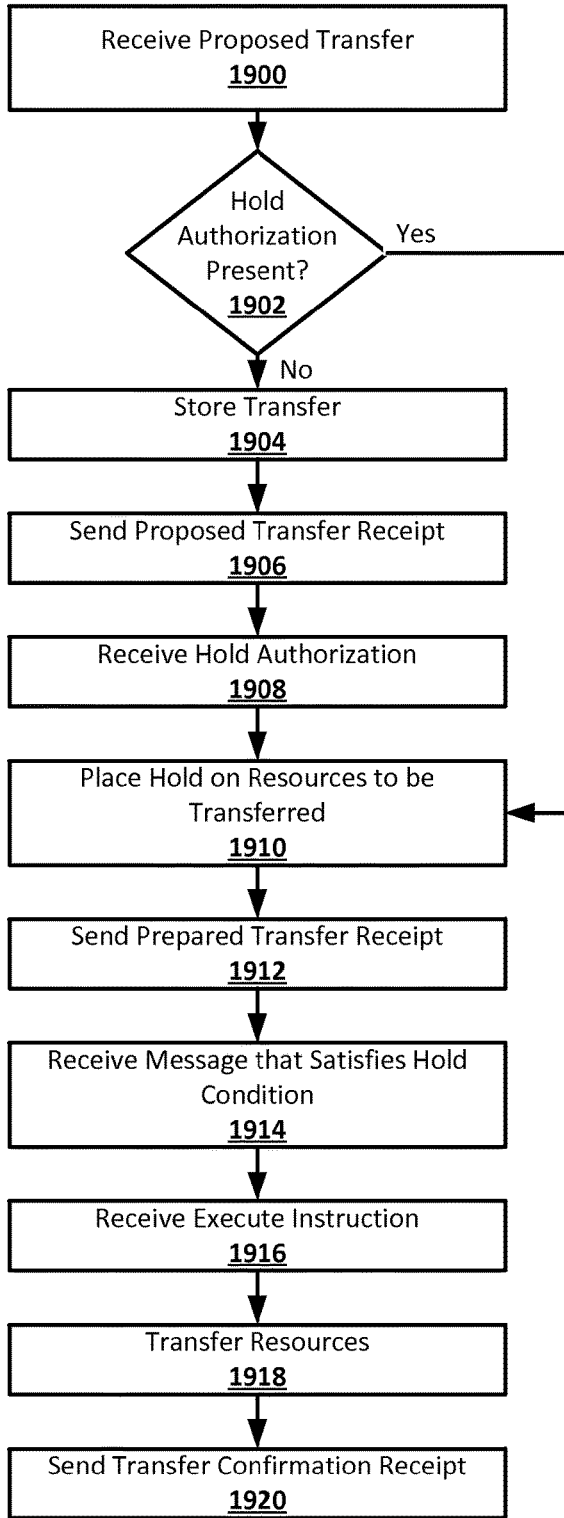
FIG. 19 shows an example procedure suitable for a resource transfer system according to an implementation of the disclosed subject matter.

FIG. 19 shows an example procedure suitable for a resource transfer system according to an implementation of the disclosed subject matter. At 1900, a proposed transfer may be received. For example, the resource tracking computing device 200 may receive a proposed transfer from any suitable computing device or system, such as the coordinator 400. The proposed transfer may indicate the type and quantity of resources in a resource pool, for example, the resource pool 242, to be held, the condition of the hold, and the resource pool, for example, the resource pool 244, to which the resources are to be transferred when the hold conditions are fulfilled and an execute instruction is received.

At 1902, whether a hold authorization is present may be determined. For example, the resource tracking computing device 200 may determine if a hold authorization has been received from the sending party, which may own the resources tracked by the resource pool 242 on which the proposed transfer indicates a hold should be placed. If the hold authorization is present, flow may proceed to 1910. Otherwise, if the hold authorization is not present, flow may proceed to 1904.

At 1904, the transfer may be stored. For example, without the presence of a hold authorization, the resource tracking computing device 200 may be unable to place a hold on the resources in the resource pool 242, as indicated in the proposed transfer. The resource tracking computing device 200 may store the proposed transfer, for example, as pending transfer 246 in the storage 240, while awaiting the hold authorization.

At 1906, a proposed transfer receipt may be sent. For example, the resource tracking computing device 200 may send, to any suitable computing device or system, such as the coordinator 400, a proposed transfer receipt. The proposed transfer receipt may indicate that the resource tracking computing device 200 has received the proposed transfer, but does not have the proper hold authorization yet and has stored the proposed transfer as the pending transfer 246 while awaiting the hold authorization. The proposed transfer receipt may be used by, for example, the coordinator 400 to indicate to the sender computing device 300 that a hold authorization is still needed before the transfer can proceed.

At 1908, a hold authorization may be received. For example, the resource tracking computing device 200 may receive the hold authorization for the pending transfer 246 from the sender computing device 300. The hold authorization may be an indication that the resource tracking computing device 200 can place a hold on resources tracked by the resource pool 242, owned by the sending party.

At 1910, a hold may be placed on the resources to be transferred. For example, the resource tracking computing device 200, having received a hold authorization from the sender computing device 300, may place a hold on resources owned by the sending party in the resource pool 242. The type and quantity resources on which the hold is placed and the condition of the hold may be based on the proposed transfer that was received by the resource tracking computing device 200. The hold may also be subject to a lock timeout, for example, if the hold is placed on resources in a resource pool such as the resource pool 644 that tracks resources owned by an intermediary party. The hold may also include indications of other parameters associated with the hold, such as, for example, the resource pool into which the resources will be transferred and the computing device or system from whom an execute instruction to effect the transfer of the resources may be received. The hold may prevent the held resources from being transferred or moved until the hold condition is fulfilled, a lock timeout expires, or the transfer fails or is cancelled, for example, by the sending party. In the event of a lock timeout expiring or other transfer failure, the hold may be released, although some of the resources may remain under hold and be transferred as part of a guaranteed minimum transfer to an intermediary party.

At 1912, a prepared transfer receipt may be sent. For example, the resource tracking computing device 200 may send a prepared transfer receipt to any suitable computing device or system, such as the coordinator 400 or the intermediary computing device 100, indicating that a hold has been placed on the resources in the resource pool 242. The prepared transfer receipt may serve as evidence that the hold has been placed, and may include an indication of, for example, the type and quantity of resources that have been held, the party to whom the held resources belong, the party to whom the resources are to be transferred, the proposed transfer the resources are being held in connection with, and any other suitable information about the prepared transfer on the resource tracking computing device 200. The prepared transfer receipt may be used by, for example, the intermediary computing device 100 as an indication that the intermediary computing device 100 can place a hold on resources at the resource tracking system 600, or execute a transfer of resources to the receiving party at the resource tracking system 600. The prepare transfer receipt may assure the intermediary computing device 100 that the resources needed for its source transfer are held and available, so that it can make its destination transfer.

At 1914, a message may be received that satisfies the hold condition. For example, if there is a trusted system in, or involved in, the transfer chain, the condition on the held resources in the resource pool 242 at the resource tracking computing device 200 may be receiving a signed message from the trusted system. The resource tracking computing device 200 may receive the signed message from the trusted system, which may be, for example, the coordinator 400, or any other computing device or system in the transfer chain, and determine that the condition on the held resources has been fulfilled. If there is no trusted system, the condition on the held resources in the resource pool 242 may be receiving evidence that a destination transfer, for which the transfer of held resources will be the source transfer, has occurred. The resource tracking computing device 200 may receive, for example, a transfer confirmation receipt that was generated by the resource tracking computing device 600 upon completion of a transfer of resources that may be the destination transfer for the source transfer of resources from the resource pool 242. For example, the resource tracking computing device 600 may have transferred resources owned by the intermediary party to the receiving party, or to a second intermediary party.

At 1916, an execute instruction may be received. For example, the resource tracking computing device 200 may receive an instruction indicating that the resource tracking computing device 200 should effect the transfer of held resources from the resource pool 242 to the resource pool 244. The execute instruction may be received from a computing device or system that is used by either the party to which the held resources will be transferred, or from which the held resources will be transferred. For example, the resource tracking computing device 200 may receive an execute instruction from the intermediary computing device 100, to effect a transfer of resources to the intermediary party the uses the intermediary computing device 100. The resources tracking computing device 720 may receive an execute instruction from the intermediary computing device 710, to effect a transfer of resources from the intermediary party that uses the intermediary computing device 710 to the receiving party.

At 1918, resources may be transferred. For example, the resource tracking computing device 200, having received a message that fulfills the condition on the held resources and the execute instruction from a computing device of either the party that will send the resource or the party that will receive the resources, may automatically transfer the held resources according to the proposed transfer. For example, the resource tracking computing device 200 may decrement the resource quantity 524 for the resource pool 242 by the quantity of resources that were held, and may increment the resource quantity 1024 for the resource pool 244 by that same quantity. This may transfer ownership of the held quantity of resources from the sending party to the intermediary party. The transfer of held resources by the resource tracking computing device 200 may be deterministic, based on receiving the message that fulfills the condition on the held resources and the execute instruction from a computing device of either the party that will send the resource or the party that will receive the resources. Once the message and execute instruction are received, the resource tracking computing device 200 may effect the transfer, without any opportunity for interruption or cancellation. This may assure all of the parties in the transfer chain that, once the hold conditions on resources to be transferred to them are met, there will be little to no risk that the resources won't be transferred to them due to malicious action by some other party in the transfer chain.

In some instances, a resource tracking computing device may transfer resources that have not been held. For example, the resource tracking computing device 720 may transfer resources form the intermediary party that uses the intermediary computing device 710 to the receiving party. The intermediary computing device 710 may not send a hold authorization to the resource tracking computing device 720, and may send an execute instruction for the transfer after receiving a prepared transfer receipt from the resource tracking computing device 600. The prepared transfer receipt may indicate that the source transfer on the resource tracking computing device 600 for the destination transfer on the resource tracking computing device 720 has been prepared. Since the transfer on the resource tracking computing device 720 is the last transfer in the chain, it may have no source transfer of its own, and therefore may proceed when instructed by the intermediary computing device 710.

At 1920, a transfer confirmation receipt may be sent. For example, the resource tracking computing device 720 may send a transfer confirmation receipt to any suitable computing device or system in the transfer chain, including, for example, the intermediary computing device 710. The transfer confirmation receipt may confirm that a transfer of resources occurred successfully. The transfer confirmation receipt may be used by its recipient as evidence that a destination was completed, fulfilling the condition on a hold on resources at another resource tracking computing device. For example, the intermediary computing device 710 may receive a transfer confirmation receipt that confirms that resources were transferred from the intermediary party that uses the intermediary computing device 710 to the receiving party on the resource tracking computing device 720. This transfer confirmation receipt may be used by the intermediary computing device 710 to fulfill the condition of a hold on resources belonging the intermediary party that uses the intermediary computing device 100 at the resource tracking computing device 600. By sending the transfer confirmation receipt and an execution instruction to the resource tracking computing device 600, the intermediary computing device 710 may cause the transfer of the held resources to its intermediary party, reimbursing the intermediary party for the resources it transferred to the receiving party.

Figure 20:
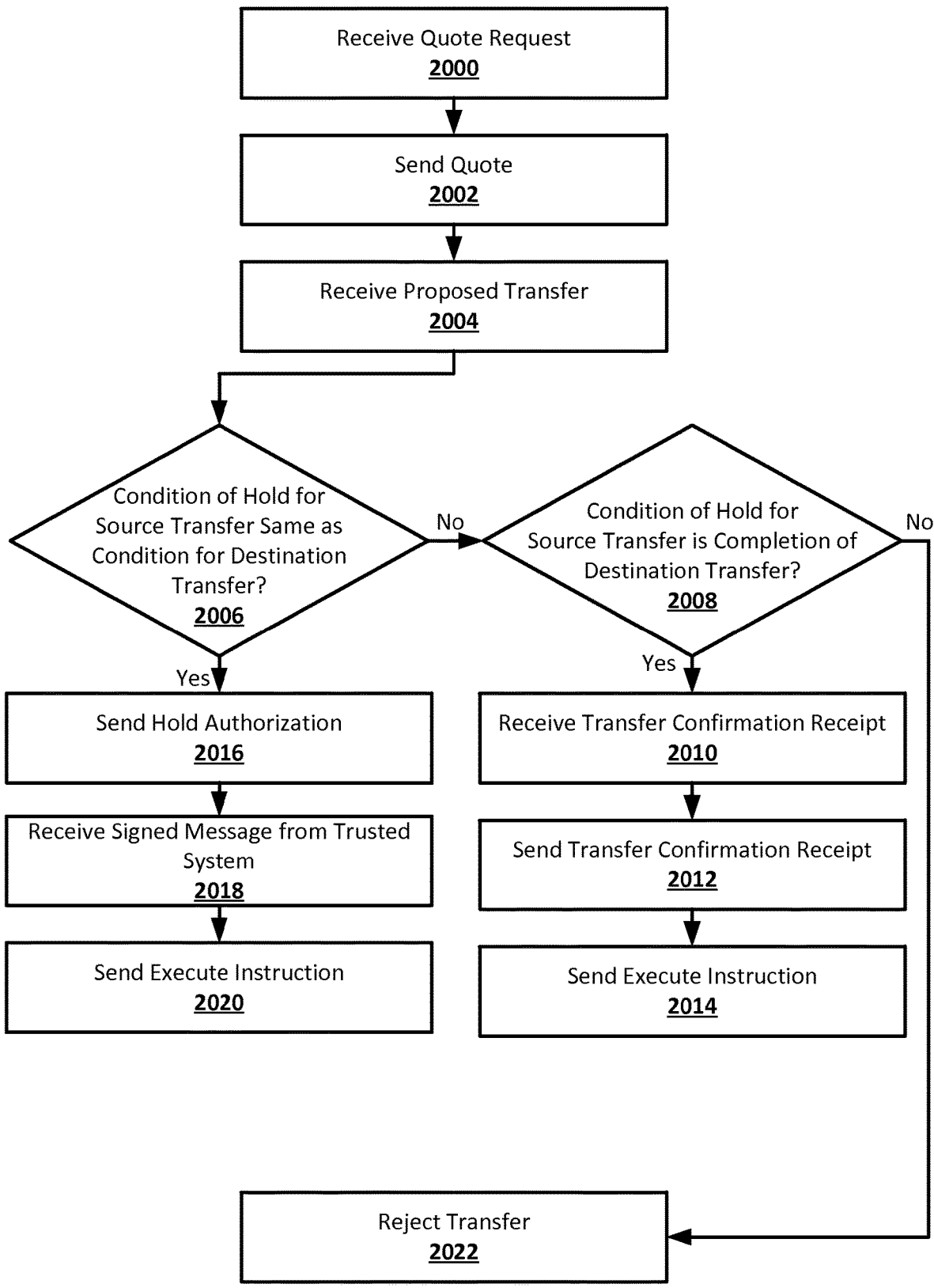
FIG. 20 shows an example procedure suitable for a resource transfer system according to an implementation of the disclosed subject matter.

FIG. 20 shows an example procedure suitable for a resource transfer system according to an implementation of the disclosed subject matter. At 2000, a quote request may be received. For example, the intermediary computing device 100 may receive request for a quote that may have been sent directly from the sender computing device 300 or distributed by, for example, the coordinator 400. The quote request may indicate the party to which the intermediary party the uses the intermediary computing device 100 would transfer resources, the party from which the intermediary party the uses the intermediary computing device 100 would receive resources, the resource tracking computing device on which the transfer would take place, the type and value of the resources that need to be involved in both transfers, and any parameters on the transfer, such as maximum acceptable values for guaranteed minimum transfers, transfer fees or costs, and lock timeouts. The quote request may only include information regarding the parties adjacent to the intermediary computing device 100 in the transfer chain, and may not necessarily include information about the sending party, receiving party, or other intermediary parties that the intermediary party that uses the intermediary computing device 100 will not transfer resources to or receive resources from.

At 2002, a quote may be sent. For example, the intermediary computing device 100 may send a quote to the computing devices or system from which the request for a quote was received. The quote may include, for example, the terms or parameters under which the intermediary computing device 100 will participate in the transfer chain. The terms or parameters may be, for example, transfer costs or fees, minimum guarantee transfers, and lock timeouts that the intermediary computing device 100 requires in exchange for its participation in the transfer chain. The transfer costs or fees may be indicated in any suitable manner, for example, as a percentage of the value of the resources being transferred to the intermediary party or as a fixed quantity of any resource type.

At 2004, a proposed transfer may be received. For example, the intermediary computing device 100 may, after having its quote accepted, receive a proposed transfer from any suitable computing device or system, such as the coordinator 400. The proposed transfer may indicate the party to which the intermediary party that uses the intermediary computing device 100 will transfer resources, as a destination transfer for the proposed transfer, and the party which they will receive resource from, as a source transfer for the proposed transfer, the type and quantity of resources in each transfer, the resource tracking computing devices on which the transfers will take place, and the conditions of any holds placed on resources held for the transfers.

At 2006, whether the condition of the hold on resources for a source transfer in the proposed transfer is the same as the condition of the hold on resources for the destination transfer may be determined. For example, the intermediary computing device 100 may determine that proposed transfer indicates that the condition of the hold on resources for both the source and destination transfer is the receiving of a signed message from a trusted system, and thus the source transfer and destination transfer hold conditions are the same. If the source and destination transfers have the same hold conditions, flow may proceed to 2016. Otherwise, flow may proceed to 2008.

At 2008, whether the condition of the hold on resources for a source transfer in the proposed transfer is evidence of completion of the destination transfer may be determined. For example, the intermediary computing device 100 may determine that the proposed transfer indicates that the condition of a hold on resources for the source transfer is the receiving of evidence that the destination transfer was completed in the form a transfer confirmation receipt from the resource tracking computing device 600. The resource tracking computing device 600 may be responsible for the destination transfer of resources from the intermediary party that uses the intermediary computing device 100 to another intermediary party or to a receiving party. If the condition of the hold for the source transfer is the receiving of evidence of the completion of the destination transfer, flow may proceed to 2010. Otherwise, flow may proceed to 1922, where the proposed transfer may be rejected.

At 2010, a transfer confirmation receipt may be received. For example, the intermediary computing device 100 may receive a transfer confirmation receipt from the resource tracking computing device 600. The transfer confirmation receipt may be evidence of the completion of a destination transfer, with resources transferred from, for example, the resource pool 644, owned by the intermediary party that uses the intermediary computing device 100, to the resource pool 642, owned by, for example, the receiving party, or by another intermediary party. The intermediary computing device 100 may have sent an execution instruction to the resource tracking computing device 600, for example, to effect a transfer of resources to the receiving party, or the resource tracking computing device 600 may have received the execute instruction from the intermediary computing device 710.

At 2012, the transfer confirmation receipt may be sent. For example, the intermediary computing device 100 may send the transfer confirmation receipt received from the resource tracking computing device 600 to the resource tracking computing device 200. The transfer confirmation receipt may fulfill the condition of the hold on the resources being held at the resource tracking computing device 200, for example, in the resource pool 242 owned by the sending party.

At 2014, an execute instruction may be sent. For example, the intermediary computing device 100 may send an execute instruction to the resource tracking computing device 200. The execute instruction may cause the resource tracking computing device 200 to effect the source transfer for the intermediary computing device 100, transferring held resources from the resource pool 242, owned by the sending party, to the resource pool 244, owned by the intermediary party the uses the intermediary computing device 100. This may transfer ownership of the held resources from the sending party to the intermediary party. The resource tracking computing device 200 may perform the transfer automatically upon receiving the execute instruction, as the condition of the hold on the resources in the resource pool 242 may have been fulfilled by the receiving of the transfer confirmation receipt sent by the intermediary computing device 100.

At 2016, a hold authorization may be sent. For example, the intermediary computing device 100 may send a hold authorization to the resource tracking computing device 600. The hold authorization may authorize the resource tracking computing device 600 to put a hold on resources tracked in the resource pool 644, owned by the intermediary party that uses the intermediary computing device 100. The type and quantity of resources to be held, and the condition of the hold, and the party to whom the resources will be transferred once the hold condition is fulfilled, may be indicated in hold authorization, or may have been indicated to the resource tracking computing device 600 in a proposed transfer. The condition of the hold on the resources may be the receiving a signed message from trusted system. The held resources may be intended for transfer to the receiving party, or to another intermediary party, as the destination transfer for the intermediary computing device 100.

At 2018, a signed message from a trusted system may be received. For example, the intermediary computing device 100 may receive a signed message from a trusted system that may be in, or involved with, the transfer chain, such as, for example, coordinator 400. The signed message may be signed with cryptographic private key, which the intermediary computing device 100 may verify with a corresponding public key. The trusted system may send out the signed message when, for example, it has received prepared transfer receipts from all resource tracking computing devices in the transfer chain.

At 2020, an execute instruction may be sent. For example, the intermediary computing device 100 may send an execute instruction to the resource tracking computing device 200. The execute instruction may cause the resource tracking computing device 200 to effect the source transfer for the intermediary computing device 100, transferring held resources from the resource pool 242, owned by the sending party, to the resource pool 244, owned by the intermediary party the uses the intermediary computing device 100. This may transfer ownership of the held resources from the sending party to the intermediary party. The resource tracking computing device 200 may perform the transfer automatically upon receiving the execute instruction, as the condition of the hold on the resources in the resource pool 242 may have been fulfilled by the receiving of a signed message from the trusted system. The resource tracking computing device 200 may receive the signed message at the same time as the intermediary computing device 100, or the intermediary computing device 100 may forward the signed message to the resource tracking computing device 200.

At 2022, the transfer may be rejected. For example, if the condition of the hold on the resources for the source transfer is neither the receiving of a signed message from a trusted system, nor the receiving of evidence that a destination transfer was completed, the intermediary computing device 100 may reject the transfer.

Figure 21:
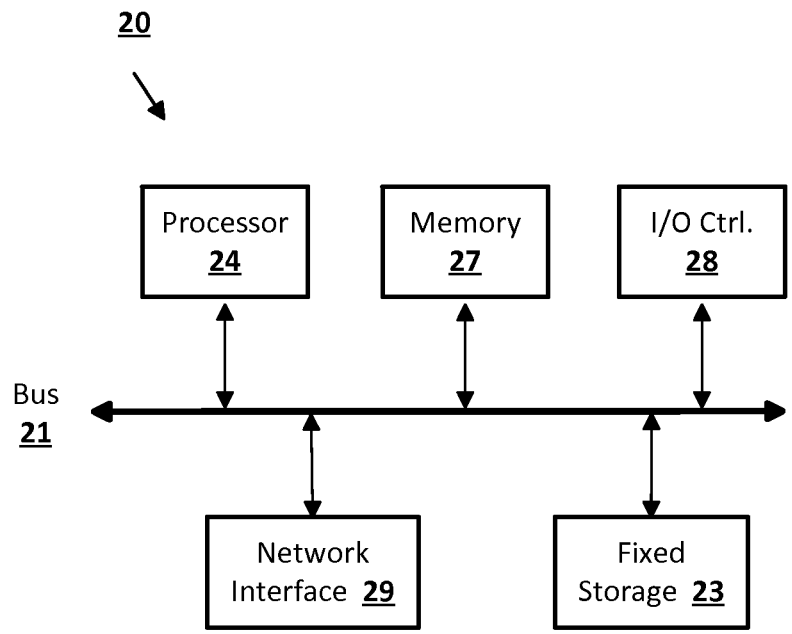
FIG. 21 shows a computer according to an embodiment of the disclosed subject matter.

Embodiments of the presently disclosed subject matter may be implemented in and used with a variety of component and network architectures. FIG. 21 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 22.

Many other devices or components (not shown) may be connected in a similar manner, such as document scanners, digital cameras, auxiliary, supplemental, or backup systems, or the like. Conversely, all of the components shown in FIG. 21 need not be present to practice the present disclosure. The components can be interconnected in different ways from that shown. The operation of a computer such as that shown in FIG. 21 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 22:
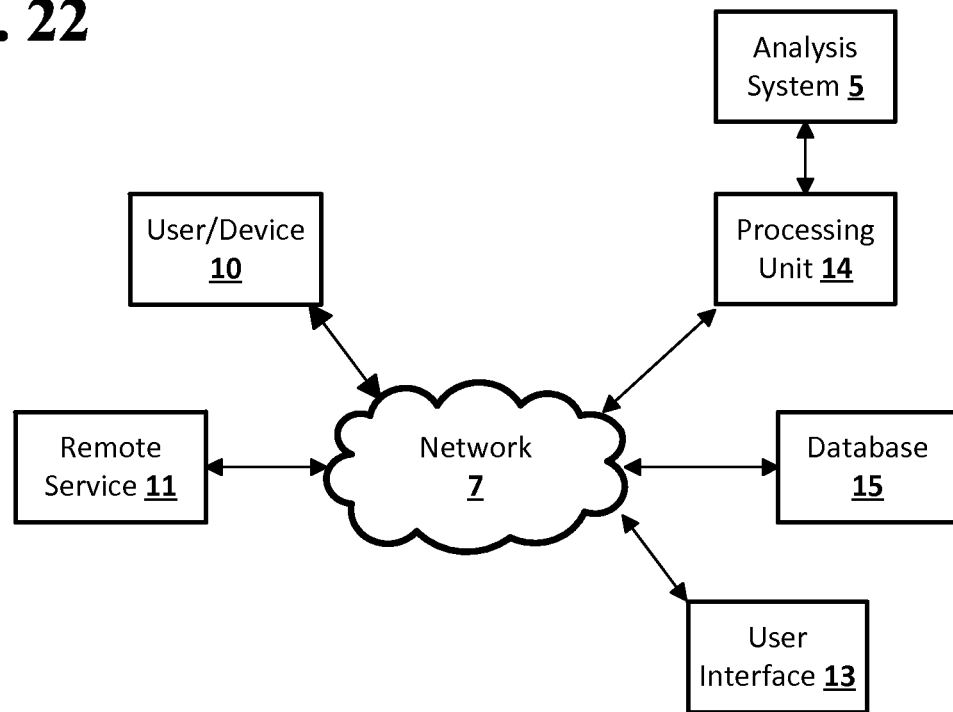
FIG. 22 shows a network configuration according to an embodiment of the disclosed subject matter.

FIG. 22 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed on a data processing apparatus comprising:

receiving, on a first computing device, an instruction to transfer a first quantity of a first resource type from a first resource pool to a second resource pool, wherein the first resource pool comprises a first register on a blockchain ledger and the second resource pool comprises a second register on the blockchain ledger, and wherein the blockchain ledger is distributed across a plurality of computing devices, is reconciled in a collaborative manner among the plurality of computing devices;

receiving, on the first computing device, an instruction to place a hold on a second quantity of the first resource type in the first resource pool;

receiving, on the first computing device, an authorization to place the hold on the second quantity of the first resource type in the first resource pool, the authorization comprising a message signed with a cryptographic private key corresponding to a cryptographic public key of the first resource pool;

responsive to receiving the authorization, placing, by the first computing device, the hold on the second quantity of the first resource type in the first resource pool to create a held second quantity of the first resource type, wherein the held second quantity of the first resource type cannot be transferred from the first resource pool until the hold is released;

receiving, on the first computing device, a message from a second computing device indicating a cancellation of the transfer of the first quantity of the first resource type from the first resource pool to the second resource pool;

verifying, by the first computing device, the message from the second computing device indicating a cancellation of the transfer using a cryptographic public key of the second computing device to determine that the message from the second computing device indicating a cancellation of the transfer comprises a cryptographic signature created with a cryptographic private key of the second computing device;

responsive to receiving the message indicating the cancellation of the transfer, releasing, by the first computing device, the hold on a first portion of the held second quantity of the first resource type and maintaining the hold on a second portion of the held second quantity of the first resource type;

receiving, at the first computing device from a third computing device, an instruction to execute a transfer of a guaranteed minimum transfer quantity of the first resource type from the first resource pool to the second resource pool; and responsive to verifying the message from the second computing device indicating a cancellation of the transfer successfully and receiving the instruction to execute the transfer of the guaranteed minimum transfer quantity of the first resource type from the first resource pool to the second resource pool, releasing, by the first computing device, the hold on the second portion of the held second quantity of the first resource type, decrementing the first register that is in the first resource pool and is associated with the first resource type by the guaranteed minimum transfer quantity using the cryptographic private key, and incrementing the second register that is in the second resource pool and is associated with the first resource type by the guaranteed minimum transfer quantity.

2. The method of claim 1, wherein the message indicating the cancellation of the transfer is a signed message from a trusted system and wherein the signed message is signed with a private key cryptographic and verified with a public cryptographic key.

3. The method of claim 1, wherein the message indicating the cancellation of the transfer is a message from the sender computing device indicating that a sending party is cancelling the transfer, and a message from the receiver computing device indicating the receiver is cancelling the transfer, or a message from a coordinator computing device indicating cancellation of the transfer.

4. The method of claim 1, wherein the message indicating the cancellation of the transfer is a messaging indicating the transfer of a second guaranteed minimum transfer quantity of a second resource type from a third resource pool to a fourth resource pool.

5. The method of claim 4, wherein the first resource pool and the fourth resource pool track resources controlled by a first party.

6. The method of claim 4, wherein the second guaranteed minimum transfer quantity of the second resource type has a lesser monetary value than the guaranteed minimum transfer quantity of the first resource type.

7. The method of claim 1, wherein the guaranteed minimum transfer quantity of the first resource type is less than the first quantity of the first resource type.

8. The method of claim 1, wherein releasing the hold on the second portion of the held second quantity of the first resource type, decrementing a first register that is in the first resource pool and is associated with the first resource type by the guaranteed minimum transfer quantity, and incrementing a second register that is in the second resource pool and is associated with the first resource type by the guaranteed minimum transfer quantity, are performed deterministically on receiving the instruction to cancel the transfer and cannot be halted.

9. The method of claim 1, wherein the guaranteed minimum transfer quantity is set by a party that controls the second resource pool.

10. The method of claim 1, wherein the resource type comprises a currency, cryptocurrency, financial instrument, commodity, physical good, specific item or items, or computational resource.

* * * * *